(12) United States Patent
Sharma et al.

(10) Patent No.: US 12,174,875 B2
(45) Date of Patent: Dec. 24, 2024

(54) PROCESSES AND SYSTEMS FOR DECENTRALIZATION OF DATA PRODUCED AT THE EDGE OF A DISTRIBUTED COMPUTING SYSTEM

(71) Applicant: VMware LLC, Palo Alto, CA (US)

(72) Inventors: Anil Sharma, Palo Alto, CA (US);
Darren Brown, Seattle, WA (US);
Pedro Algarvio, Palo Alto, CA (US);
Caleb Beard, Palo Alto, CA (US)

(73) Assignee: VMware LLC, Palo Alto, CA (US)

( * ) Notice: Subject to any disclaimer, the term of this patent is extended or adjusted under 35 U.S.C. 154(b) by 0 days.

(21) Appl. No.: 17/834,152

(22) Filed: Jun. 7, 2022

(65) Prior Publication Data

US 2023/0394076 A1 Dec. 7, 2023

(51) Int. Cl.
*G06F 16/35* (2019.01)
*G06F 16/31* (2019.01)
*G06F 16/33* (2019.01)
*G06F 16/901* (2019.01)

(52) U.S. Cl.
CPC .......... *G06F 16/355* (2019.01); *G06F 16/313* (2019.01); *G06F 16/3347* (2019.01); *G06F 16/9024* (2019.01)

(58) Field of Classification Search
CPC ... G06F 16/355; G06F 16/313; G06F 16/3347
See application file for complete search history.

(56) References Cited

U.S. PATENT DOCUMENTS

| | | | |
|---|---|---|---|
| 2006/0036670 A1* | 2/2006 | Musman | H04L 41/044 709/202 |
| 2009/0113246 A1* | 4/2009 | Sabato | G06F 11/0781 714/37 |
| 2015/0215804 A1* | 7/2015 | Ideses | H04L 47/803 370/230 |
| 2016/0026950 A1* | 1/2016 | Kapur | G06Q 10/0639 705/7.38 |

* cited by examiner

*Primary Examiner* — Grace Park
(74) *Attorney, Agent, or Firm* — Quarles & Brady LLP

(57) ABSTRACT

Computer-implemented processes and systems described herein are directed to reducing volumes of data sent from edge devices to a data center. Each edge device runs an agent that collects event information generated by event sources of the edge device in a runtime interval. Each agent reduces the event information to relevant event information at the edge device in accordance with instructions received from a controller server of the data center. The relevant event information contains less information than the event information. Each agent forwards the relevant event information over the internet to external services executed at the data center, where the relevant event information is stored in a data storage device of the data center.

24 Claims, 37 Drawing Sheets log.write([$Time_date] [Thread-$X/$IP/INFO] [com.vmware.loginsight.commons.executor.ProcessExecutor] [[[/usr/lib/loginsight/application/lib/apache-cassandra-2.0.10/bin/nodetool, -h, montools-prod-loginsight.vmware.com, repair]] [$Time_date] Repair session $RS for range $range finished)

FIG. 18

[2019-03-10 23:43:36.859+0000] [Thread-1822496/127.0.0.1 INFO] [com.vmware.loginsight.commons.executor.ProcessExecutor] [ [[/usr/lib/loginsight/application/lib/apache-cassandra-2.0.10/bin/nodetool, -h, montools-prod-loginsight.vmware.com, repair]] [2015-03-10 23:43:36,716] Repair session 51312720-c77e-11e4-ad72-4769d614a3f2 for range (-6899937477723537626, -6896547230076663429) finished]

FIG. 19

```
                                                            2002
                                                           ↙
     ╱2008      ╱2010       ╱2012
┌────────────────────────────────────────────────────┐
│ 2019-12-02T10:44:24.095Z li-qe-esx5.vmware.com Rhttpproxy: │──2004
│ [28959B90 verbose 'Proxy Req 46691'] Connected to localhost:8307 │
│                                      ╲2006                         │
├────────────────────────────────────────────────────┤
│ 2019-12-02T10:44:24.094Z li-qe-esx5.vmware.com Rhttpproxy: │
│ [FFFC2B90 verbose 'Proxy Req 46691'] new proxy client TCP (local- │
│ 127.0.0.1:80, peer=127.0.0.1:50155)                │
├────────────────────────────────────────────────────┤
│ 2019-12-02T10:44:24.093Z li-qe-esx5.vmware.com Rhttpproxy: [2889B90 │
│ verbose 'Proxy Req 46685'] The client closed the stream, not │
│ unexpectedly.                                      │
├────────────────────────────────────────────────────┤
│ Dec  2 18:48:29 strata-vc 2019-12-02T18:48:30.273Z [7FA39448B700 │
│ info 'commonvpxLro' opID=1947d6f9] [VpxLRO] - FINISH task- │
│ internal-2163522 -- -- vim.SessionManager.logout - │
├────────────────────────────────────────────────────┤
│ 2019-12-02T18:48:51.396Z strata-esx1.eng.vmware.com Vpxa: [65B5AB90 │
│ verbose 'VpxaHalCnxHostagent' opID=WFU-ed393333] │
│ [WaitForUpdatesDone] Completed callback            │
├────────────────────────────────────────────────────┤
│ 2019-12-02T18:48:51.395Z strata-esx1.eng.vmware.com Vpxa:[65B5AB90 │
│ verbose 'VpxaHalCnxHostagent' opID=WFU-ed393333] │
│ [WaitForUpdatesDone] Starting next WaitForUpdates() call to hostd │
├────────────────────────────────────────────────────┤
│ 2019-12-02T18:48:51.395Z strata-esx1.eng.vmware.com Vpxa: [65B5AB90 │
│ verbose 'vpxavpxaInvtVm' opID=WFU-ed393333]        │
│ [VpxaInvtVmChangeListener] Guest DiskInfo Changed  │
├────────────────────────────────────────────────────┤
│ 2019-12-02T18:48:51.395Z strata-esx1.eng.vmware.com Vpxa: [65B5AB90 │
│ verbose 'vpxavpxaInvtVm' opID=WFU-ed393333]        │
│ [VpxaInvtVmChangeListener] Guest DiskInfo Changed  │
└────────────────────────────────────────────────────┘
```

FIG. 20

| Regular Expression (Regex) ~2104 | Log message strings ~2102 |
|---|---|
| 2112 — [0-9]{4}/[0-9]{2}/[0-9]{2}<br>　　　　　　 2114　2115　2116 | yyyy/mm/dd ~2106<br>2108 2109 2110 |
| 2120 — [0-9]{1,3}\.[0-9]{1,3}\.[0-9]{1,3}\.[0-9]{1,3} | General IP address from 0.0.0.0 to 999.999.999.999 ~2118 |
| 2122 — (?<![0-9])(?:<br>　　　(?:25[0-5]\|2[0-4][0-9]\|[0-1]?[0-9]{1,2})[.]<br>　　　(?:25[0-5]\|2[0-4][0-9]\|[0-1]?[0-9]{1,2})[.]<br>　　　(?:25[0-5]\|2[0-4][0-9]\|[0-1]?[0-9]{1,2})[.]<br>　　　(?:25[0-5]\|2[0-4][0-9]\|[0-1]?[0-9]{1,2}))<br>　　　(?![0-9]) | IP version 4 (IPv4) address from 0.0.0.0 to 255.255.255.255 |
| 2124 — (?<![0-9])(?>[+-]?)(?:(?:[0-9]+(?:\.[0-0]+)?)\|(?:\.[0-9]+)) | Base 10 number |
| 2126 — [a-zA-Z0-9._-]+ | Upper/lower case letters, numbers, underscore, and hyphen (e.g., username) |
| 2128 — [a-zA-Z0-9._%+-]+@[a-zA-Z0-9._-]+\.[a-zA-Z]{2,4} | General email address |

FIG. 21A

| Grok pattern — 2132 | Regular Expression (Regex) — 2134 |
|---|---|
| INT | (?:[+-]?(?:[0-9]+)) |
| POSINT | \b(?:[1-9][0-9]*)\b] |
| BASE10NUM | (?<![0-9.+-])(?>[+-]?(?:(?:[0-9]+(?:\.[0-9]+)?)\|(?:\.[0-9]+))) |
| USERNAME — 2136 | [a-zA-Z0-9._-]+  —— 2138 |
| YEAR | (?>\d\d){1,2} |
| MONTH | b(?:Jan(?:uary)?\|Feb(?:ruary)?\|Mar(?:ch)?\|Apr(?:il)?\|May\|Jun(?:e)?\|Jul(?:y)?\|Aug(?:ust)?\|Sep(?:tember)?\|Oct(?:ober)?\|Nov(?:ember)?\|Dec(?:ember)?)\b |
| MONTHNUM | (?:0?[1-9]\|1[0-2]) |
| DAY | (?:Mon(?:day)?\|Tue(?:sday)?\|Wed(?:nesday)?\|Thu(?:rsday)?\|Fri(?:day)?\|Sat(?:urday)?\|Sun(?:day)?) |
| HOUR | (?:2[0123]\|[01]?[0-9]) |
| MINUTE | (?:[0-5][0-9]) |
| SECOND | (?:(?:[0-5][0-9]\|60)(?:[:.,][0-9]+)?) |
| EMAILLOCALPART | [a-zA-Z][a-zA-Z0-9_.+-=:]+ |
| IPV4 | (?<![0-9])(?:(?:25[0-5]\|2[0-4][0-9]\|[0-1]?[0-9]{1,2})[.](?:25[0-5]\|2[0-4][0-9]\|[0-1]?[0-9]{1,2})[.](?:25[0-5]\|2[0-4][0-9]\|[0-1]?[0-9]{1,2})[.](?:25[0-5]\|2[0-4][0-9]\|[0-1]?[0-9]{1,2}))(?![0-9]) |
| HOSTNAME — 2140 | \b(?:[0-9A-Za-z][0-9A-Za-z-]{0,62})(?:\.(?:[0-9A-Za-z][0-9A-Za-z-]{0,62}))*(\.?\|\b) — 2142 |
| SPACE | \s* |

FIG. 21B

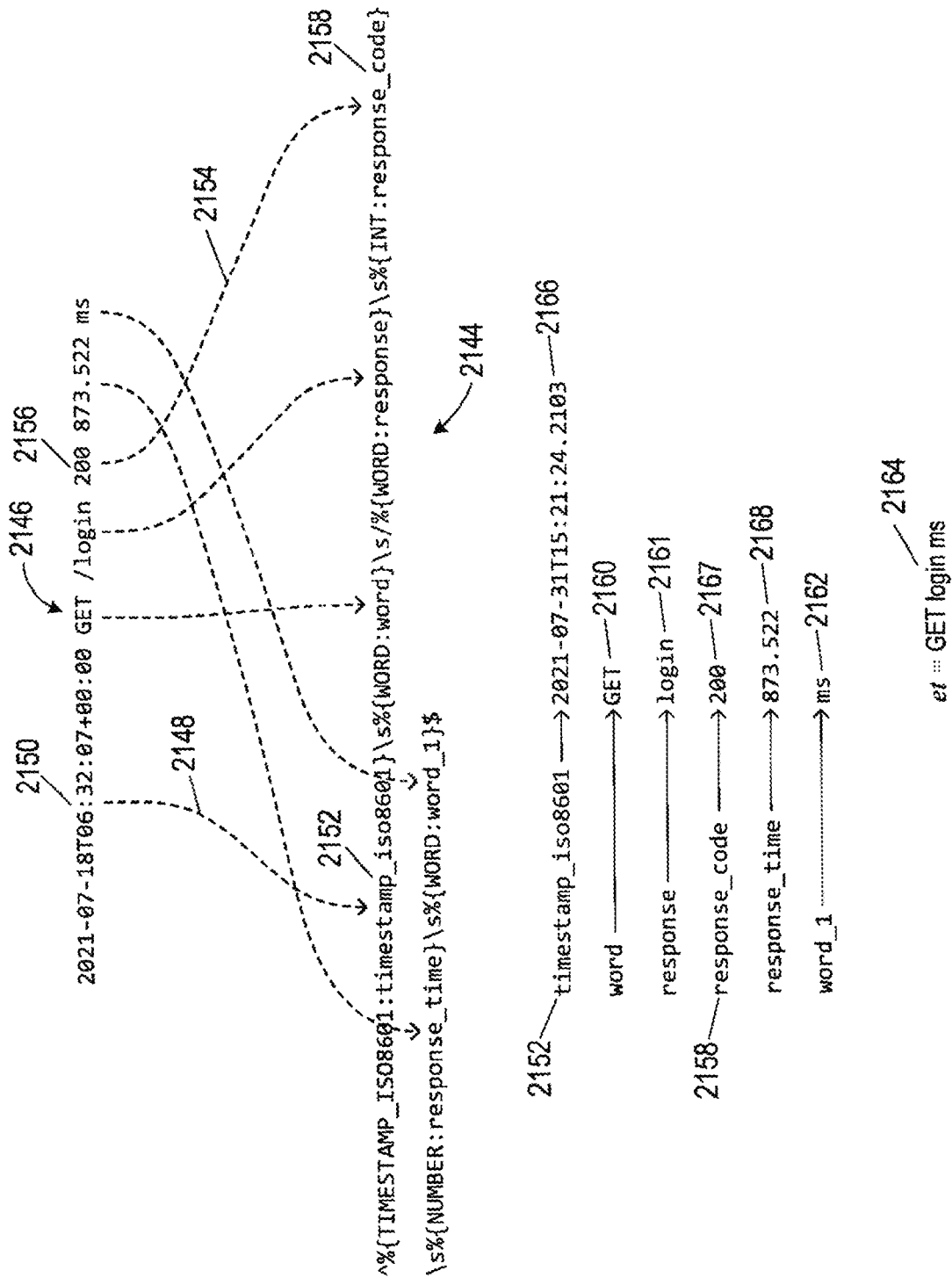

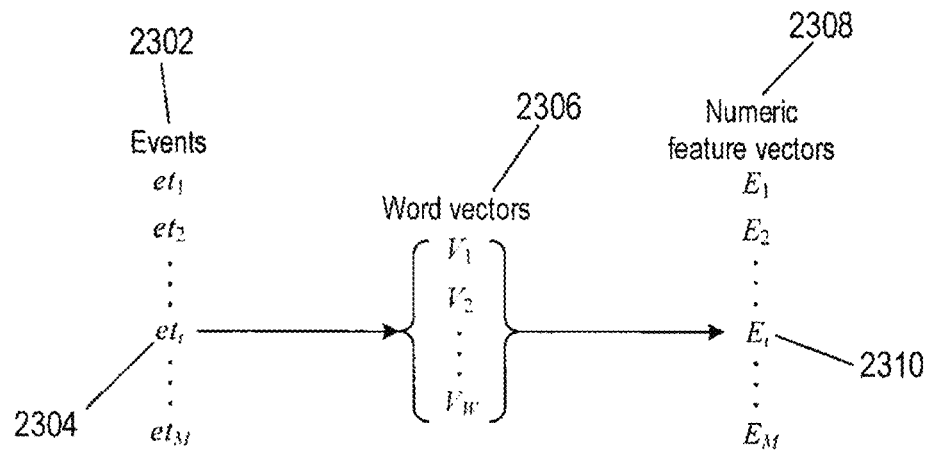

FIG. 23

Log messages:
    2021-08-16 13:42:19 cpu utilization 38%; infor    2401
    2021-08-16 13:42:19 cpu utilization 47%; warning    2402
    2021-08-16 13:42:19 cpu utilization 54%; error    2403

Events:
    $et_1$ = cpu utilization infor
    $et_2$ = cpu utilization warning
    $et_3$ = cpu utilization error Word vectors: 2404 2405 2406 2407 2408

$$cpu = \begin{bmatrix}1\\2\\3\end{bmatrix} \quad utilization = \begin{bmatrix}2\\1\\2\end{bmatrix} \quad warning = \begin{bmatrix}0\\1\\0\end{bmatrix} \quad info = \begin{bmatrix}1\\0\\0\end{bmatrix} \quad error = \begin{bmatrix}0\\0\\1\end{bmatrix}$$

Numeric feature vectors:

$$E_1 = \begin{bmatrix}1.3\\1\\1.7\end{bmatrix}\text{—2410} \quad E_2 = \begin{bmatrix}1\\1.3\\1.7\end{bmatrix}\text{—2411} \quad E_3 = \begin{bmatrix}1\\1\\2\end{bmatrix}\text{—2412}$$

FIG. 24

2501 warning error forwarding to http front end err read tcp read connection reset by peer

2502 warning error forwarding to http front end err dial tcp getsocketopt connection refused

2503 warning error forwarding to http front end err dial tcp lookup front end on no such host

PROCESSES AND SYSTEMS FOR DECENTRALIZATION OF DATA PRODUCED AT THE EDGE OF A DISTRIBUTED COMPUTING SYSTEM

TECHNICAL FIELD

Processes and systems described herein relate to cloud computing, and, in particular, to processes and systems for reducing volumes of data sent from edge systems to a data center of a cloud service provider.

BACKGROUND

Electronic computing has evolved from primitive, vacuum-tube-based computer systems, initially developed during the 1940s, to modern electronic computing systems in which large numbers of multi-processor computer systems, such as server computers, workstations, and other individual computing systems, are networked together with large-capacity data storage devices and networking devices to create geographically distributed data centers. Data centers are made possible by advances in computer networking, virtualization, distributed operating systems and applications, data-storage appliances, computer hardware, and software technologies. Data centers receive, store, process, distribute, and allow access to large amounts of data now make up most of the computational and data storage resources used in cloud computing and cloud-based services.

Cloud vendors maintain and operate data centers that are widely used by businesses, governments, and other organizations to store and process data, execute applications, and offer services to customers in the cloud. For example, virtualization has enabled organizations to rent processing power and data storage in separate software defined data centers ("SDDC") that can be scaled to meet user demands. Cloud vendors provide SDDC monitoring and management of services, such as hybrid cloud services, cloud analytics services, endpoint services, and Internet of Things ("IOT") services. It has become standard practice for organizations to collect all data generated from these services, then send the data to a data center and use cloud analytics services to detect problems with the organizations' systems. For example, cloud vendors collect, consolidate, and process various types of event information produced by an organization's computer systems, applications, sensors, and OT devices and send the event information to the cloud vendors for storage and processing in data centers managed by the cloud vendors. This strategy seems reasonable in that various analytic services have been developed and are used on the stored data without much forethought in designing solutions.

On the other hand, there are several disadvantages to the approach of forwarding such large quantities of data to a data center operated by a third-party cloud vendor. First, transferring large quantities of data to a data center that is remote from the source of the data is time consuming. The time lag created by transferring large quantities of data to a data center becomes a serious issue with real-time projects and time-sensitive applications, such as e-commerce sites, electronic banking, and online gaming. Second, storage of large quantities of data in a central data center is expensive and requires organizations to make difficult decisions around their privacy policies on what data to transfer and store in a data center. One example of this is strategy is the transmission and storage of log messages generated by an organization's systems to a data center operated by a cloud vendor. Each log message is an unstructured or semi-structured time-stamped message that records information about the state of an operating system, state of an application, state of a service, or state of computer hardware at a point in time, and certain log messages may also contain sensitive user information. Organizations transmit and store millions of these log messages generated each day in data centers. Teams of software engineers with the aid of log analytics services provided by the data centers try to determine root causes of hardware and software performance problems with outside computer systems and applications. However, this process can be prohibitively expensive because of the large volumes of log messages that must be stored and processed at a central location. As a result, processing these large volumes of log messages to detect the root cause of a problem can take weeks and, in some cases, longer. Long delays in detecting and correcting the root cause of a performance problem can create mistakes in processing transactions with customers or deny people access to vital services provided by an organization, which damages an organizations reputation and drives customers to competitors. In addition, many log messages that are processed in the data center may contain sensitive information about an organization's systems and users of the organization's services. As a result, organizations seek methods and systems that significantly reduce the amount of data stored in data centers, enable organizations to control the types of data sent to data centers, and reduce the time to detecting root causes of performance problems with the organizations' systems.

SUMMARY

Computer-implemented processes and systems described herein are directed to reducing volumes of data sent from edge devices of a distributed computing system to a data center. Each edge device runs an agent that collects event information generated by event sources in the user space and the kernel space of the edge device. The event sources are log message sources and metrics. The event information contains log messages and metrics generated by the log message and metric sources. Each agent reduces the event information to relevant event information that summarizes the contents of the event information and contains far less data that the event information. The agent sends the relevant event information to the remote data center for storage and processing using external services provided by the vendor operator of the data center. Each agent can be individually configured to collect selected types of event information and process the selected event information into relevant event information, thereby providing numerous advantages over traditional methods of simply sending all event information from the edge devices to the remote data center and using external services provided by the data center. Because the event information is processed locally by agents that are at the edge devices, the agents save on resources and costs of data storage and transmission to the data center. Event information that is not helpful in identifying a root cause of a problem is excluded from the relevant event information and discarded at the edge device, which significantly reduces the amount of information stored at and sent to the data center.

DESCRIPTION OF THE DRAWINGS

FIG. 18 shows an example of a log write instruction.

FIG. 19 shows an example of a log message generated by the log write instruction in FIG. 18.

FIG. 20 shows a small, eight-entry portion of a log file.

FIG. 21A shows a table of examples of regular expressions that match character strings of log messages.

FIG. 21B shows a table of examples of primary Grok patterns and corresponding regular expressions.

FIG. 21C shows an example of a Grok expression that is configured to normalize a log message.

FIG. 23 shows an example of constructing feature vectors for the events of log messages produced in a runtime interval.

FIG. 24 shows a numerical example of computing feature vectors for three simple log messages.

DETAILED DESCRIPTION

This disclosure is directed to computer-implemented methods and systems for reducing the amount of data sent from edge systems to a data center. In a first subsection, computer hardware, complex computational systems, and virtualization are described. Computer-implemented methods and systems for reducing the amount of data sent from edge systems to a data center are described in a second subsection.

Computer Hardware, Complex Computational Systems, and Virtualization

The term "abstraction" as used to describe virtualization below is not intended to mean or suggest an abstract idea or concept. Computational abstractions are tangible, physical interfaces that are implemented, ultimately, using physical computer hardware, data storage devices, and communications systems. Instead, the term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces.

Figure 1:
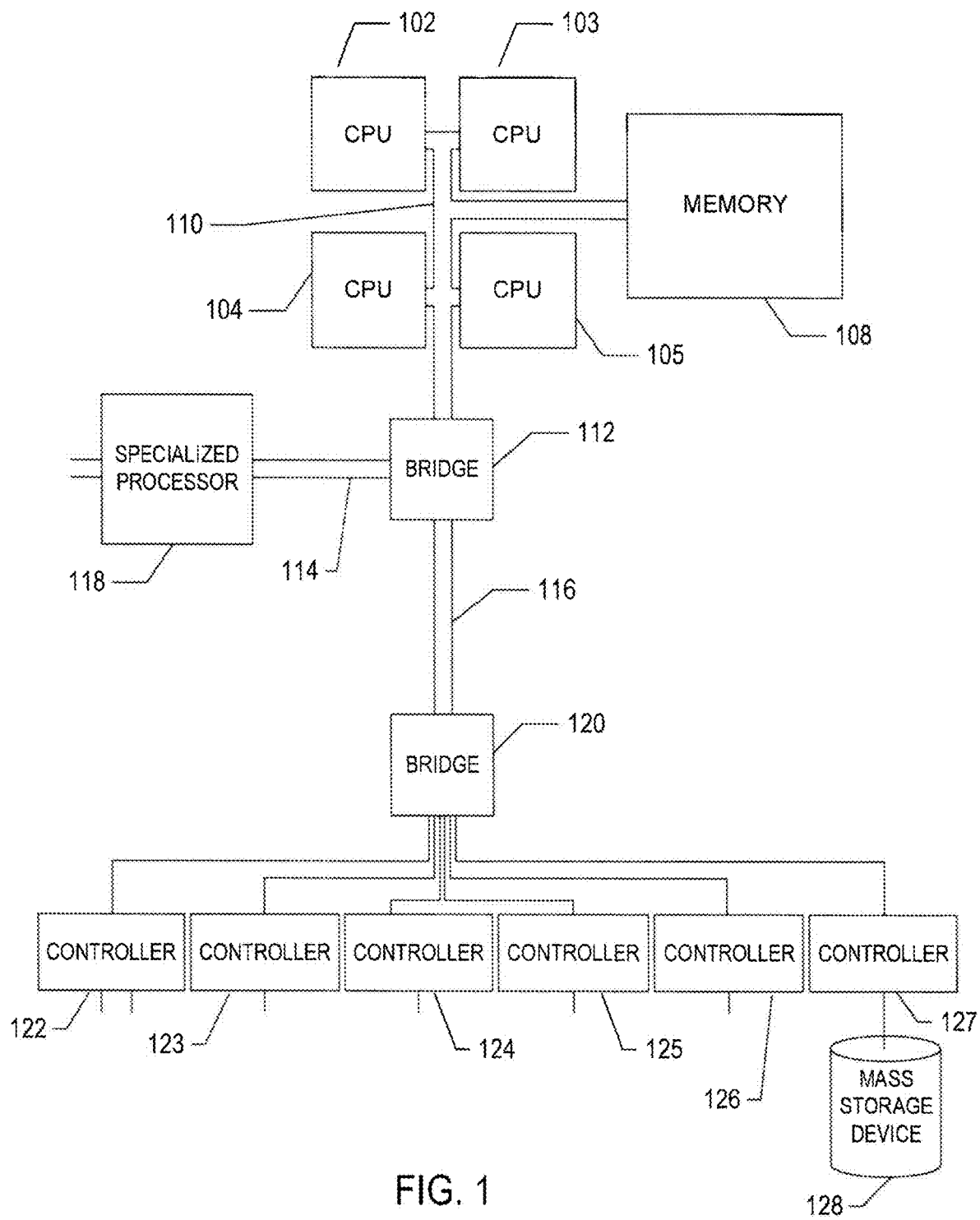
FIG. 1 shows an architectural diagram for various types of computers.

FIG. 1 shows a general architectural diagram for various types of computers. Computers that receive, process, and store event information as described below may be described by the general architectural diagram shown in FIG. 1, for example. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational devices. It should be noted that computer-readable data storage devices include optical and electromagnetic disks, electronic memories, and other physical data storage devices.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of server computers and workstations, and higher-end mainframe computers, but may also include a plethora of various types of special-purpose computing devices, including data-storage systems, communications routers, network nodes, tablet computers, and mobile telephones.

Figure 2:
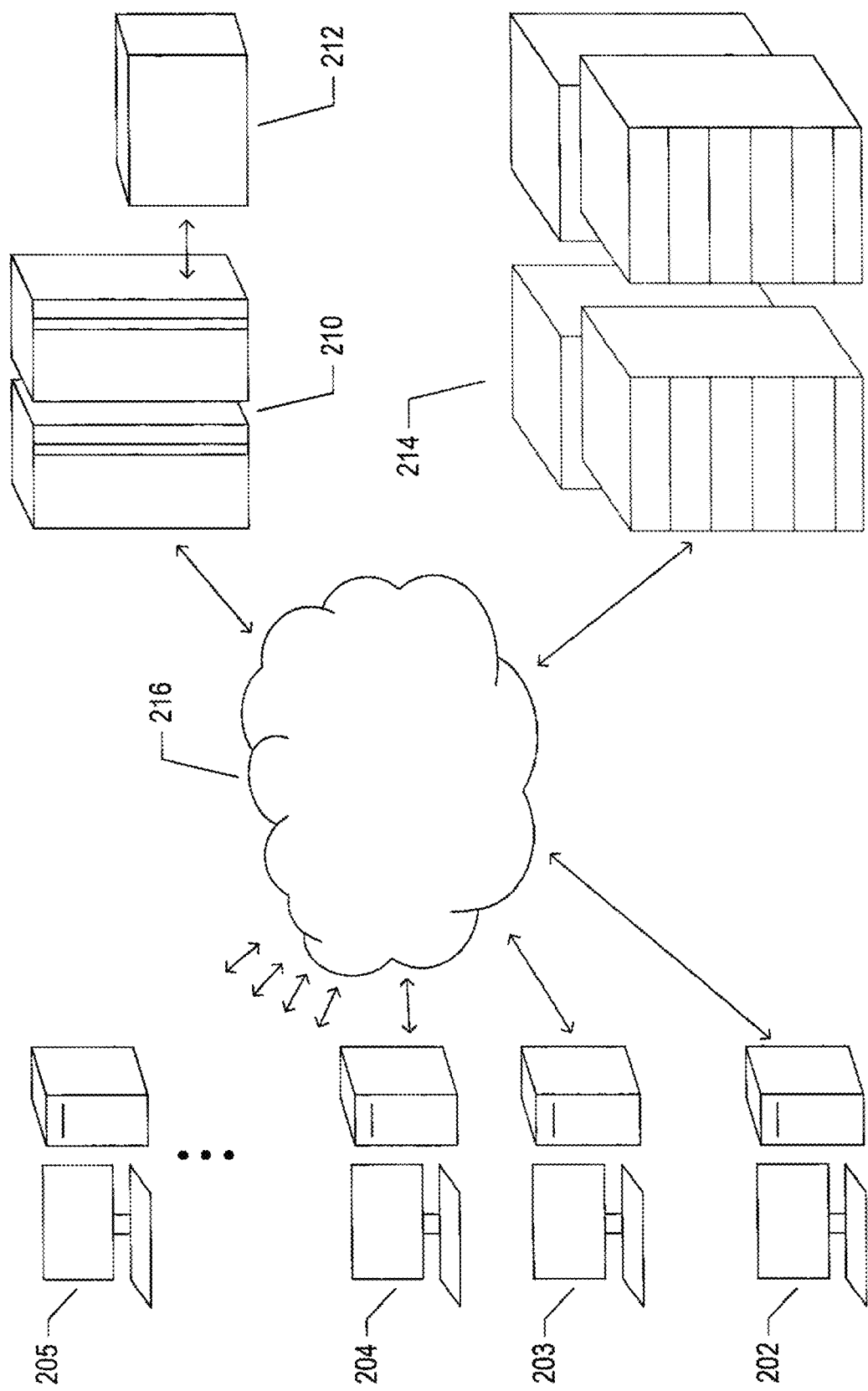
FIG. 2 shows an Internet-connected distributed computer system.

FIG. 2 shows an Internet-connected distributed computer system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which many PCs 202-205, a high-end distributed mainframe system 210 with a large data-storage system 212, and a large computer center 214 with large numbers of rack-mounted server computers or blade servers all interconnected through various communications and networking systems that together comprise the Internet 216. Such distributed computing systems provide diverse arrays of functionalities. For example, a PC user may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web server computers, back-end computer systems, and data-storage systems for serving web pages to remote customers, receiving orders through the web-page interface, processing the orders, tracking completed orders, and other myriad different tasks associated with an e-commerce enterprise.

Figure 3:
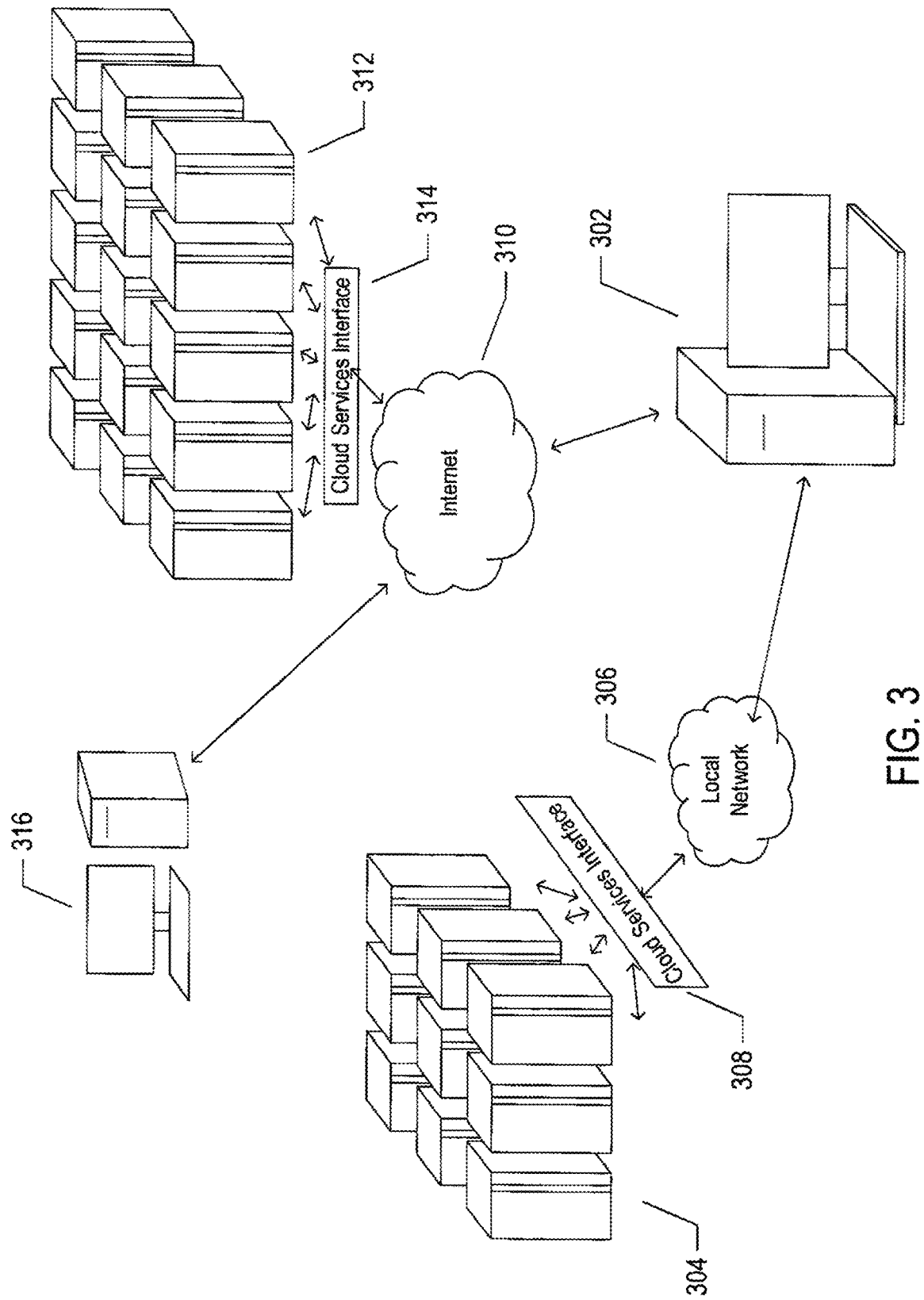
FIG. 3 shows cloud computing.

FIG. 3 shows cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the devices to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
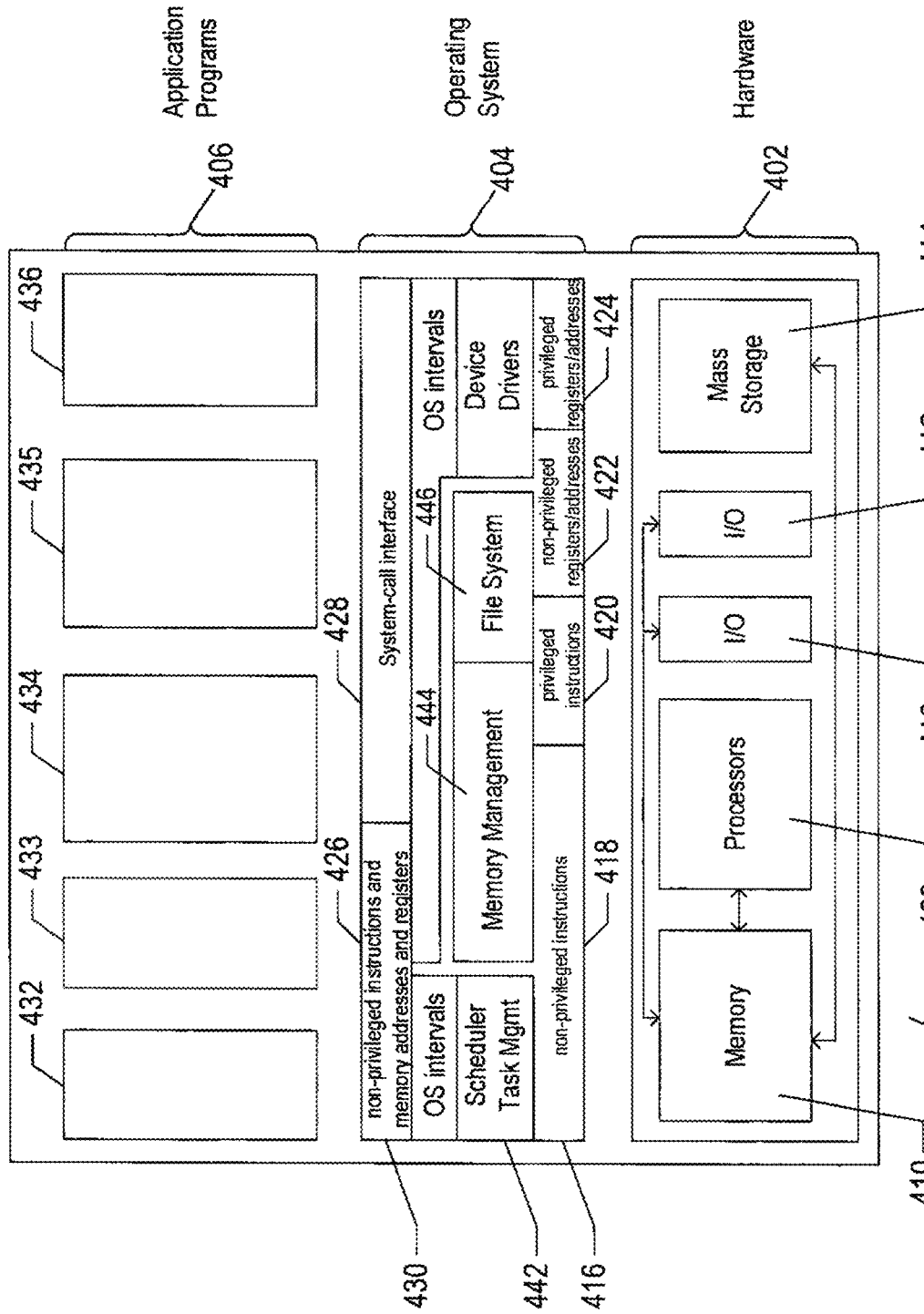
FIG. 4 shows generalized hardware and software components of a general-purpose computer system.

FIG. 4 shows generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor devices and other system devices with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 446 facilitates abstraction of mass-storage-device and memory devices as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems and can therefore be executed within only a subset of the different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
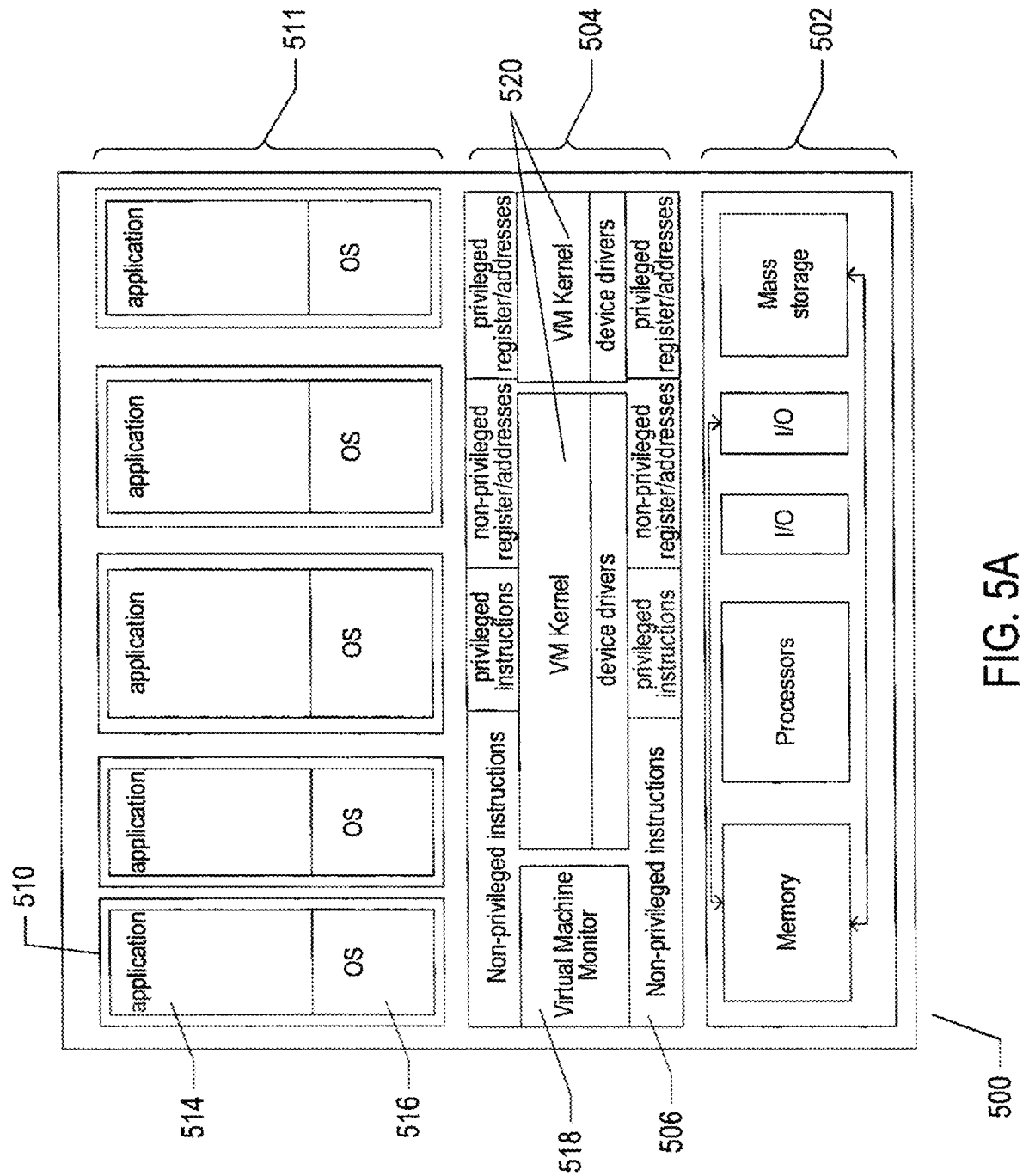
FIGS. 5A-5B show two types of virtual machine ("VM") and VM execution environments.
Figure 5B:
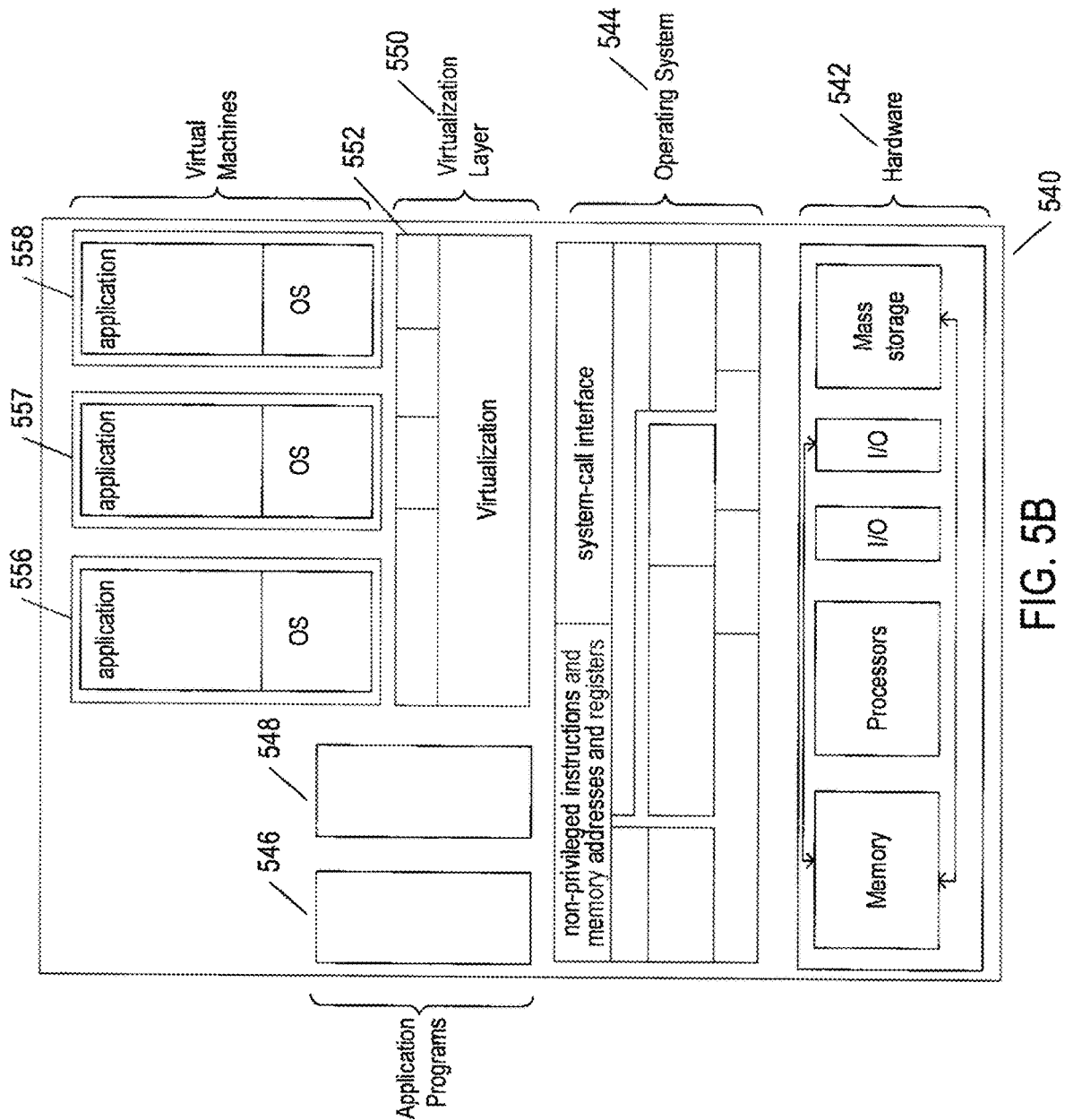

For all of these reasons, a higher level of abstraction, referred to as the "virtual machine," ("VM") has been developed and evolved to further abstract computer hardware in order to address many difficulties and challenges associated with traditional computing systems, including the compatibility issues discussed above. FIGS. 5A-B show two types of VM and virtual-machine execution environments. Figures 5A-B use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment shown in FIG. 5A features a virtualization layer 504 that interfaces through a virtualization-layer/hardware-layer interface 506, equivalent to interface 416 in FIG. 4, to the hardware. The virtualization layer 504 provides a hardware-like interface to VMs, such as VM 510, in a virtual-machine layer 511 executing above the virtualization layer 504. Each VM includes one or more application programs or other higher-level computational entities packaged together with an operating system, referred to as a "guest operating system," such as application 514 and guest operating system 516 packaged together within VM 510. Each VM is thus equivalent to the operating-system layer 404 and application-program layer 406 in the general-purpose computer system shown in FIG. 4. Each guest operating system within a VM interfaces to the virtualization layer interface 504 rather than to the actual hardware interface 506. The virtualization layer 504 partitions hardware devices into abstract virtual-hardware layers to which each guest operating system within a VM interfaces. The guest operating systems within the VMs, in general, are unaware of the virtualization layer and operate as if they were directly accessing a true hardware interface. The virtualization layer 504 ensures that each of the VMs currently executing within the virtual environment receive a fair allocation of underlying hardware devices and that all VMs receive sufficient devices to progress in execution. The virtualization layer 504 may differ for different guest operating systems. For example, the virtualization layer is generally able to provide virtual hardware interfaces for a variety of different types of computer hardware. This allows, as one example, a VM that includes a guest operating system designed for a particular computer architecture to run on hardware of a different architecture. The number of VMs need not be equal to the number of physical processors or even a multiple of the number of processors.

The virtualization layer 504 includes a virtual-machine-monitor module 518 ("VMM") that virtualizes physical processors in the hardware layer to create virtual processors on which each of the VMs executes. For execution efficiency, the virtualization layer attempts to allow VMs to directly execute non-privileged instructions and to directly access non-privileged registers and memory. However, when the guest operating system within a VM accesses virtual privileged instructions, virtual privileged registers, and virtual privileged memory through the virtualization layer 504, the accesses result in execution of virtualization-layer code to simulate or emulate the privileged devices. The virtualization layer additionally includes a kernel module 520 that manages memory, communications, and data-storage machine devices on behalf of executing VMs ("VM kernel"). The VM kernel, for example, maintains shadow page tables on each VM so that hardware-level virtual-memory facilities can be used to process memory accesses. The VM kernel additionally includes routines that implement virtual communications and data storage devices as well as device drivers that directly control the operation of underlying hardware communications and data storage devices. Similarly, the VM kernel virtualizes various other types of I/O devices, including keyboards, optical-disk drives, and other such devices. The virtualization layer 504 essentially schedules execution of VMs much like an operating system schedules execution of application programs, so that the VMs each execute within a complete and fully functional virtual hardware layer.

FIG. 5B shows a second type of virtualization. In FIG. 5B, the computer system 540 includes the same hardware layer 542 and operating system layer 544 as the hardware layer 402 and the operating system layer 404 shown in FIG. 4. Several application programs 546 and 548 are shown running in the execution environment provided by the operating system 544. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 506 in FIG. 5A. The hardware-layer interface 552, equivalent to interface 416 in FIG. 4, provides an execution environment for VMs 556-558, each including one or more application programs or other higher-level computational entities packaged together with a guest operating system.

In FIGS. 5A-5B, the layers are somewhat simplified for clarity of illustration. For example, portions of the virtualization layer 550 may reside within the host-operating-system kernel, such as a specialized driver incorporated into the host operating system to facilitate hardware access by the virtualization layer.

It should be noted that virtual hardware layers, virtualization layers, and guest operating systems are all physical entities that are implemented by computer instructions stored in physical data storage devices, including electronic memories, mass-storage devices, optical disks, magnetic disks, and other such devices. The term "virtual" does not, in any way, imply that virtual hardware layers, virtualization layers, and guest operating systems are abstract or intangible. Virtual hardware layers, virtualization layers, and guest operating systems execute on physical processors of physical computer systems and control operation of the physical computer systems, including operations that alter the physical states of physical devices, including electronic memories and mass-storage devices. They are as physical and tangible as any other component of a computer since, such as power supplies, controllers, processors, busses, and data storage devices.

Figure 6:
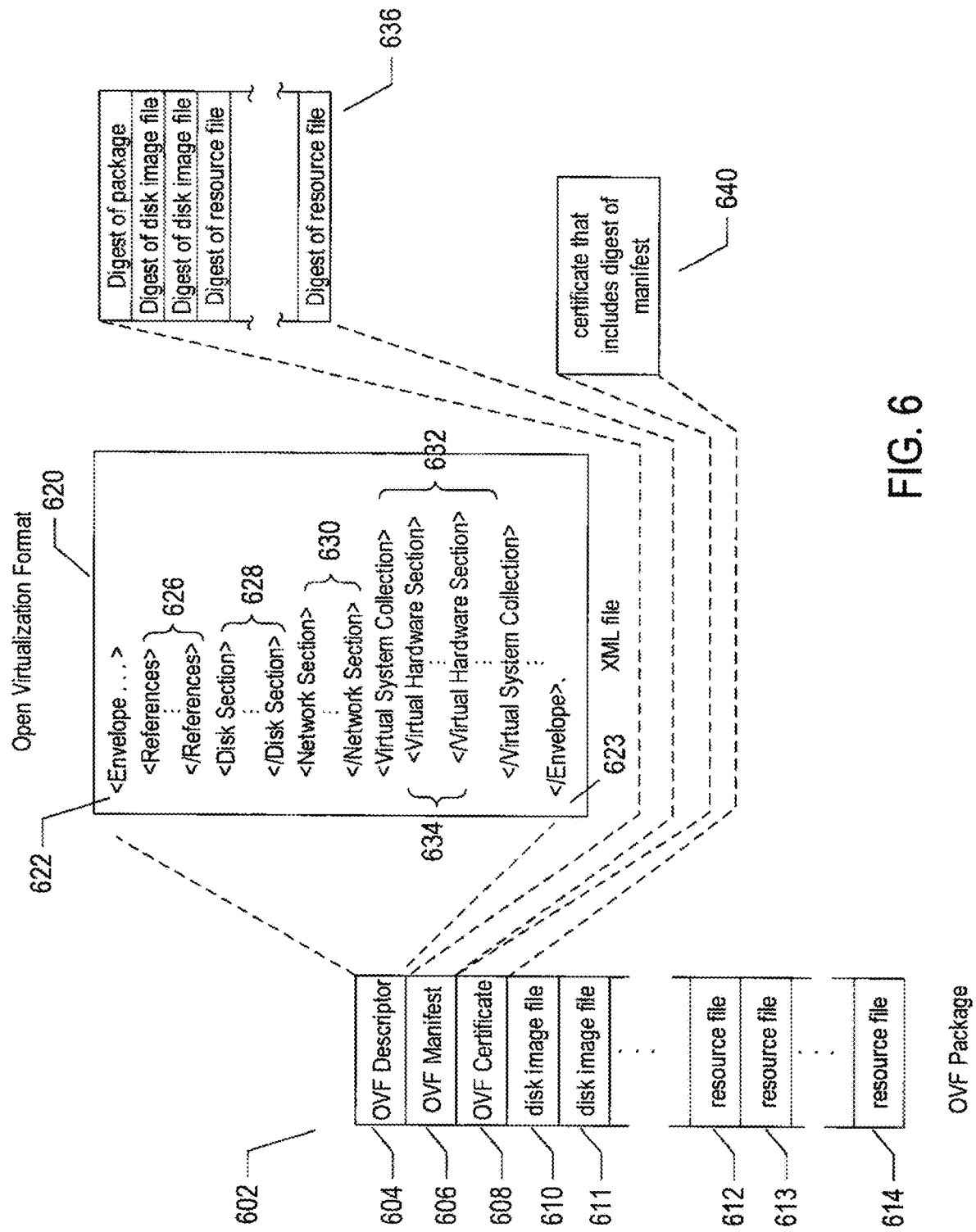
FIG. 6 shows an example of an open virtualization format package.

A VM or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a VM within one or more data files. FIG. 6 shows an OVF package.

An OVF package 602 includes an OVF descriptor 604, an OVF manifest 606, an OVF certificate 608, one or more disk-image files 610-611, and one or more device files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a network section 630 that includes meta information about all of the logical networks included in the OVF package, and a collection of virtual-machine configurations 632 which further includes hardware descriptions of each VM 634. There are many additional hierarchical levels and elements within a typical OVF descriptor. The OVF descriptor is thus a self-describing, XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual disks and device files 612 are digitally encoded content, such as operating-system images. A VM or a collection of VMs encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more VMs that is encoded within an OVF package.

The advent of VMs and virtual environments has alleviated many of the difficulties and challenges associated with traditional general-purpose computing. Machine and operating-system dependencies can be significantly reduced or eliminated by packaging applications and operating systems together as VMs and virtual appliances that execute within virtual environments provided by virtualization layers running on many different types of computer hardware. A next level of abstraction, referred to as virtual data centers or virtual infrastructure, provide a data-center interface to virtual data centers computationally constructed within physical data centers.

Figure 7:
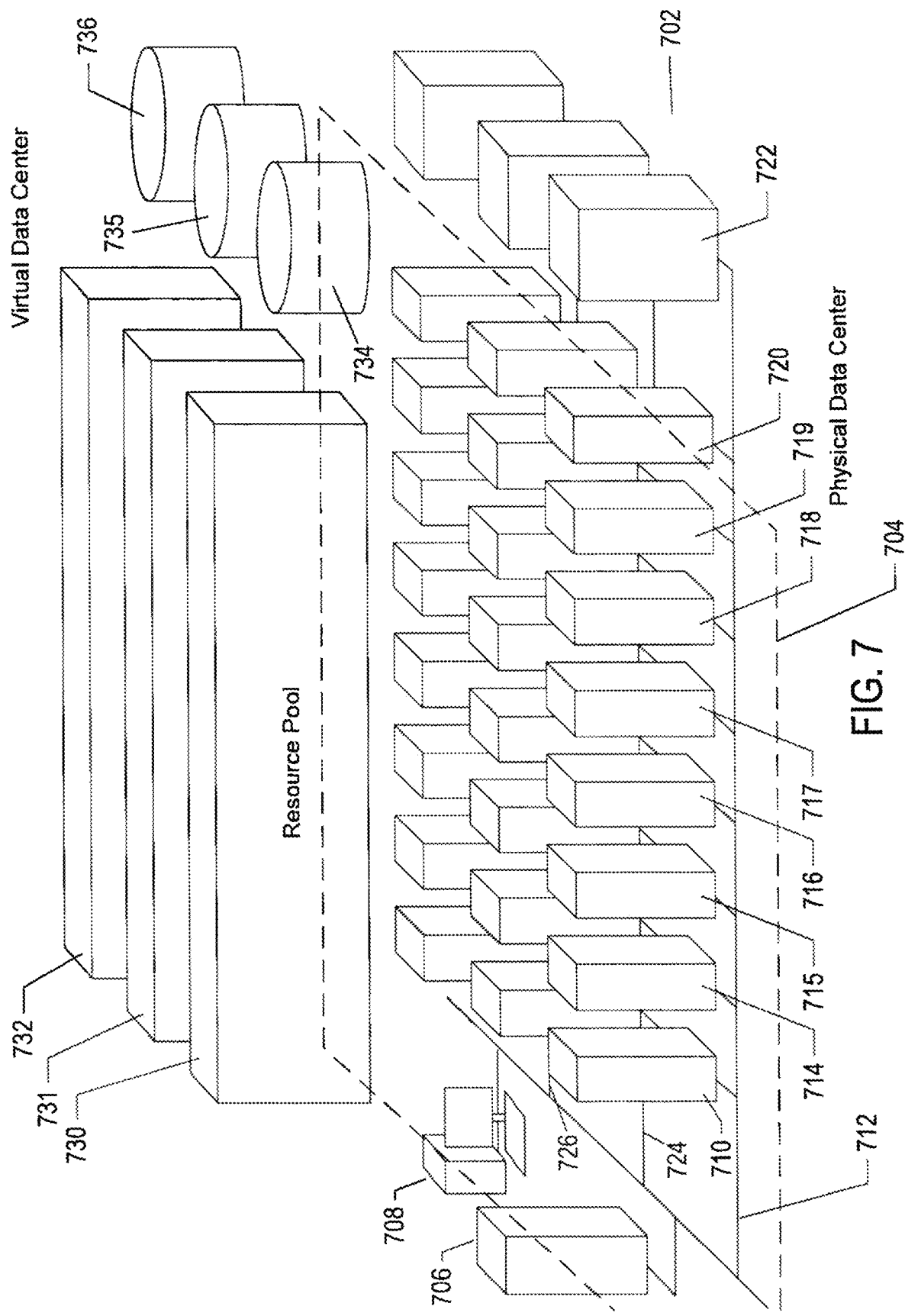
FIG. 7 shows example virtual data centers provided as an abstraction of underlying physical-data-center hardware components.

FIG. 7 shows virtual data centers provided as an abstraction of underlying physical-data-center hardware components. In FIG. 7, a physical data center 702 is shown below a virtual-interface plane 704. The physical data center consists of a virtual-data-center management server computer 706 and any of various different computers, such as PC 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight server computers and a mass-storage array. The individual server computers, such as server computer 710, each includes a virtualization layer and runs multiple VMs. Different physical data centers may include many different types of computers, networks, data-storage systems and devices connected according to many different types of connection topologies. The virtual-interface plane 704, a logical abstraction layer shown by a plane in FIG. 7, abstracts the physical data center to a virtual data center comprising one or more device pools, such as device pools 730-732, one or more virtual data stores, such as virtual data stores 734-736, and one or more virtual networks. In certain implementations, the device pools abstract banks of server computers directly interconnected by a local area network.

The virtual-data-center management interface allows provisioning and launching of VMs with respect to device pools, virtual data stores, and virtual networks, so that virtual-data-center administrators need not be concerned with the identities of physical-data-center components used to execute particular VMs. Furthermore, the virtual-data-center management server computer 706 includes functionality to migrate running VMs from one server computer to another in order to optimally or near optimally manage device allocation, provides fault tolerance, and high availability by migrating VMs to most effectively utilize underlying physical hardware devices, to replace VMs disabled by physical hardware problems and failures, and to ensure that multiple VMs supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of VMs and virtual appliances as well as to provide high-level, distributed functionalities that involve pooling the devices of individual server computers and migrating VMs among server computers to achieve load balancing, fault tolerance, and high availability.

Figure 8:
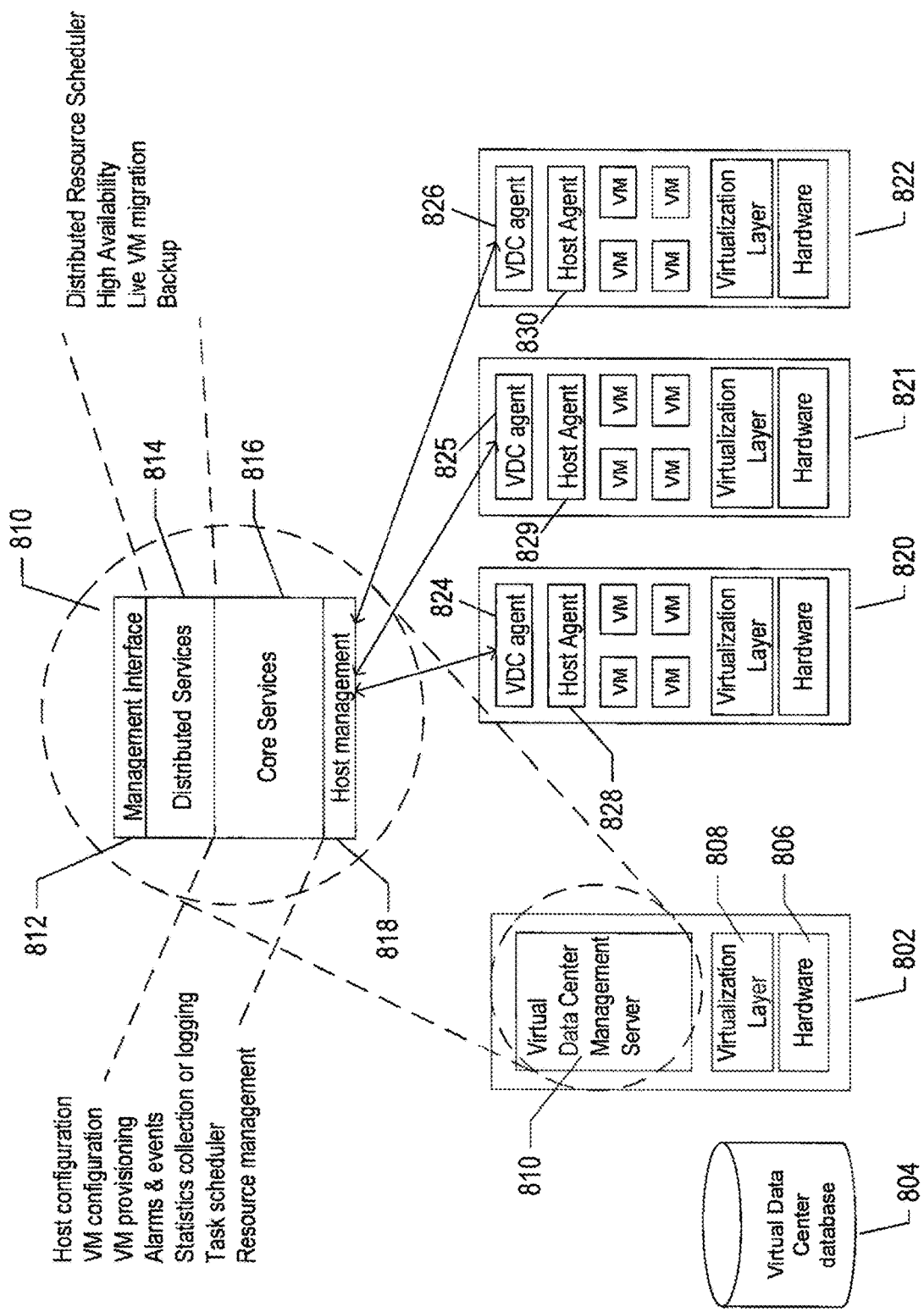
FIG. 8 shows virtual-machine components of a virtual-data-center management server and physical servers of a physical data center.

FIG. 8 shows virtual-machine components of a virtual-data-center management server computer and physical server computers of a physical data center above which a virtual-data-center interface is provided by the virtual-data-center management server computer. The virtual-data-center management server computer 802 and a virtual-data-center database 804 comprise the physical components of the management component of the virtual data center. The virtual-data-center management server computer 802 includes a hardware layer 806 and virtualization layer 808 and runs a virtual-data-center management-server VM 810 above the virtualization layer. Although shown as a single server computer in FIG. 8, the virtual-data-center management server computer ("VDC management server") may include two or more physical server computers that support multiple VDC-management-server virtual appliances. The virtual-data-center management-server VM 810 includes a management-interface component 812, distributed services 814, core services 816, and a host-management interface 818. The host-management interface 818 is accessed from any of various computers, such as the PC 708 shown in FIG. 7. The host-management interface 818 allows the virtual-data-center administrator to configure a virtual data center, provision VMs, collect statistics and view log files for the virtual data center, and to carry out other, similar management tasks. The host-management interface 818 interfaces to virtual-data-center agents 824, 825, and 826 that execute as VMs within each of the server computers of the physical data center that is abstracted to a virtual data center by the VDC management server computer.

The distributed services 814 include a distributed-device scheduler that assigns VMs to execute within particular physical server computers and that migrates VMs in order to most effectively make use of computational bandwidths, data-storage capacities, and network capacities of the physical data center. The distributed services 814 further include a high-availability service that replicates and migrates VMs in order to ensure that VMs continue to execute despite problems and failures experienced by physical hardware components. The distributed services 814 also include a live-virtual-machine migration service that temporarily halts execution of a VM, encapsulates the VM in an OVF package, transmits the OVF package to a different physical server computer, and restarts the VM on the different physical server computer from a virtual-machine state recorded when execution of the VM was halted. The distributed services 814 also include a distributed backup service that provides centralized virtual-machine backup and restore.

The core services 816 provided by the VDC management server VM 810 include host configuration, virtual-machine configuration, virtual-machine provisioning, generation of virtual-data-center alerts and events, ongoing event logging and statistics collection, a task scheduler, and a device-management module. Each physical server computers 820-822 also includes a host-agent VM 828-830 through which the virtualization layer can be accessed via a virtual-infrastructure application programming interface ("API"). This interface allows a remote administrator or user to manage an individual server computer through the infrastructure API. The virtual-data-center agents 824-826 access virtualization-layer server information through the host agents. The virtual-data-center agents are primarily responsible for off-loading certain of the virtual-data-center management-server functions specific to a particular physical server to that physical server computer. The virtual-data-center agents relay and enforce device allocations made by the VDC management server VM 810, relay virtual-machine provisioning and configuration-change commands to host agents, monitor and collect performance statistics, alerts, and events communicated to the virtual-data-center agents by the local host agents through the interface API, and to carry out other, similar virtual-data-management tasks.

The virtual-data-center abstraction provides a convenient and efficient level of abstraction for exposing the computational devices of a cloud-computing facility to cloud-computing-infrastructure users. A cloud-director management server exposes virtual devices of a cloud-computing facility to cloud-computing-infrastructure users. In addition, the cloud director introduces a multi-tenancy layer of abstraction, which partitions VDCs into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 9:
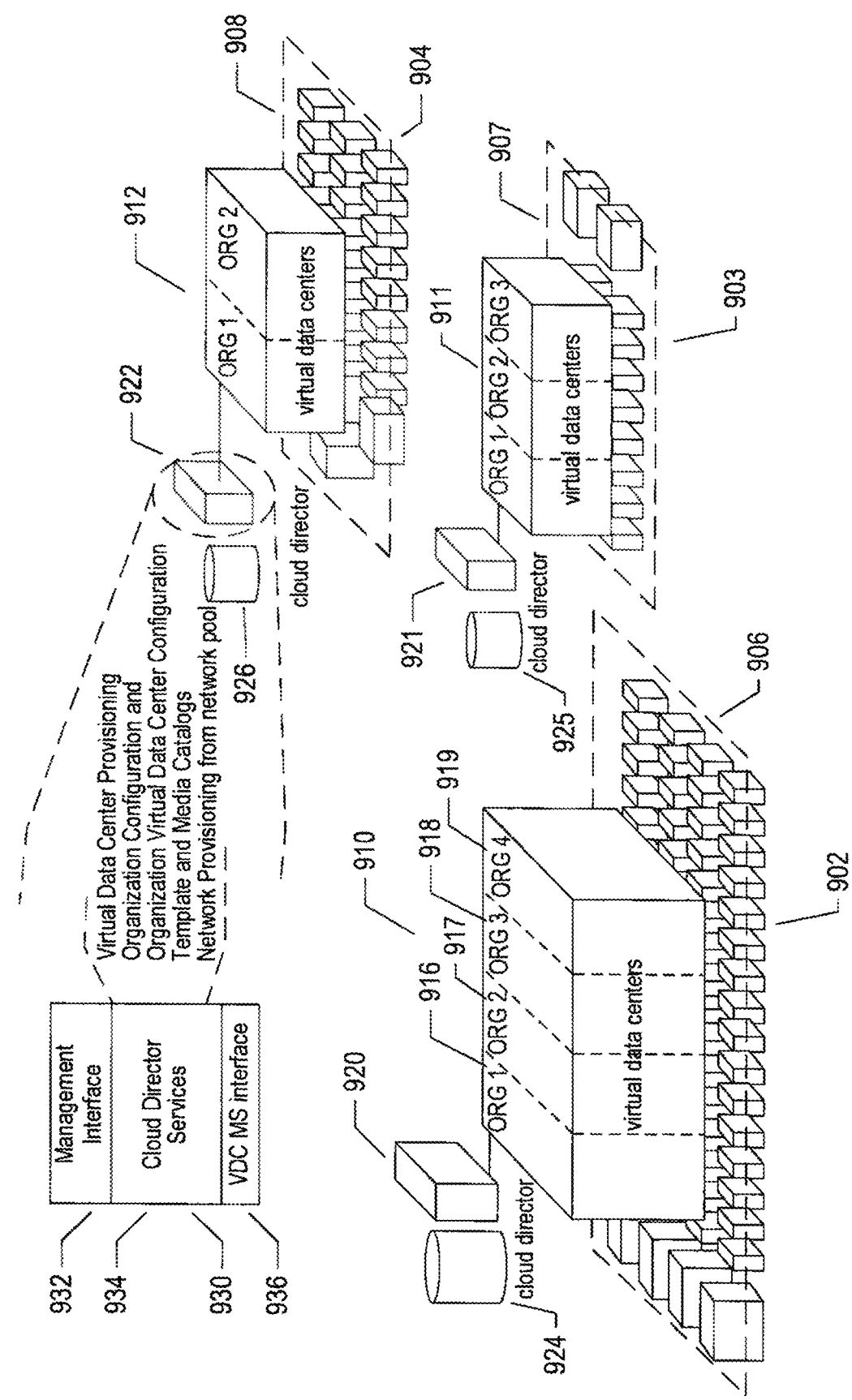
FIG. 9 shows a cloud-director level of abstraction.

FIG. 9 shows a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The devices of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director server computers 920-922 and associated cloud-director databases 924-926. Each cloud-director server computer or server computers runs a cloud-director virtual appliance 930 that includes a cloud-director management interface 932, a set of cloud-director services 934, and a virtual-data-center management-server interface 936. The cloud-director services include an interface and tools for provisioning multi-tenant virtual data center virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are VMs that each contains an OS and/or one or more VMs containing applications. A template may include much of the detailed contents of VMs and virtual appliances that are encoded within OVF packages, so that the task of configuring a VM or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 7 and 9, the VDC-server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

Figure 10:
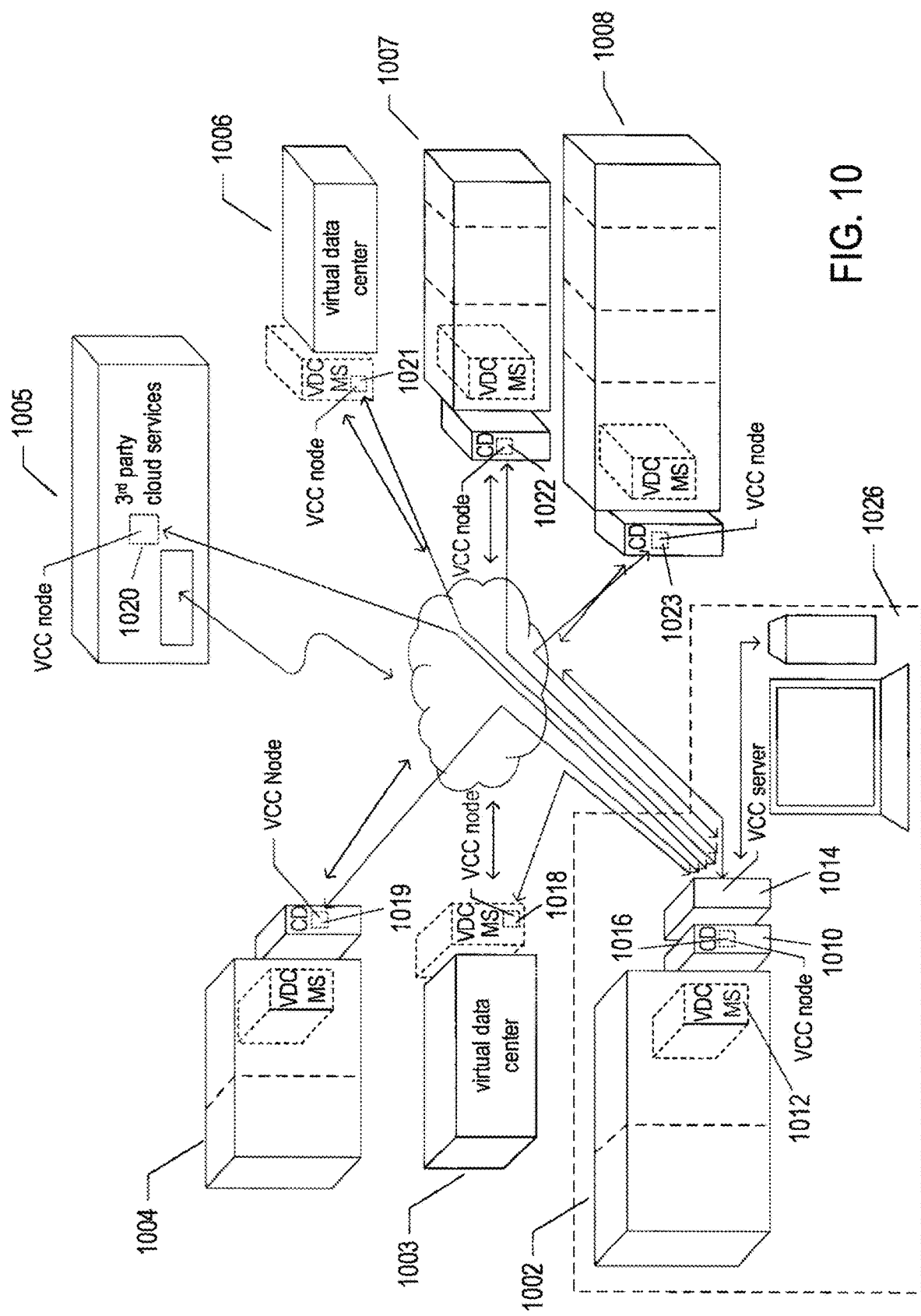
FIG. 10 shows virtual-cloud-connector nodes.

FIG. 10 shows virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 10, seven different cloud-computing facilities are shown 1002-1008. Cloud-computing facility 1002 is a private multi-tenant cloud with a cloud director 1010 that interfaces to a VDC management server 1012 to provide a multi-tenant private cloud comprising multiple tenant-associated virtual data centers. The remaining cloud-computing facilities 1003-1008 may be either public or private cloud-computing facilities and may be single-tenant virtual data centers, such as virtual data centers 1003 and 1006, multi-tenant virtual data centers, such as multi-tenant virtual data centers 1004 and 1007-1008, or any of various different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VDC management server that manages a single-tenant private cloud. The VCC server 1014 additionally interfaces, through the Internet, to VCC node virtual appliances executing within remote VDC management servers, remote cloud directors, or within the third-party cloud services 1018-1023. The VCC server provides a VCC server interface that can be displayed on a local or remote terminal, PC, or other computer system 1026 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

As mentioned above, while the virtual-machine-based virtualization layers, described in the previous subsection, have received widespread adoption and use in a variety of different environments, from personal computers to enormous distributed computing systems, traditional virtualization technologies are associated with computational overheads. While these computational overheads have steadily decreased, over the years, and often represent ten percent or less of the total computational bandwidth consumed by an application running above a guest operating system in a virtualized environment, traditional virtualization technologies nonetheless involve computational costs in return for the power and flexibility that they provide.

While a traditional virtualization layer can simulate the hardware interface expected by any of many different operating systems, OSL virtualization essentially provides a secure partition of the execution environment provided by a particular operating system. As one example, OSL virtualization provides a file system to each container, but the file system provided to the container is essentially a view of a partition of the general file system provided by the underlying operating system of the host. In essence, OSL virtualization uses operating-system features, such as namespace isolation, to isolate each container from the other containers running on the same host. In other words, namespace isolation ensures that each application is executed within the execution environment provided by a container to be isolated from applications executing within the execution environments provided by the other containers. A container cannot access files that are not included in the container's namespace and cannot interact with applications running in other containers. As a result, a container can be booted up much faster than a VM, because the container uses operating-system-kernel features that are already available and functioning within the host. Furthermore, the containers share computational bandwidth, memory, network bandwidth, and other computational resources provided by the operating system, without the overhead associated with computational resources allocated to VMs and virtualization layers. Again, however, OSL virtualization does not provide many desirable features of traditional virtualization. As mentioned above. OSL virtualization does not provide a way to run different types of operating systems for different groups of containers within the same host and OSL-virtualization does not provide for live migration of containers between hosts, high-availability functionality, distributed resource scheduling, and other computational functionality provided by traditional virtualization technologies.

Figure 11:
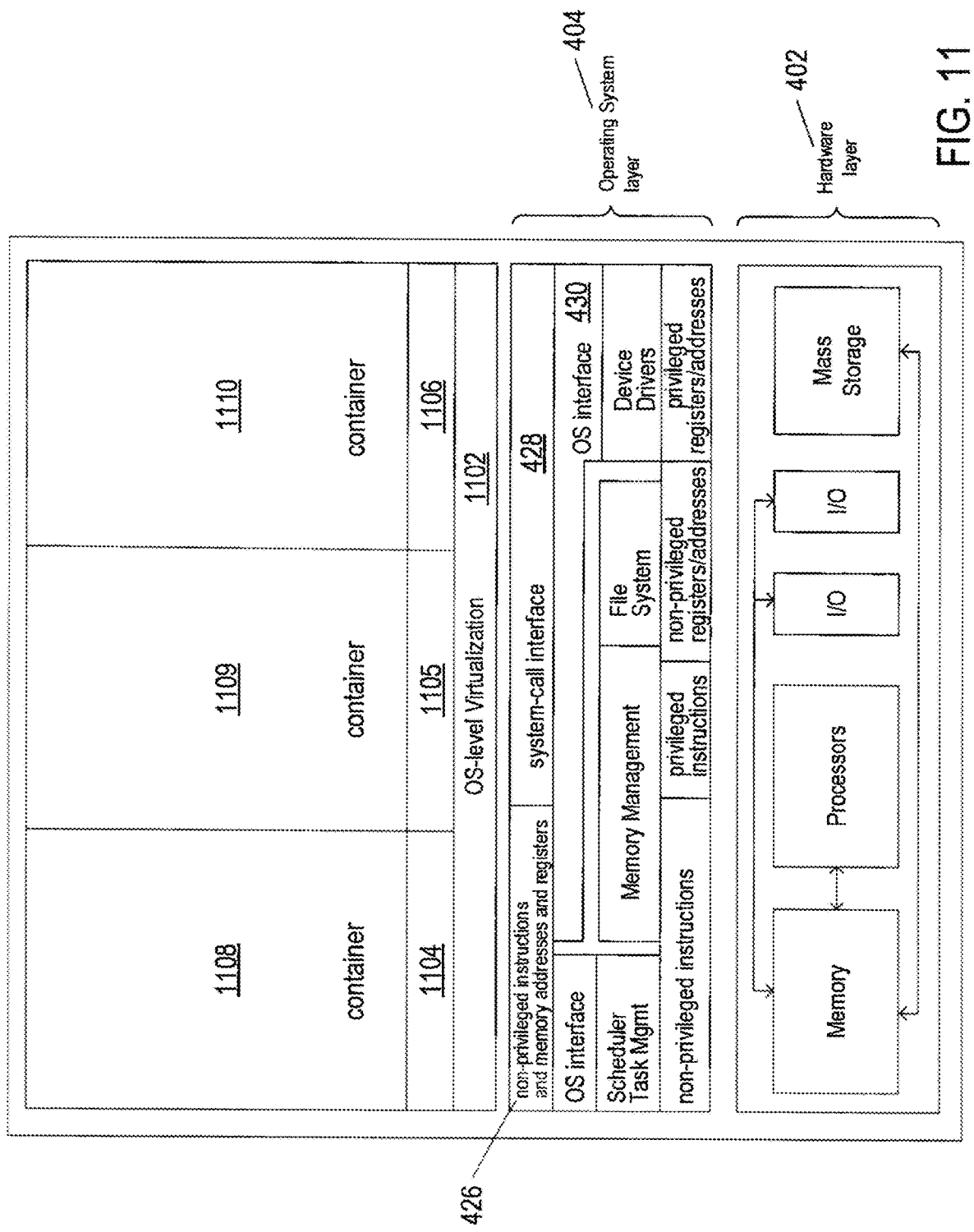
FIG. 11 shows an example server computer used to host three containers.

FIG. 11 shows an example server computer used to host three containers. As discussed above with reference to FIG. 4, an operating system layer 404 runs above the hardware 402 of the host computer. The operating system provides an interface, for higher-level computational entities, that includes a system-call interface 428 and the non-privileged instructions, memory addresses, and registers 426 provided by the hardware layer 402. However, unlike in FIG. 4, in which applications run directly above the operating system layer 404, OSL virtualization involves an OSL virtualization layer 1102 that provides operating-system interfaces 1104-1106 to each of the containers 1108-1110. The containers, in turn, provide an execution environment for an application that runs within the execution environment provided by container 1108. The container can be thought of as a partition of the resources generally available to higher-level computational entities through the operating system interface 430.

Figure 12:
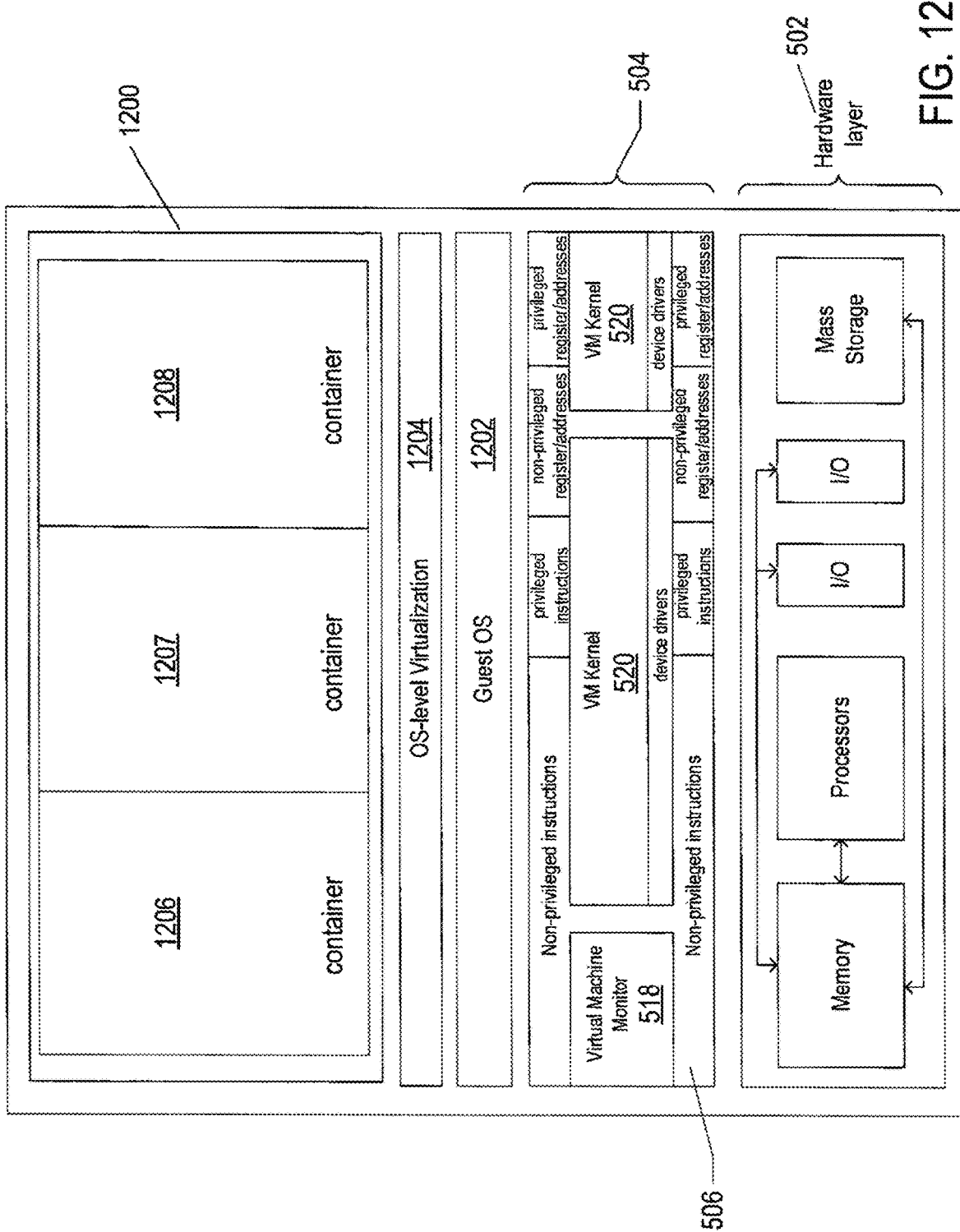
FIG. 12 shows an approach to implementing containers on a VM.

FIG. 12 shows an approach to implementing the containers on a VM. FIG. 12 shows a host computer similar to that shown in FIG. 5A, discussed above. The host computer includes a hardware layer 502 and a virtualization layer 504 that provides a virtual hardware interface 508 to a guest operating system 1102. Unlike in FIG. 5A, the guest operating system interfaces to an OSL-virtualization layer 1104 that provides container execution environments 1206-1208 to multiple application programs.

Note that, although only a single guest operating system and OSL virtualization layer are shown in FIG. 12, a single virtualized host system can run multiple different guest operating systems within multiple VMs, each of which supports one or more OSL-virtualization containers. A virtualized, distributed computing system that uses guest operating systems running within VMs to support OSL-virtualization layers to provide containers for running applications is referred to, in the following discussion, as a "hybrid virtualized distributed computing system."

Running containers above a guest operating system within a VM provides advantages of traditional virtualization in addition to the advantages of OSL virtualization. Containers can be quickly booted in order to provide additional execution environments and associated resources for additional application instances. The resources available to the guest operating system are efficiently partitioned among the containers provided by the OSL-virtualization layer 1204 in FIG. 12, because there is almost no additional computational overhead associated with container-based partitioning of computational resources. However, many of the powerful and flexible features of the traditional virtualization technology can be applied to VMs in which containers run above guest operating systems, including live migration from one host to another, various types of high-availability and distributed resource scheduling, and other such features. Containers provide share-based allocation of computational resources to groups of applications with guaranteed isolation of applications in one container from applications in the remaining containers executing above a guest operating system. Moreover, resource allocation can be modified at run time between containers. The traditional virtualization layer provides for flexible and scaling over large numbers of hosts within large, distributed computing systems and a simple approach to operating-system upgrades and patches. Thus, the use of OSL virtualization above traditional virtualization in a hybrid virtualized distributed computing system, as shown in FIG. 12, provides many of the advantages of both a traditional virtualization layer and the advantages of OSL virtualization.

Computer Implemented Methods and Systems for Reducing the Amount of Data Sent from Edge Systems to a Data Center Organizations typically use data centers to store and process data produced by computer systems, sensors, and Internet of Things ("IOT") devices located outside of data centers. IOT devices, such as automobiles, cameras, security devices, health monitors, appliances, watches, and tracking devices, collect and exchange data in real time using embedded sensors. These outside computer systems, sensors, and IOT devices form the edge of a distributing computing system. An edge system of a distributed computing system has one or more central data processing and data storage computing systems and one or more edge devices that send data to and receive data from a central data processing and data storage computing system. In the following discussion, an edge device is a device with an operating system that serves as an interface between the hardware of the device and programs running on the device. In other words, sensors and IOT devices that have operating systems are edge devices. Other sensors and IOT devices of the distributed computing system that do not have operating systems are not edge devices.

Figure 13:
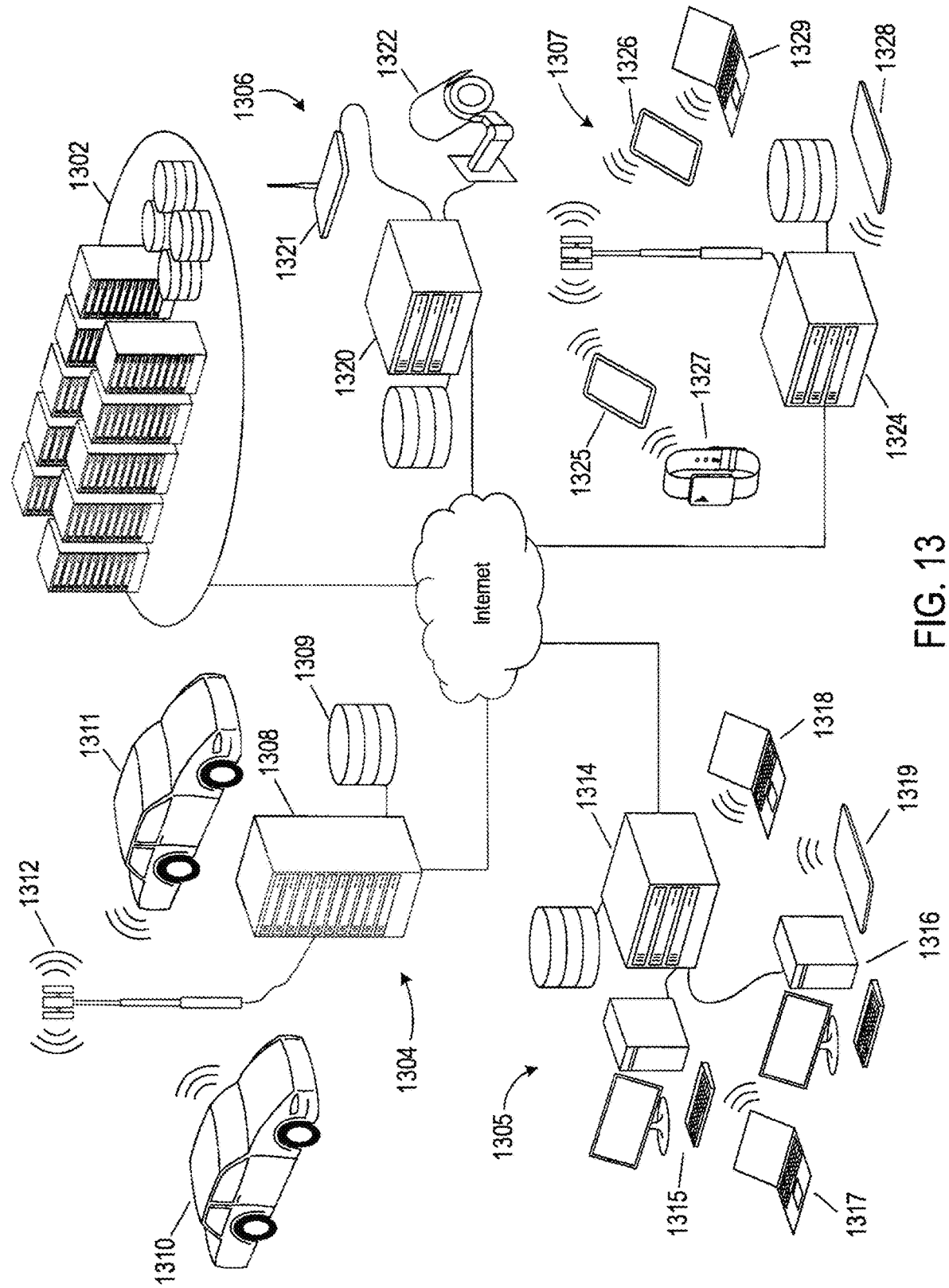
FIG. 13 shows an example of a distributed computing system infrastructure with various edge devices.

FIG. 13 shows an example of a distributed computing system infrastructure with various kinds of edge systems and edge devices. The distributed computing system includes a data center 1302 and examples of edge systems 1304-1307 that send information to the data center 1302 for storage and management of services. The edge systems 1304-1307 comprise computer systems and various different types of IOT devices. The data center 1302 may be operated and maintained by a cloud vendor that provides data processing and data storage to data center tenants, such as the organizations that own the example edge systems 1304-1307. Each edge system includes edge devices and data storage devices. In edge system 1304, the edge devices include a computer system 1308, data storage 1309, and automobiles 1310 and 1311. The example computer system 1308 and data storage 1309 may be owned by an automobile manufacturer that processes and stores data that is generated by sensors and onboard computers of automobiles that are sold by the manufacturer. The data is received by the computer system 1308 over a cell network 1312. Edge devices of edge system 1305 include a computer system 1314, computers 1315-1316, laptops 1317-1318, and a tablet 1319 that are owned by a company or government. Edge system 1306 comprises a computer system 1320 that receives data from a wireless router 1321 and a camera 1322. In this example, the wireless router 1321 includes an operating system and is considered an edge device. On the other hand, the camera 1322 does not include an operating system is not considered an edge device. The edge system 1307 includes a computer system 1324 maintained by an internet service provider that receives, and stores data produced by mobile phones 1325-1326, a watch 1327, a tablet 1328, and a laptop computer 1329, which are edge devices.

In traditional practice, edge devices generate event information, such as log messages and/or metrics. The event information is often collected by an organization and is sent to a remote data center where the event information is stored and examined using management services, such as hybrid cloud services, cloud analytics services, endpoint services, engineering teams, and IOT services, to detect problems and identify the root cause of the problems at the edge systems. However, sending such large quantities of data to a remote data center creates time lags that negatively impact real-time projects and time-sensitive applications executing at edge devices of the edge systems. Centralization of event information has created issues such as vendor lock-in, infeasibly of large data storage and transfer costs, and organizations and edge device users lose ownership of the data sent to the data center vendors that may result in privacy and other data management issues.

Processes and systems described below are directed to computer-implemented agents that avoid centralization of event information produced at various edge devices in a remote data center. Each agent collects event information generated by event sources in the user space and the kernel space of the edge device. The event sources are log message sources and metric sources. The event information contains log messages and/or metrics generated by the log message and metric sources of the edge device. Each agent reduces the event information to relevant event information that summarizes the contents of the event information and contains far less data that the event information. The agent sends the relevant event information to the remote data center for storage and processing using external services provided by the vendor operator of the data center. The agents can be individually configured to collect selected types of event information and process the selected event information into relevant event information, thereby providing numerous advantages over traditional methods of simply sending all event information from the edge devices to the remote data center and using external services provided by the data center. Because the event information is processed locally by agents that are at the edge devices, the agents save on resources and costs of data storage and transmission to the data center. Agents can perform troubleshooting at the edge devices in real time, thereby avoiding the long delays in processing the same event information in a remote data center. Event information that is not helpful in identifying a root cause of a problem is excluded from the relevant event information and discarded at the edge device, which significantly reduces the amount of information stored at the edge and sent to the data center. Agents can be configured to generate alerts immediately after a problem is discovered in the relevant event information, rather than waiting for troubleshooting results from the remote data center. Alternatively, unwanted notifications to users can be reduced where isolated alerts at the edge devices are not reported to users. Instead, the relevant event information is sent to the external services of the data center where the relevant event information is compared to thresholds and the external services generate alerts at the edge devices where performance problems are detected.

Figure 14:
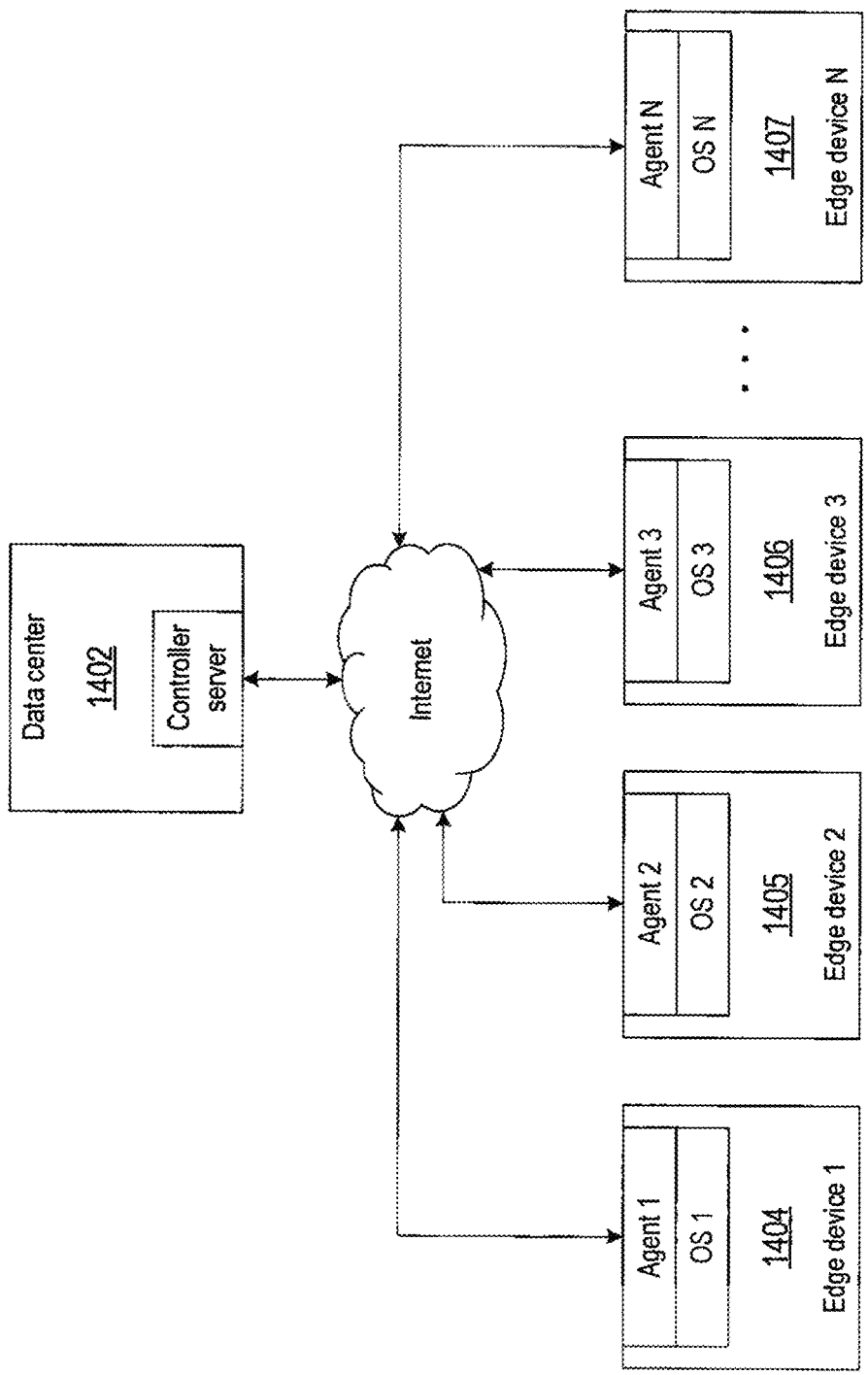
FIG. 14 shows an example of computer-implemented agents that are executed on edge devices of a distributed computing system.

FIG. 14 shows an example of computer-implemented agents that are executed on edge devices of one or more edge systems of a distributed computing system 1400. The distributed computing system 1400 includes a data center 1402 and N edge devices, such as edge devices 1404-1407, where N is a positive integer. The data center 1402 includes a controller server 1408 that sends commands to the N agents. Each edge device of the distributed computing system runs an operating system and includes an associated computer-implemented agent. Each agent runs on the operating system of an edge device and is configured to collect event information from the edge device and convert the event information into relevant event information using various algorithms described below with the flexibility of configuring a pipeline based upon the use-case allowing proactive computation on the edge of the distributed computing system but asynchronously sending only the relevant event information to the data center 1402.

Figure 15:
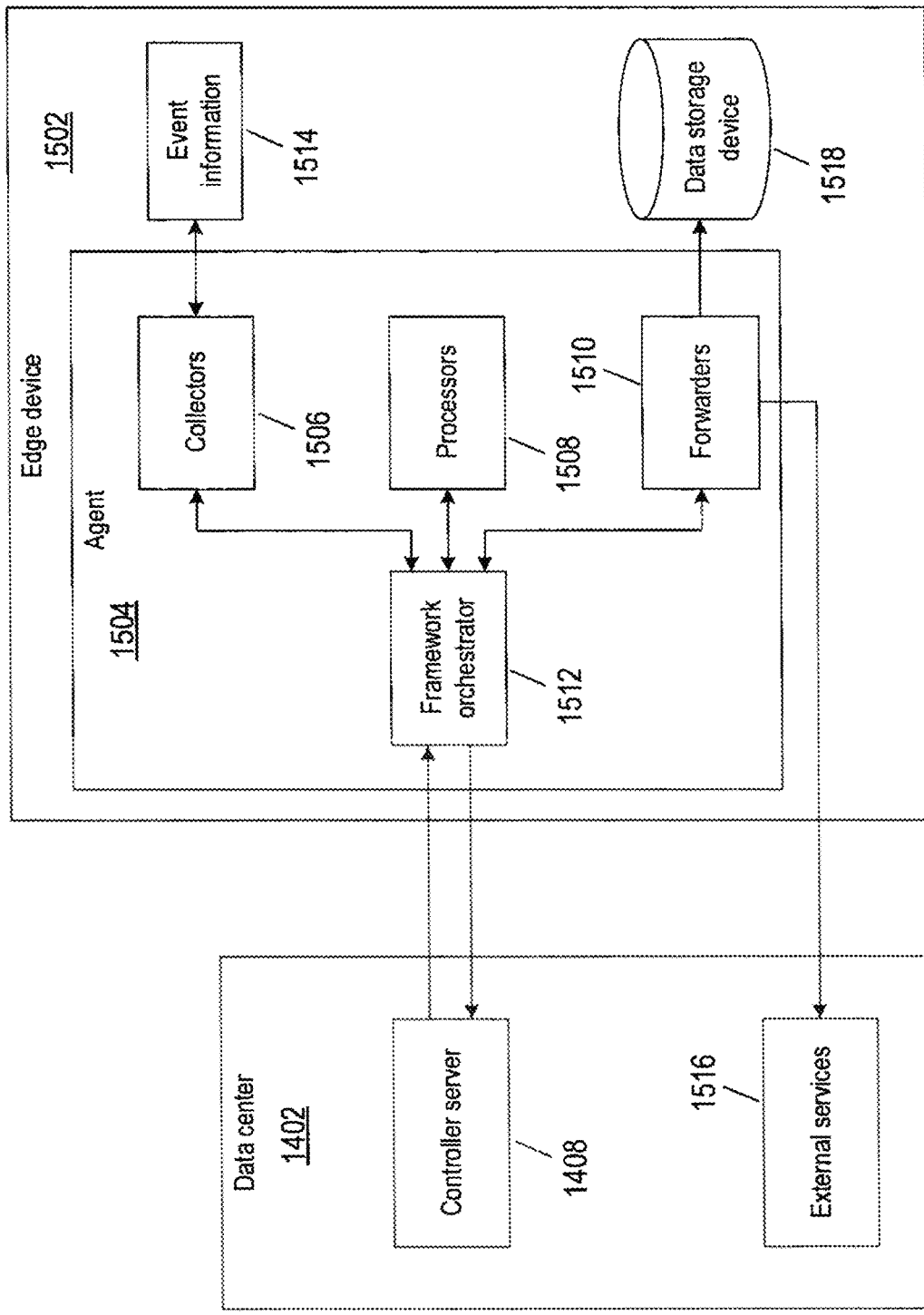
FIG. 15 shows an example of an edge device and components of an agent that runs on an operating system of the edge device.

FIG. 15 shows an example of an edge device 1502 and components of an agent 1504 that runs on the operating system of the edge device 1502. The agent 1504 includes one or more collectors 1506, one or more processors 1508, one or more forwarders 1510, and a framework orchestrator 1512. The framework orchestrator 1512 receives commands from the controller server 1408 and controls operation of the one or more collectors 1506, the one or more processors 1508, and the one or more forwarders 1510. For example, the framework orchestrator 1512 can suspend, stop, or start operations of the one or more collectors 1506, the one or more processors 1508, and the one or more forwarders 1510 in response to suspend, stop, or start commands received from the controller server 1408. The controller server 1408 may also send to the framework orchestrator 1512 instructions regarding setting thresholds for detecting abnormal behavior and setting the duration for a runtime interval as described below. For example, the controller server 1408 may send thresholds for detecting abnormal behavior and set the duration for a runtime interval based on the particular type of edge device. The one or more controllers 1506 collect various forms of event information 1514. The event information 1514 can be log messages and metrics. A log message records an event that occurred at the edge device as a time stamped message as described below. A metric is time series data that records events as measured resource usage and measured quantities associated with operation of the edge device 1502 as described below. The framework orchestrator 1512 sends the event information to the one or more processors 1508. The framework orchestrator 1512 also sends commands that control how the event information 1514 is processed at the one or more processors 1508 into relevant event information as described below. The framework orchestrator 1512 directs the one or more processors 1508 to send the relevant event information to forwarders 1510, which send the relevant event information to external services 1516 of the data center 1402. The external services 1516 are described below. In this example, the edge device 1502 includes a data storage device 1518 that can be used to locally store the relevant event information output from the forwarders 1510.

The one or more collectors 1506 include a log message collector that collects log messages and a metrics collector that collects metrics of the edge device 1502. The one or more processors 1508 include a log message processor that processes the log messages into relevant log message information and a metrics processor that processes metrics into relevant metric information. Operations performed by the log message collector and the log message processor of the agent 1504 are described below in a first subsection entitled log message processing. Operations performed by the metrics collector and the metrics processor of the agent 1504 are described below in a second subsection entitled metrics processing.

Log Message Processing

Figure 16:
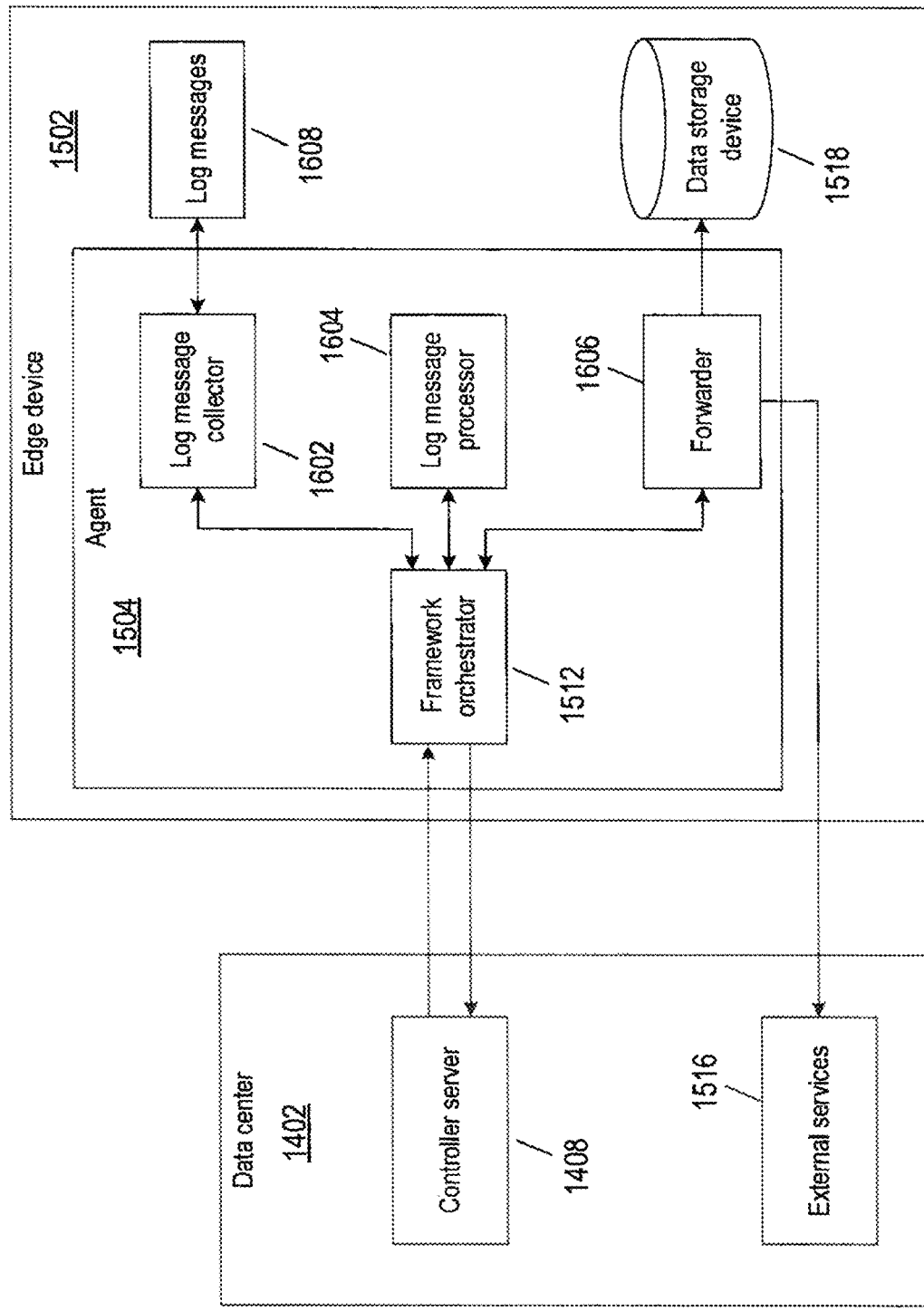
FIG. 16 shows an example implementation of an agent comprising a log message collector, a log message processor, and a forwarder.

FIG. 16 shows an example implementation of the agent 1504 comprising a log message collector 1602, a log message processor 1604, and a forwarder 1606. The log messages collector 1602 collects log messages 1608 produced by log message sources of the edge device 1502 in a runtime interval (i.e., while the edge device is running). The framework orchestrator 1512 directs the log message collector 1602 to send the collected log messages to the log message processor 1604, which converts the log messages into relevant log message information. The framework orchestrator 1512 retrieves the relevant log message information from the log message processor 1604 and sends the relevant log message information to the forwarder 1606, which sends the relevant log message information to the external services 1516 of the data center 1402 and may store the relevant log message information in the data storage device 1518. The log messages 1608 may be generated by any of many different log message sources of the edge device 1502. Log message sources may be, but are not limited to, an application or program running on the edge device 1502 or the operating system of the edge device 1502. The log messages 1606 may be stored in one or more log files at the edge device 1502 before the log messages are collected by the log message collector 1602.

Figure 17:
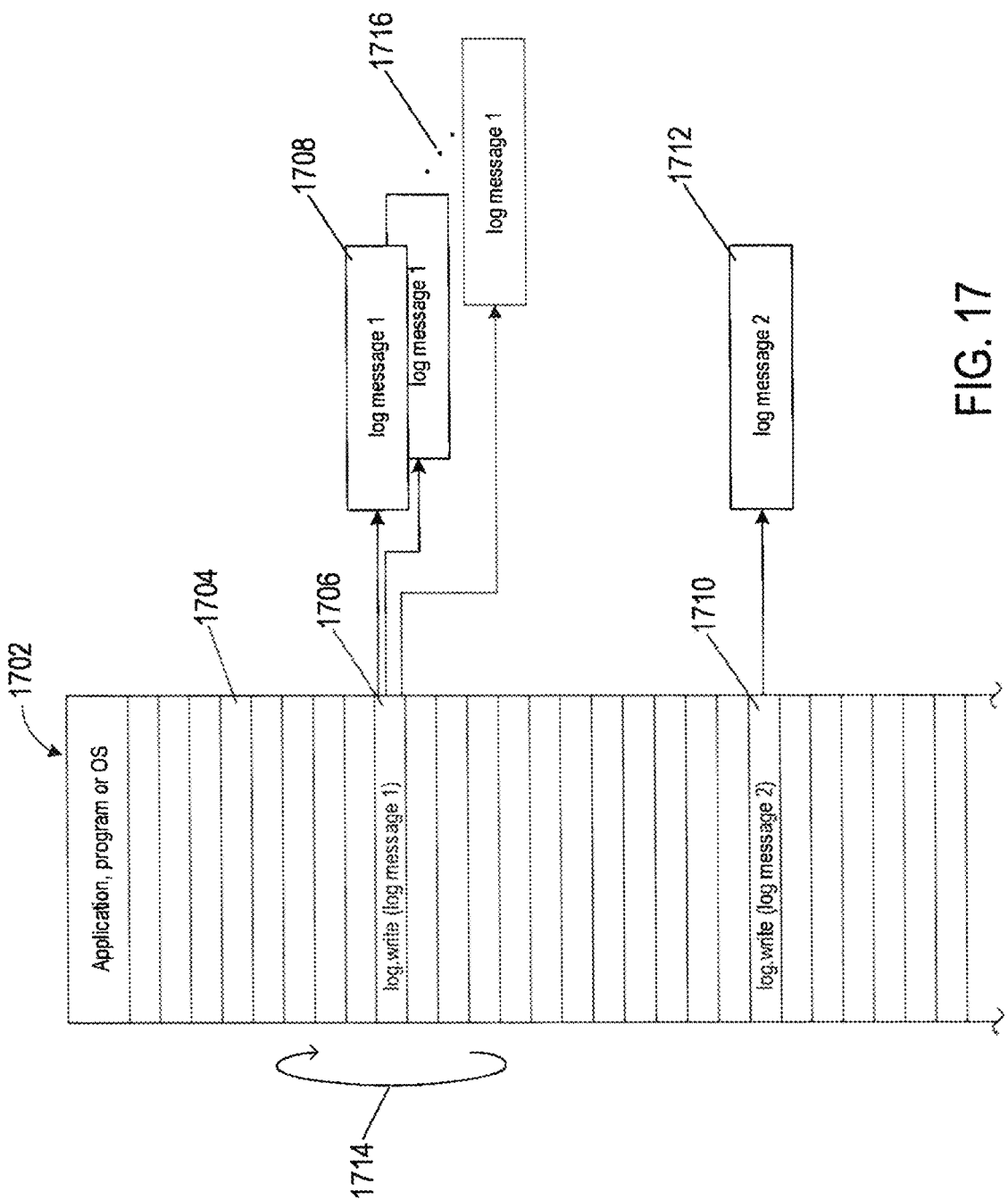
FIG. 17 shows an example source code of a log message source.

FIG. 17 shows an example source code 1702 of a log message source, such as an application, a program, or an operating system running on the edge device 1502, that generates log messages. The source code 1702 is an example of a log message source that generates log messages. Rectangles, such as rectangle 1704, represent a definition, a comment, a statement, or a computer instruction that expresses some action to be executed by the edge device 1502. The source code 1702 includes log write instructions that generate log messages when certain events predetermined by a developer occur during execution of the source code 1702. In other words, a log message records information about an event occurring at the edge device 1502. For example, source code 1702 includes an example log write instruction 1706 that when executed generates a "log message 1" represented by rectangle 1708, and a second example log write instruction 1710 that when executed generates "log message 2" represented by rectangle 1712. In the example of FIG. 17, the log write instruction 1708 is embedded within a set of computer instructions that are repeatedly executed in a loop 1714. As shown in FIG. 17, the same log message 1 is repeatedly generated 1716. The same type of log write instructions may also be located in different places throughout the source code, which in turns creates repeats of essentially the same type of log message in the log file.

In FIG. 17, the notation "log.write( )" is a general representation of a log write instruction. In practice, the form of the log write instruction varies for different programming languages. In general, the log write instructions are determined by the developer and are unstructured, or semi-structured, and can be relatively cryptic. For example, log write instructions may include instructions for time stamping the log message and contain a message comprising natural-language words and/or phrases that describe an event as well as various types of text strings that represent file names, path names, and, perhaps various alphanumeric parameters that may identify IP addresses and virtual network interfaces. In practice, a log write instruction may also include the name of the source of the log message (e.g., name of the application program, operating system and version or the edge device) and may include the name of the log file to which the log message is recorded. Log write instructions may be written in a source code by the developer of an application, program, or the operating system in order to record the state of the application, program, or operating system at point in time and to record events that occur while the application, program, or operating system are executing. For example, a developer may include log write instructions that record informative events including, but are not limited to, identifying startups, shutdowns, I/O operations of applications or the edge device; errors identifying runtime deviations from normal behavior or unexpected conditions of applications or non-responsive devices: fatal events identifying severe conditions that cause premature termination; and warnings that indicate undesirable or unexpected behaviors that do not rise to the level of errors or fatal events. Problem-related log messages (i.e., log messages indicative of a problem) record problem-related events such as warning log messages, error log messages, and fatal log messages. Informative log messages are indicative of a normal or benign state of a log message source.

FIG. 18 shows an example of a log write instruction 1802. The log write instruction 1802 includes arguments identified with "$" that are filled at the time the log message is created. For example, the log write instruction 1802 includes a time-stamp argument 1804, a thread number argument 1806, and an internet protocol ("IP") address argument 1808. The example log write instruction 1802 also includes text strings and natural-language words and phrases that identify the level of importance of the log message 1810 and type of event that triggered the log write instruction, such as "Repair session" 1812. The text strings between brackets "[ ]" represent file-system paths, such as path 1814. When the log write instruction 1802 is executed at the edge device 1502, parameters are assigned to the arguments and the text strings and natural-language words and phrases are stored as a log message of a log file.

FIG. 19 shows an example of a log message 1902 generated by the log write instruction 1802. The arguments of the log write instruction 1802 may be assigned numerical parameters that are recorded in the log message 1902 at the time the log message is generated by the edge device 1502. For example, the time stamp 1804, thread 1806, and IP address 1808 arguments of the log write instruction 1802 are assigned corresponding numerical parameters 1904, 1906, and 1908 in the log message 1902. The time stamp 1904 represents the date and time the log message is generated. The text strings and natural-language words and phrases of the log write instruction 1802 also appear unchanged in the log message 1902 and identify the type of event (e.g., informative, warning, error, or fatal) that occurred during execution of the log message source.

As log messages are received from various log message sources, the log messages are stored in corresponding log files in the order in which the log messages are received. FIG. 20 shows a small, eight-entry portion of a log file 2100. In FIG. 10, each rectangular cell, such as rectangular cell 1004, of the log file 1002 represents a single stored log message. For example, log message 1004 includes a short natural-language phrase 1006, date 1008 and time 1010 numerical parameters, and an alphanumeric parameter 1012 that identify a particular host computer.

Returning to FIG. 16, the log message collector 1602 collects the log messages 1608 from the edge system 1502 forwards the log messages to the framework orchestrator 1512. The framework orchestrator 1512 sends the log messages to the log message processor 1604.

In one implementation, the log message processor 1604 extracts parametric and non-parametric strings of characters called tokens from the log messages 1608 using regular expressions. The non-parametric tokens contain the text that describes the event recorded in the log message. A regular expression, also called "regex," is a sequence of symbols that defines a search pattern in text data. Many regex symbols match letters and numbers. For example, the regex symbol "a" matches the letter "a," but not the letter "b," and the regex symbol "100" matches the number "100," but not the number 101. The regex symbol "." matches any character. For example, the regex symbol ".art" matches the words "dart." "cart," and "tart." but does not match the words "art," "hurt," and "dark." A regex followed by an asterisk "*" matches zero or more occurrences of the regex. A regex followed by a plus sign "+" matches one or more occurrences of a one-character regex. A regular expression followed by a questions mark "?" matches zero or one occurrence of a one-character regex. For example, the regex "a*b" matches b, ab, and aaab but does not match "baa." The regex "a+b" matches ab and aaab but does not match b or baa. Other regex symbols include a "\d" that matches a digit in 0123456789, a "\s" matches a white space, and a "\b" matches a word boundary. A string of characters enclosed by square brackets, [ ], matches any one character in that string. A minus sign "−" within square brackets indicates a range of consecutive ASCII characters. For example, the regex [aeiou] matches any vowel, the regex [a-f] matches a letter in the letters abcdef, the regex [0-9] matches a 0123456789, the regex [._%+−] matches any one of the characters ._%+−. The regex [0-9a-f] matches a number in 0123456789 and a single letter in abcdef. For example, [0-9a-f] matches a6, i5, and u2 but does not match ex, 9v, or %6. Regular expressions separated a vertical bar "|" represent an alternative to match the regex on either side of the bar. For example, the regular expression Get|GetValue|Set|SetValue matches any one of the words: Get, GetValue, Set, or SetValue. The braces "{ }" following square brackets may be used to match more than one character enclosed by the square brackets. For example, the regex [0-9]{2} matches two-digit numbers, such as 14 and 73 but not 043 and 4, and the regex [0-9]{1-2} matches any number between 0 and 99, such as 3 and 58 but not 349. Simple regular expressions are combined to form larger regular expressions that match character strings of log messages and can be used to extract the character strings from the log messages.

FIG. 21A shows a table of examples of regular expressions designed to match particular character strings of log messages. Column 2102 list six different types of strings that may be found in log messages. Column 2104 list six regular expressions that match the character strings listed in column 2102. For example, an entry 2106 of column 2102 represents a format for a date used in the time stamp of many types of log messages. The date is represented with a four-digit year 2108, a two-digit month 2109, and a two-digit day 2110 separated by slashes. The regex 2112 includes regular expressions 2114-2116 separated by slashes. The regular expressions 2114-2116 match the characters used to represent the year 2108, month 2109, and day 2110. Entry 2118 of column 2102 represents a general format for internet protocol ("IP") addresses. A typical general IP address comprises four numbers. Each number ranges from 0 to 999 and each pair of numbers is separated by a period, such as 27.0.15.123. Regex 2120 in column 2104 matches a general IP address. The regex [0-9]{1-3} matches a number between 0 and 999. The backslash "\" before each period indicates the period is part of the IP address and is different from the regex symbol "." used to represent any character. Regex 2122 matches any IPv4 address. Regex 2124 matches any base-10 number. Regex 2126 matches one or more occurrences of a lower-case letter, an upper-case letter, a number between 0 and 9, a period, an underscore, and a hyphen in a character string. Regex 2128 matches email addresses. Regex 2128 includes the regex 2126 after the ampersand symbol. The regular expressions are used by the log message processor 1604 to extract non-parametric tokens from the log messages.

In another implementation, the log message processor 1604 extracts non-parametric tokens from log messages using Grok expressions formed from Grok patterns. Grok patterns are predefined symbolic representations of regular expressions that reduce the complexity of constructing regular expressions. Grok patterns are categorized as either primary Grok patterns or composite Grok patterns that are formed from primary Grok patterns. A Grok pattern is called and executed using the notation Grok syntax %{Grok pattern}.

FIG. 21B shows a table of examples of primary Grok patterns and corresponding regular expressions. Column 2132 contains a list of primary Grok patterns. Column 2134 contains a list of regular expressions represented by the Grok patterns in column 2132. For example, the Grok pattern "USERNAME" 2136 represents the regex 2138 that matches one or more occurrences of a lower-case letter, an upper-case letter, a number between 0 and 9, a period, an underscore, and a hyphen in a character string. Grok pattern "HOSTNAME" 2140 represents the regex 2142 that matches a hostname. A hostname comprises a sequence of labels that are concatenated with periods. Note that the list of primary Grok patterns shown in FIG. 21B is not an exhaustive list of primary Grok patterns.

Grok patterns may be used to map specific character strings into dedicated variable identifiers. Grok syntax for using a Grok pattern to map a character string to a variable identifier is given by:
%{GROK_PATTERN:variable_name}
where
GROK_PATTERN represents a primary or a composite Grok pattern; and
variable_name is a variable identifier assigned to a character string in text data that matches the GROK_PATTERN.

A Grok expression is a parsing expression that is constructed from Grok patterns that match characters strings in text data and may be used to parse character strings of a log message. Consider, for example, the following simple example segment of a log message:
34.5.243.1 GET index.html 14763 0.064
A Grok expression that may be used to parse the example segment is given by:
^%{IP:ip_address}\s%{WORD:
    word}\s%{URIPATHPARAM:request}\s
%{INT:bytes}\s%{NUMBER:duration}$
The hat symbol "^" identifies the beginning of a Grok expression. The dollar sign symbol "$" identifies the end of a Grok expression. The symbol "\s" matches spaces between character strings in the example segment. The Grok expression parses the example segment by assigning the character strings of the log message to the variable identifiers of the Grok expression as follows:
ip_address: 34.5.243.1
word: GET
request: index.html
bytes: 14763
duration: 0.064

Different types of regular expressions or Grok expressions are configured to match and extract non-parametric tokens from the log messages. Numerous log messages may have different parametric tokens but the same set of non-parametric tokens. Regular expressions and Grok expressions may be stored in the data center 1402 and sent to the framework orchestrator 1512, which forwards the regular expressions or the Grok expressions to log message processor 1604. The log message processor 1604 uses the regular expressions or the Grok expressions to normalize the log messages by extracting the non-parametric tokens of the log messages at the log message processor 1604. Log message normalization is the process of removing variable content of a log message, which is contained in the parametric tokens of the log message, leaving the non-parametric tokens of the log message. The non-parametric tokens of a log message describe the type of event recorded in the log message. The event of a log message is denoted by $et_i$, where subscript i is an index that distinguishes the different events of the log messages.

FIG. 21C shows an example of a Grok expression 2144 that is configured to normalize a log message 2146. Dashed directional arrows represent parsing the log message 2146 such that tokens that correspond to Grok patterns of the Grok expression 2144 are assigned to corresponding variable identifiers. For example, dashed directional arrow 948 represents assigning the time stamp 2021-07-18T06:32:07+00:00 950 to the variable identifier timestamp_iso8601 2152 and dashed directional arrow 2154 represents assigning HTTP response code 200 2156 to the variable identifier response_code 2158. FIG. 21C shows assignments of tokens of the log message 2146 to variable identifiers of the Grok expression 2144. The combination of non-parametric tokens 2160-2162 identify the event 2164 of the log message 2146. Parametric tokens 2166-2168 may change for different log messages with the same event 2164.

Figure 22:
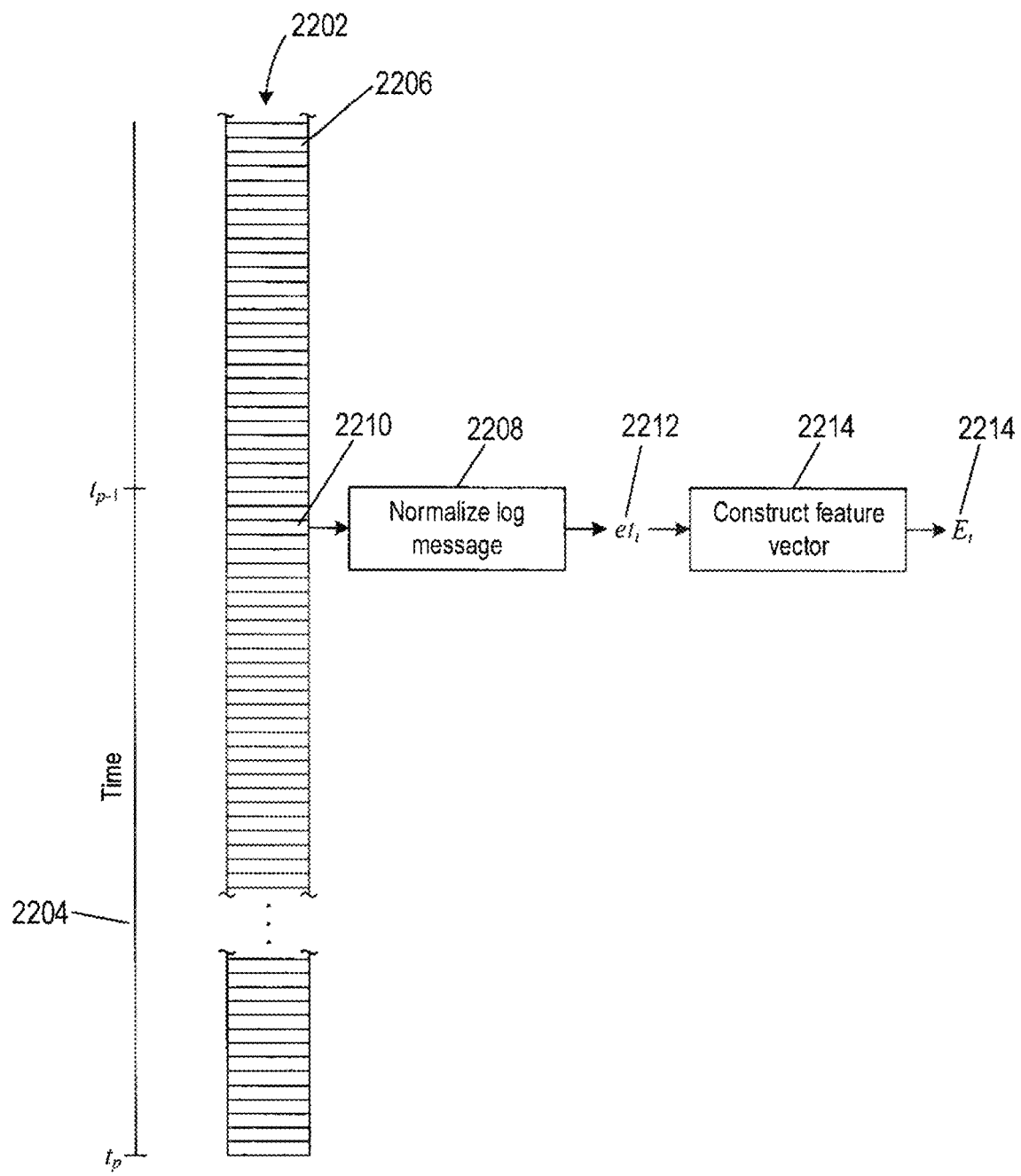
FIG. 22 shows an example of computing feature vectors from events of log messages.

The log message processor 1604 computes a feature vector for each of the events of the log messages produced in a runtime interval. FIG. 22 shows an example of computing feature vectors from events of log messages in a runtime interval $(t_{p-1}, t_p]$ 2204. A column of rectangles 2202 represents the log messages collected by the collector 1602. Each rectangle, such as rectangle 2206, represents a log message generated by an event source of the edge device 1502, as described above with reference to FIG. 20. The log message processor 1604 constructs feature vectors of the log messages generated in the runtime interval $(t_{p-1}, t_p]$ 2204. In block 2208, the log message 2210 is normalized using a corresponding regular or a Grok expression, as described above, to extract the event recorded in the log message denoted by $et_i$ 2212. In block 2214, a feature vector $E_i$ 2214 is computed for the event $et_i$ 2212 as described below with reference to FIGS. 23-24.

FIG. 23 shows an example of constructing feature vectors for the events of log messages produced in a runtime interval. Column 2302 contains an example of M different event of the log messages with time stamps in the runtime interval $(t_{p-1}, t_p]$, such as event $et_i$ 2304. Each non-parametric token of an event has an associated word vector denoted by $V_w$ in an $N_e$ dimensional space, where $N_e$ is the number of elements in the word vectors. Column 2306 list W word vectors associated with W non-parametric tokens of the event $et_i$ 2304. The W word vectors are denoted by $V_1 \ldots, V_W$. In the following discussion, uppercase letters are used to represent vectors. The w-th word vector is denoted by $$V_w = \begin{bmatrix} v_{w,1} \\ \vdots \\ v_{w,n} \\ \vdots \\ v_{w,N_e} \end{bmatrix} \quad (1)$$

where $v_{q,1}, \ldots, v_{q,N_e}$, are numerical values;

$n = 1, 2, \ldots, N_e$, and $w = 1, 2, \ldots, W$.

The word vectors in column 2306 are used to compute feature vectors given by:

$$E_i = \begin{bmatrix} e_{i,1} \\ \vdots \\ e_{i,n} \\ \vdots \\ e_{i,N_e} \end{bmatrix} \quad (2)$$

where each element is given by $$e_{i,n} = \frac{1}{W} \sum_{w=1}^{W} v_{w,n}$$

Column 2308 comprises feature vectors that correspond to the events listed in column 2302. For example, feature vector $E_i$ 2310 represents event $et_i$ 2304 in the $N_e$ dimensional space.

FIG. 24 shows a numerical example of computing feature vectors for three simple log messages 2401-2403. The events of the log messages are denoted by $et_1$, $et_2$, and $et_3$. In this example, the words of the events are represented by three-dimensional word vectors 2404-2408. The word vectors 2404-2408 correspond to points in a three-dimensional space. Implementations are not limited to a three-dimensional space. In other implementations, higher dimensional spaces may be used to represent the words vectors. The word vectors 2404-2408 are used to compute feature vectors 2410-2412 according to Equation (2). For example, feature vector $E_1$ 2410 is computed by averaging the elements of the word vectors 2404, 2405, and 2407. The feature vectors $E_1$, $E_2$, and $E_3$ correspond to the events $et_1$, $et_2$, and $et_3$.

Semantically similar events belong to the same event type. The log message processor 1604 performs clustering on the feature vectors to determine semantically similar events based on a user-selected number of clusters denoted by K. The events $et_1$, $et_2$, and $et_3$ in FIG. 24 are examples of semantically similar events that have in common two of three words and may be considered to belong to the same event type of recording cpu utilization. The log message processor 1604 uses K-means clustering of feature vectors to identify events that belong to the same event type. In other words, the events of each cluster of feature vectors belong to the same event type.

Figures 25, 26:
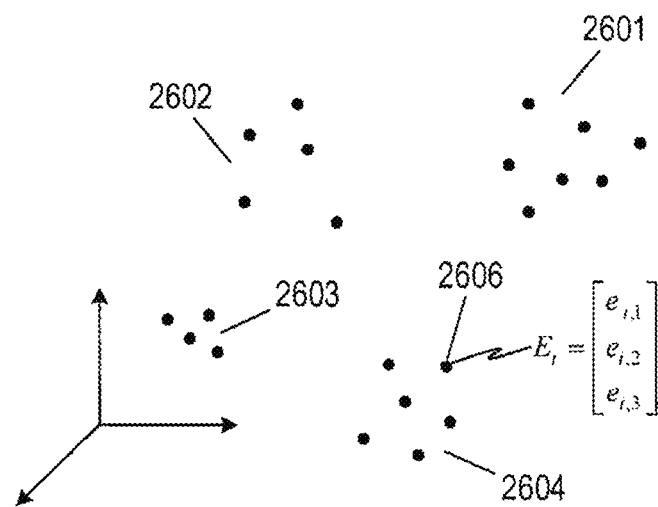
FIG. 25 shows three examples of semantically similar events.
FIG. 26 shows a representation of four example clusters of feature vectors in a three-dimensional vector space.

FIG. 25 shows three examples of semantically similar events 2501-2503. Each of the events have in common the phrase "warning error forwarding to http front end err" and differ with respect to other words. Other semantically similar events include events comprising a set of tokens with and without parsed regular expressions removed. For example, events with "warning host x.x.x.x. shut down," where x.x.x.x represents a host IP address, are semantically similar events because the events include the common set of non-parametric tokens "warning host shut down."

The log message processor 1604 uses K-means clustering to determine clusters of semantically similar events (i.e., each cluster corresponds to an event type). Let $\{E_i\}_{i=1}^N$ denote a set of feature vectors associated with a set of N events. K-means clustering is an iterative process of partitioning the feature vectors into K clusters such that each feature vector belongs to a cluster with the closest cluster center. K-means clustering begins with the full N feature vectors and K cluster centers denoted by $\{A_r\}_{r=1}^K$, where $A_r$ is an n-dimensional cluster center. Each feature vector is assigned to one of the K clusters defined by:

$$C_k^{(m)} = \{E_i : |E_i - A_k^{(m)}| \leq |E_i - A_r^{(m)}| \forall j, 1 \leq r \leq K\} \quad (3)$$

where
$C_k^{(m)}$ is the k-th cluster k=1, 2, . . . , K; and
superscript m is an iteration index m=1, 2, 3, . . . .

The cluster center $\bar{q}_k^{(m)}$ is the mean location of the feature vectors in the k-th cluster. A next cluster center is computed at each iteration as follows:

$$A_k^{(m+1)} = \frac{1}{|C_k^{(m)}|} \sum_{E_i \in C_k^{(m)}} E_i \quad (4)$$

where $|C_k^{(m)}|$ is the number of data points in the k-th cluster.

For each iteration m. Equation (3) is used to determine which cluster $C_k^{(m)}$ each feature vector belongs to followed by recomputing the coordinate location of each cluster center according to Equation (4). The computational operations represented by Equations (3) and (4) are repeated for each iteration, m, until the feature vector in each of the K clusters do not change. The resulting clusters of event types are represented by:

$$C_k = \{E_p\}_{p=1}^{N_k} \quad (5)$$

where $N_k$ is the number of feature vectors (i.e., log messages with the same even type) in the cluster $C_k$. Each cluster of semantically events has corresponding log messages that share a similar event type template and are semantically similar.

FIG. 26 shows a representation of four example clusters of feature vectors 2601-2604 in a three-dimensional vector space. Solid dots represent coordinates of feature vectors in a 3-dimensional vector space. Each feature vector corresponds to an event. For example, dot 2606 represents the coordinates of a feature vector $E_i$ that corresponds to an event $et_i$. Each cluster corresponds to events with the same event type.

The log message processor 1604 determines a representative log message for each cluster of the K clusters of event types. A representative log message is the log message that best represents of the event type of a cluster. The log message processor 1604 constructs a similarity graph of the feature vectors for each cluster. Each node of the similarity graph corresponds to the coordinates of a feature vector that, in turn, represents the event recorded in a log message produced in the runtime interval. Edges of the similarity graph correspond to similarity scores that are computed as follows:

$$sim(E_x, E_y) = \frac{\sum_{n=1}^{N_e} e_{x,n} e_{y,n}}{\sqrt{\sum_{n=1}^{N_e} (e_{x,n})^2 \sum_{n=1}^{N_e} (e_{y,n})^2}} \quad (6)$$

The feature vectors $E_x$ and $E_y$ that correspond to log messages associated with two events of a cluster are denoted by $$E_x = \begin{bmatrix} e_{x,1} \\ \vdots \\ e_{x,n} \\ \vdots \\ e_{x,N_e} \end{bmatrix} \text{ and } E_y = \begin{bmatrix} e_{y,1} \\ \vdots \\ e_{y,n} \\ \vdots \\ e_{y,N_e} \end{bmatrix}$$

Figure 27A:
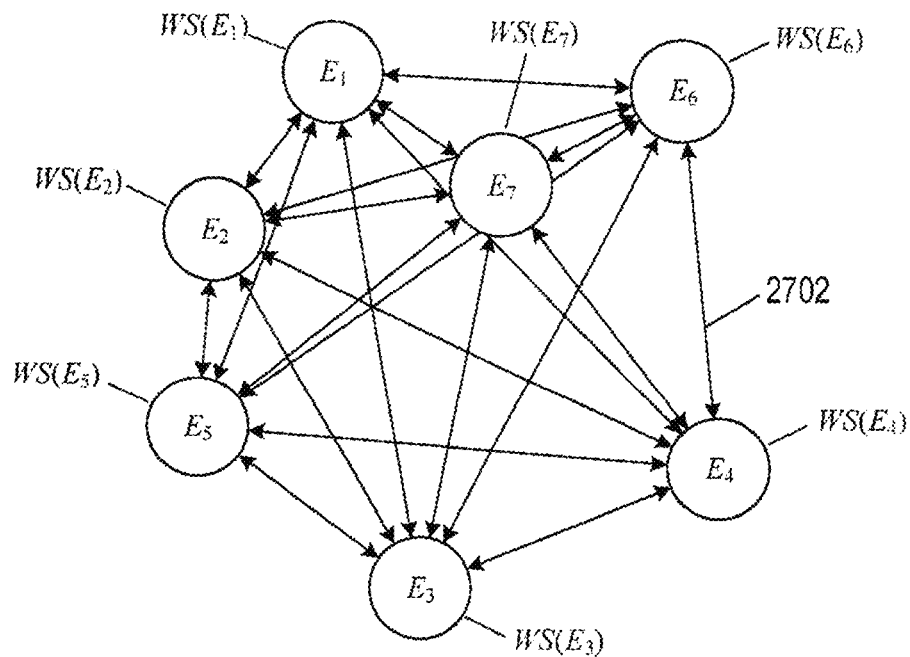
FIG. 27A shows an example of a similarity graph constructed for log messages associated with the feature vectors in the cluster in FIG. 26.

FIG. 27A shows an example of a similarity graph constructed for log messages associated with the feature vectors in the cluster 2601 shown in FIG. 26. Large open circles labeled $E_1$-$E_7$ represent the coordinates of feature vectors that serve as nodes in the similarity graph. Each feature vector corresponds to a log message associated with an event in the cluster 2601. Each pair of nodes is connected by an edge. Edges of the similarity graph are represented by directional arrows, such as directional arrow 2602, that connect pairs of nodes. A similarity score is calculated for each edge according to Equation (6).

A text rank is computed for each node (i.e., text rank for each event of log message associated with the cluster of event types) of the similarity graph as follows:

$$WS(E_x) = (1-d) + d \sum_{E_y \in In(E_x)} \frac{sim(E_x, E_y)}{S} WS(E_y) \quad (7)$$

where $$S = \sum_{E_v \in In(E_y)} sim(E_v, E_y)$$

d is a selected damping factor (i.e., 0≤d≤1);
$In(E_x)$ is the set of nodes with edges that connect to $E_x$; and
$In(E_y)$ is the set of nodes with edges that connect to $E_y$.

Equation (7) forms a system of linear equations. Each linear equation corresponds to a node in the similarity graph. The text rank $WS(E_x)$ is numerically computed for each node of the similarity graph based on the system of linear equations with the number of unknown text ranks $WS(E_x)$ equal to the number of known $sim(E_x, E_y)/S$. The numerical computation may begin with arbitrary values assigned to the text ranks. An error rate of a node $E_x$ is approximated by a difference between text ranks computed at two successive iterations: $WS^{q+1}(E_x) - WS^q(E_x)$, where q is an iteration index. The system of linear equations converges when the error rate for any node in the similarity graph is less than a given threshold (i.e., $WS^{q+1}(E_x) - WS^q(E_x) < Th_{sim}$, where $Th_{sim}$ is a threshold). One or more log messages with the highest text rank for a given cluster of events represents the cluster (i.e., event type) and is the representative log message of the event type of the cluster. Text ranks are computed for the log messages associated with each cluster.

The representative log messages of the event types may be sent to the data center 1402 rather sending all the log messages generated in the runtime interval, which reduces the volume of log messages sent to the data center 1402. For example, in one implementation, only the highest ranked representative log message (i.e., K log messages) of each of the K clusters are sent to the data center 1402. In another implementation, two or more of the highest ranked log messages of the K clusters are sent to the data center 1402. For example, let k=nK representative the total number of representative log messages sent to data center, where n is a user-selected positive integer that represents the number of highest ranked log messages sent for each cluster. The n highest ranked representative log messages of each of the K clusters are in turn clusters of representative log messages that are sent over the internet to the data center and stored in data storage devices at the data center.

In FIG. 27A, text ranks $WS(E_1)$, . . . , $WS(E_7)$ are displayed next to the corresponding nodes $E_1$-$E_7$. Suppose the text ranks are ordered as follows: $WS(E_5) > WS(E_1) > WS(E_4) > WS(E_2) > WS(E_6) > WS(E_3) > WS(E_7)$. Because the node $E_5$ has the largest associated text rank $WS(E_5)$, the representative log message for the cluster is the log message with the feature vector $E_5$. In other implementations, two or more representative log message may be selected to represent a cluster of event types. For example, the three log messages that corresponds to the three highest text rank nodes $E_5$, $E_1$, and $E_4$ may be used to represent the cluster of event type 2601.

Figure 27B:
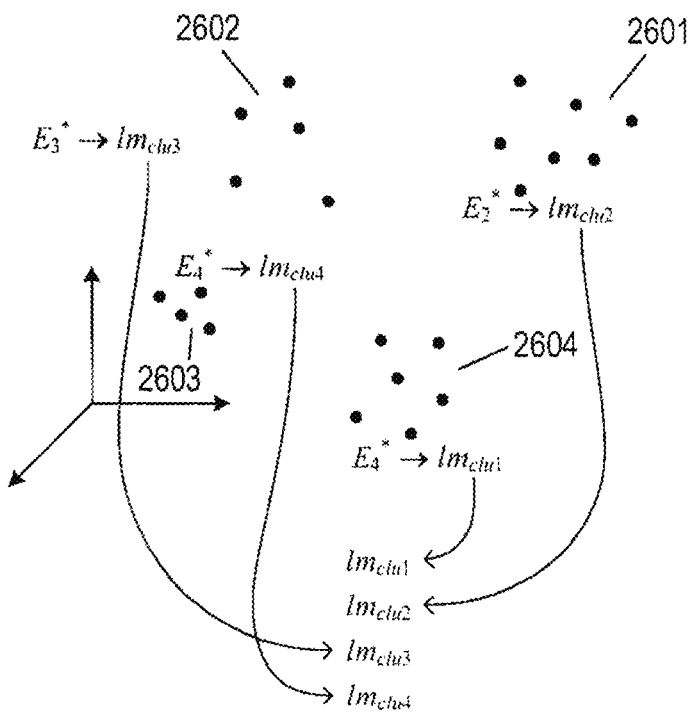
FIG. 27B shows an example of representative log messages for the clusters shown in FIG. 26.

FIG. 27B shows an example of representative log messages for the clusters 2601-2604 in FIG. 26. The clusters 2601-2604 have corresponding highest text rank nodes (i.e., log message vectors) $E^*_1$, $E^*_2$, $E^*_3$, and $E^*_4$ of similarity graphs associated with each of clusters 2601-2604. The asterisk is used to represent the node of each cluster with the largest text rank. The highest text rank nodes $E^*_1$, $E^*_2$, $E^*_3$, and $E^*_4$ have corresponding to log messages $lm_{clu1}$, $lm_{clu2}$, $lm_{clu3}$, and $lm_{clu4}$ that are in turn representative log messages of the corresponding clusters 2601-2604. For example, cluster 2601 has a highest text rank node $E_1^*$ obtained from solving a linear system of equations constructed from the similarity graph of the cluster of events 1601. In other words, $E_1^* = \max\{E_1, E_2, E_3, E_4, E_5, E_6, E_7\}$ of the similarity graph shown in FIG. 27A is the highest text rank node and the corresponding log message $lm_{clu1}$ is a representative log message for the cluster 2601. The representative log messages $lm_{clu1}$, $lm_{clu2}$, $lm_{clu3}$, and $lm_{clu4}$ of the four clusters of even types 2504-2507 may be sent to and stored in the data center 1402.

When the end time $t_p$ of the runtime interval $(t_{p-1}, t_p]$ is reached, the log message processor 1604 constructs a probability distribution of the event types generated in the runtime interval. The log message processor 1604 computes the total number of events (i.e., log messages) generated in the runtime interval $(t_{p-1}, t_p]$ as follows:

$$N_p = \sum_{k=1}^{K} N_k \tag{8}$$

where
k is an event type index (i.e., cluster index): and
K is the number of different event types (i.e., number of clusters) generated in the runtime interval.

The log message processor 1604 computes the probability of each event type as follows:

$$p_k = \frac{N_k}{N_p} \tag{9}$$

The log message processor 1604 forms a probability distribution of event types for the runtime interval as follows:

$$P_p = (p_1, p_2, p_3, \ldots, p_K) \tag{10}$$

The probability distribution in Equation (10) represents the distribution of different event types that occur in the runtime interval $(t_{p-1}, t_p]$.

Figure 28:
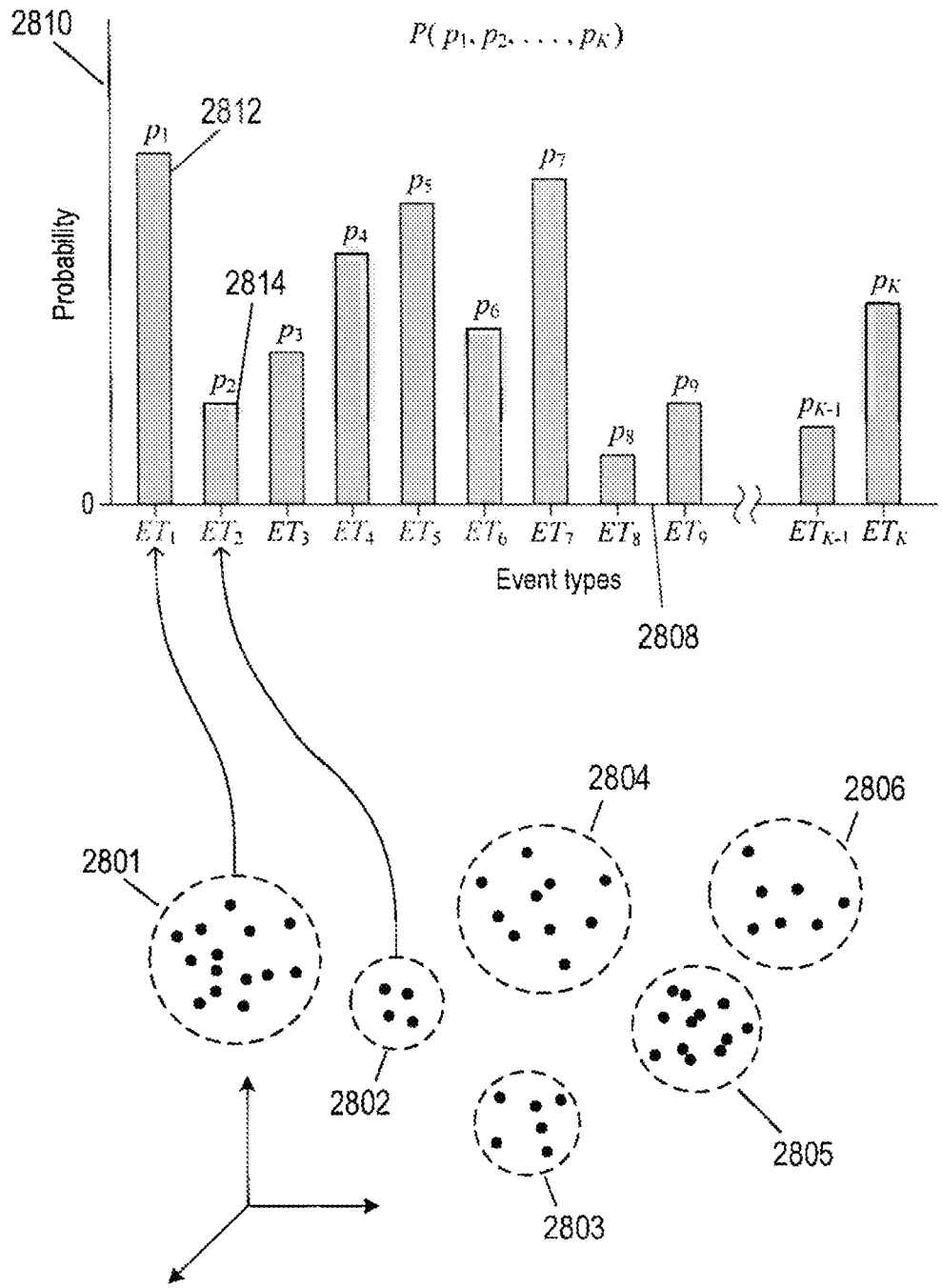
FIG. 28 shows six example clusters of feature vectors represented in a three-dimensional space.

FIG. 28 shows six example clusters 2801-2806 of feature vectors represented by solid dots in a three-dimensional space. Each feature vector corresponds to an event recorded in a log message produced in the runtime interval. The clusters of feature vectors are obtained as described above using K-means clustering. Each cluster of feature vectors corresponds to a different event type. For example, cluster 2801 corresponds to a first event type denoted by $ET_1$, and cluster 2802 corresponds to a second event type denoted by $ET_2$. Event type probabilities are computed for each cluster as described above with reference to Equation (9). FIG. 28 also shows a plot of an example probability distribution of event types of log messages generated in a runtime interval. Horizontal axis 2808 represents the different even types. Vertical axis 2810 represents a range of probabilities. Bars represent the probabilities associated with the different even types. For example, cluster 2801 corresponds to a probability $p_1$ of the event type $ET_1$, which is represented by bar 2812. Cluster 2802 corresponds to a probability $p_2$ of the event type $ET_2$, which is represented by bar 2814.

The probability distribution computed for a runtime interval represents a distribution of events associated with the edge device 1502 in the runtime interval. The edge device 1502 has a baseline probability distribution that corresponds to normal performance of the edge device 1502. The baseline probability distribution is computed as described above with reference to FIG. 28 when the edge device is performing normally. The baseline distribution is denoted by $$P_b = (p_{b,1}, p_{b,2}, p_{b,3}, \ldots, p_{b,K}) \tag{11}$$

where $p_{b,k}$ denotes a baseline probability of the k-th event type during normal operation of the edge device 1502.

When the runtime interval is complete, the log message processor 1604 computes a log summary divergence between the probability distribution of the runtime interval and the baseline distribution of the edge device as follows:

$$LSD(P_p, P_b) = -\sum_{k=1}^{K} m_k \log m_k + \frac{1}{2}\left[\sum_{k=1}^{K} p_k \log p_k + \sum_{k=1}^{K} p_{b,k} \log p_{b,k}\right] \tag{12}$$

where
the subscript "l" represents a runtime interval index; and $m_k = (p_k + p_{b,k})/2$.

The value of the log summary divergence ranges between 0 and 1 and is used to measure how much, or to what degree, the probability distribution $P_p$ differs from the baseline distribution $P_b$. The closer the log summary divergence is to zero, the closer the probability distribution $P_p$ matches the baseline distribution $P_b$. On the other hand, the closer the divergence is to one, the farther the probability distribution $P_p$ is from the baseline distribution $P_b$.

The further the probability distribution $P_p$ of the runtime interval is from the baseline distribution $P_b$, the further the edge device is from normal operation. The log message processor 1604 compares the log summary divergence to a divergence threshold $Th_{div}$, where $0 < Th_{div} < 1$. Examples of divergence thresholds include 0.1, 0.2, 0.25, 0.3, and 0.35. When $LSD(P_l, P_b) \geq Th_{div}$, the edge device is in an abnormal state and an alert is generated at the edge device. For example, the alert may be displayed in a graphical user interface of a display at the edge device. The alert indicates that the edge device is in an abnormal state.

Figure 29:
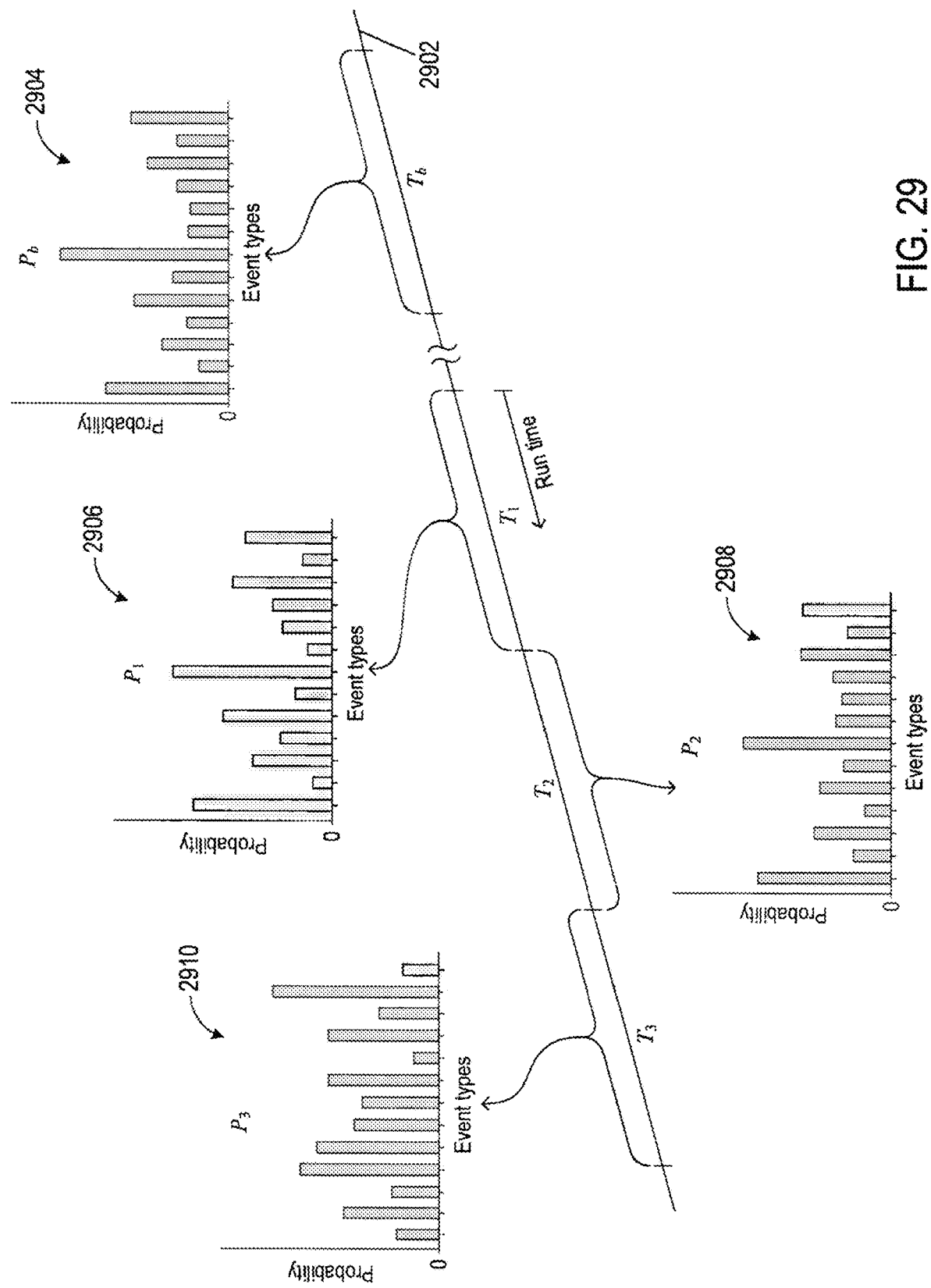
FIG. 29 shows examples of probability distributions computed for consecutive time intervals.

FIG. 29 shows examples of runtime probability distributions computed for consecutive runtime intervals. Line 2902 represents a time axis. The time axis is partitioned into time intervals denoted by $T_b$, $T_1$, $T_2$, and $T_3$. Time interval $T_b$ represents a historical time interval in which the edge device performed in a normal operational state. Time intervals $T_1$, $T_2$, and $T_3$ represent consecutive runtime intervals. A baseline distribution 2904 is computed from log messages generated in the historical time interval $T_b$ as described above. At runtime of the edge device, a first probability distribution 2906 is computed from the log messages generated in the runtime interval $T_1$ when the runtime interval is completed. In this example, the log summary divergence $LSD(P_1, P_b) < Th_{div}$, which does not trigger an alert and indicates that the edge device performance is normal. When the second runtime interval $T_2$ is complete, a probability distribution 2908 is computed from log messages generated in the second runtime interval $T_2$. In this example, the log summary divergence $LSD(P_2, P_b) < Th_{div}$, which again does not trigger an alert and indicates that the edge device performance is normal. When the third runtime interval $T_3$ is complete, a probability distribution 2910 is computed from log messages generated in the third runtime interval $T_3$. Note that the probability distribution 2910 is demonstrably different from the previous probability distributions 2908 and 2906 and the baseline distribution 2904. In this example, the log summary divergence $LSD(P_2, P_b) > Th_{div}$, which triggers the log message processor 1604 to generate an alert in a GUI of a display of the edge device. The alert identifies the edge device as being in an abnormal state.

Returning to FIG. 16, when the log message processor 1604 detects the log summary divergence violates the divergence threshold in the runtime interval, the log message processor 1604 forms relevant log message information, which comprises the representative log messages of the event types obtained in the runtime interval, the probability distribution of the runtime interval that violated the divergence threshold, and the log summary divergence. The log message processor 1604 sends the relevant log message information to the framework orchestrator 1512, which sends the relevant log message information to the forwarder 1608. The forwarder 1608 sends the relevant log message information to the external service 1516 and may also store the relevant log message information in the local data storage device 1518. When the log summary divergence satisfies the condition $LSD(P_2, P_b) < Th_{ab}$, the log message processor 1604 deletes the representative log messages of the event types obtained in the runtime interval and deletes the probability distribution of the runtime interval, thereby avoiding unnecessary storage of log messages and the corresponding probability distributions.

Figure 30:
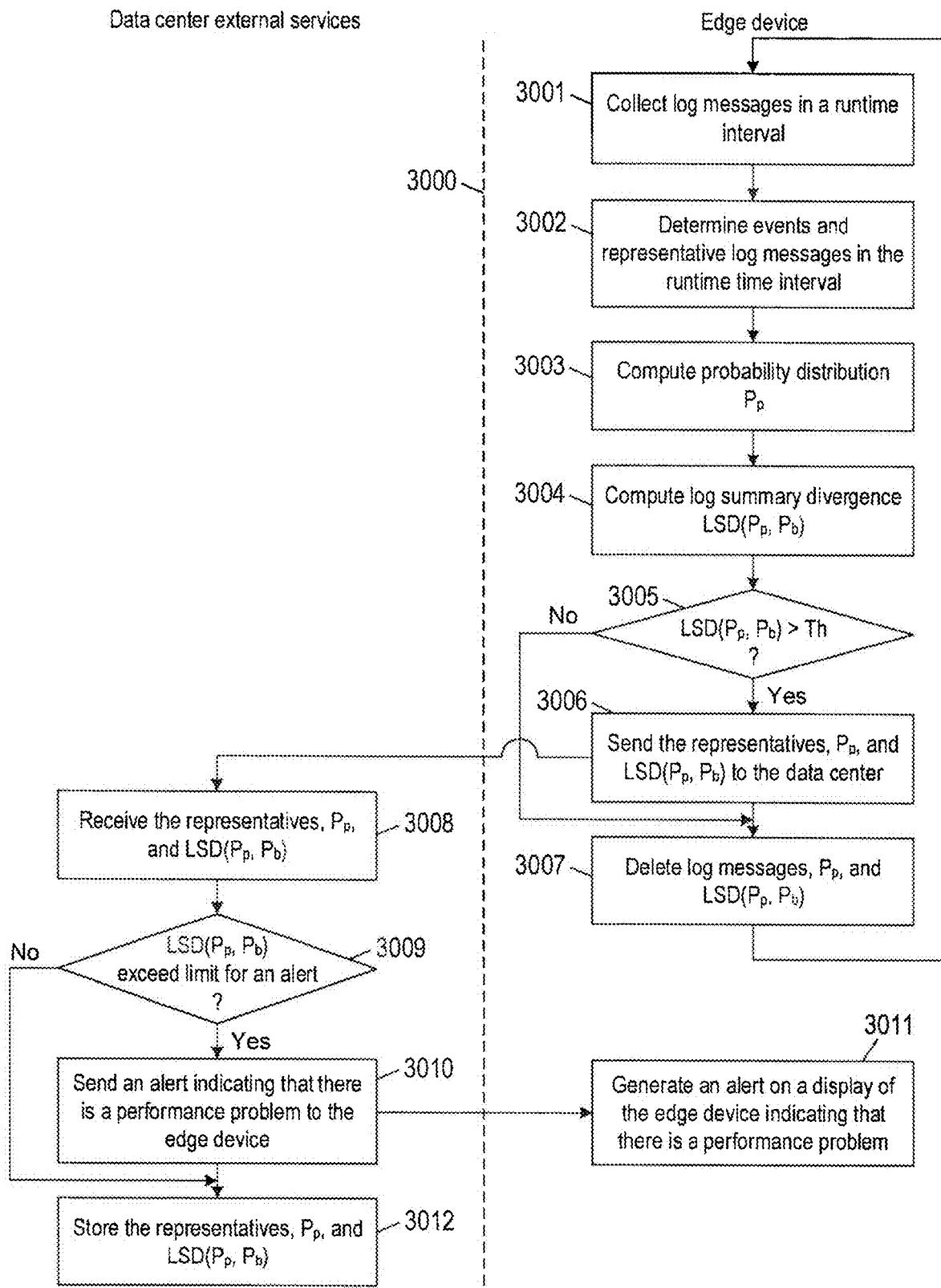
FIG. 30 is a flow diagram of operations performed by an agent at an edge device and operations performed by external services of the data center.

FIG. 30 is a flow diagram of operations performed by the agent 1504 at the edge device 1502 and operations performed by the external services 1514 of the data center 1402. Dot dashed line 3000 separates operations performed by the agent 1504 of the edge device 1502 from operations performed by the external services 1516 of the data center 1402. In block 3001, log messages are collected in a runtime interval by the log message collector 1602 of the agent 1504. In block 3002, events and representative log messages of the log message are determined as described above with reference to FIGS. 21A-27B. In block 3003, a probability distribution is computed as described above with reference to Equations (8)-(10) and FIG. 28. In block 3004, a log summary divergence between the probability distribution obtained in block 3003 and a baseline probability distribution is computed as described above with reference to Equations (11)-(12). In decision block 3005, if the log summary divergence is greater than a divergence threshold, control flow to block 3006. Otherwise, control flows to block 3007. In block 3006, the representative log messages, probability distribution, and log summary divergence are sent to the data center. In block 3007, the log messages collected in the runtime interval may be deleted as the edge device 1502. In block 3008, the representative log messages, probability distribution, and log summary divergence are received by the external services 1516 of the data center 1402. In decision block 3009, when the log summary divergence is greater than a second divergence threshold of the external services 1516, control flows to block 3010. Otherwise, control flows to block 3012. In block 3010, an alert indicating that there is a performance problem at the edge device 1502 is sent to the edge device 1502. In block 3011, an alert is generated and displayed on a display of the edge device. The alert indicates that there is a performance problem with the edge device 1502. In block 3012, the representative log messages, probability distribution, and the log summary divergence are stored in a data storage device of the data center.

Figure 31:
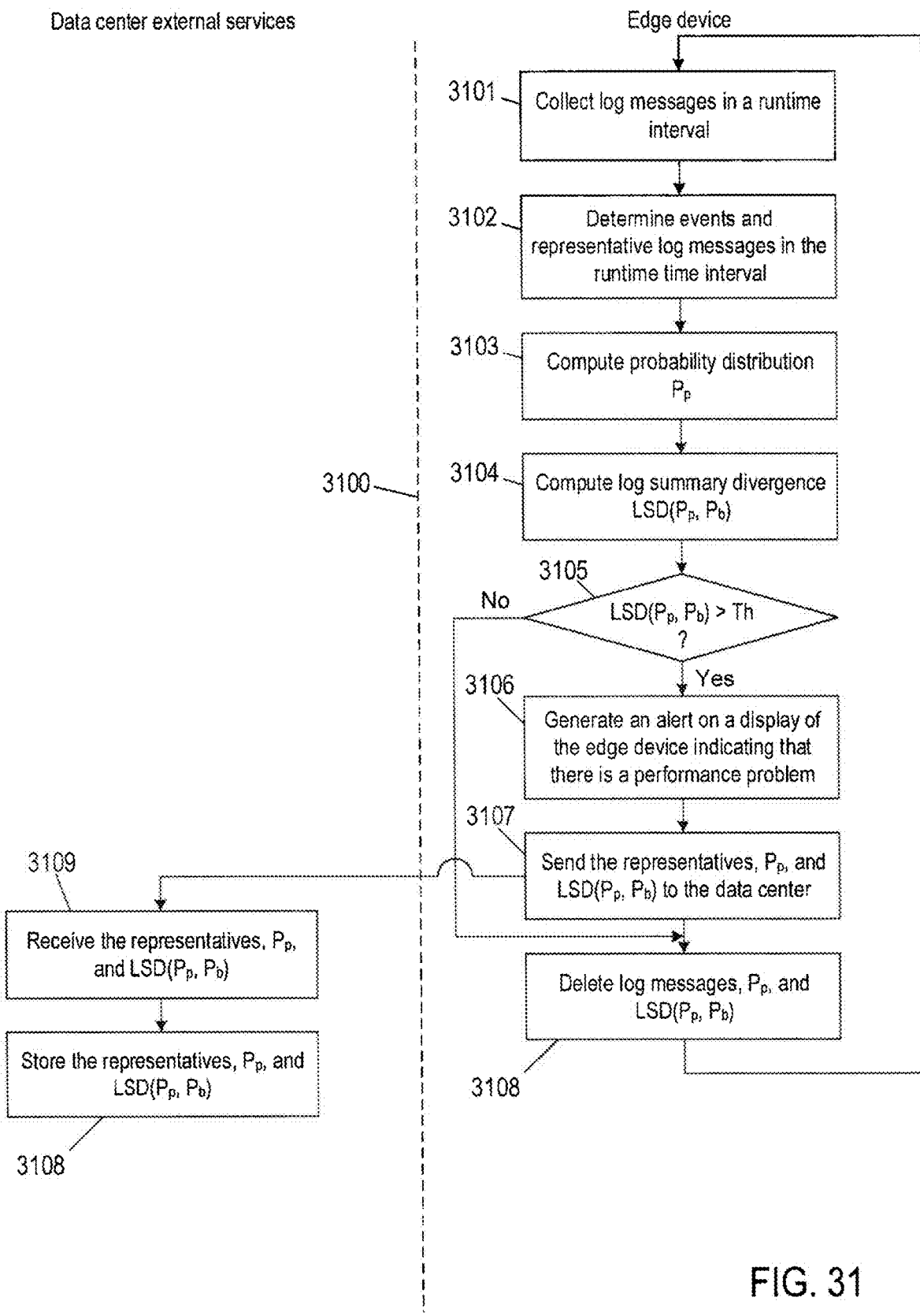
FIG. 31 is a flow diagram of operations performed by an agent at an edge device and operations performed by external services of the data center.

FIG. 31 is a flow diagram of operations performed by the agent 1504 at the edge device 1502 and operations performed by the external services 1514 of the data center 1402. Dot dashed line 3100 separates operations performed by the edge device 1502 from operations performed by the external services 1516 of the data center 1402. In block 3101, log messages are collected in a runtime interval by the log message collector 1602 of the agent 1504. In block 3102, events and representative log messages of the log message are determined as described above with reference to FIGS. 21A-27B. In block 3103, a probability distribution is computed as described above with reference to Equations (8)-(10) and FIG. 28. In block 3104, a log summary divergence between the probability distribution obtained in block 3103 and a baseline probability distribution is computed as described above with reference to Equations (11)-(12). In decision block 3005, if the log summary divergence is greater than a divergence threshold, control flow to block 3106. Otherwise, control flows to block 3108. In block 3106, an alert is generated and displayed on a display of the edge device. The alert indicates that there is a performance problem with the edge device 1502. In block 3107, the representative log messages, probability distribution, and log summary divergence are sent to the data center. In block 3108, the log messages collected in the runtime interval may be deleted as the edge device 1502. In block 3109, the representative log messages, probability distribution, and log summary divergence are received by the external services 1516 of the data center 1402. In block 3110, the representative log messages, probability distribution, and the log summary divergence is stored in a data storage device of the data center.

Metrics Processing

Figure 32:
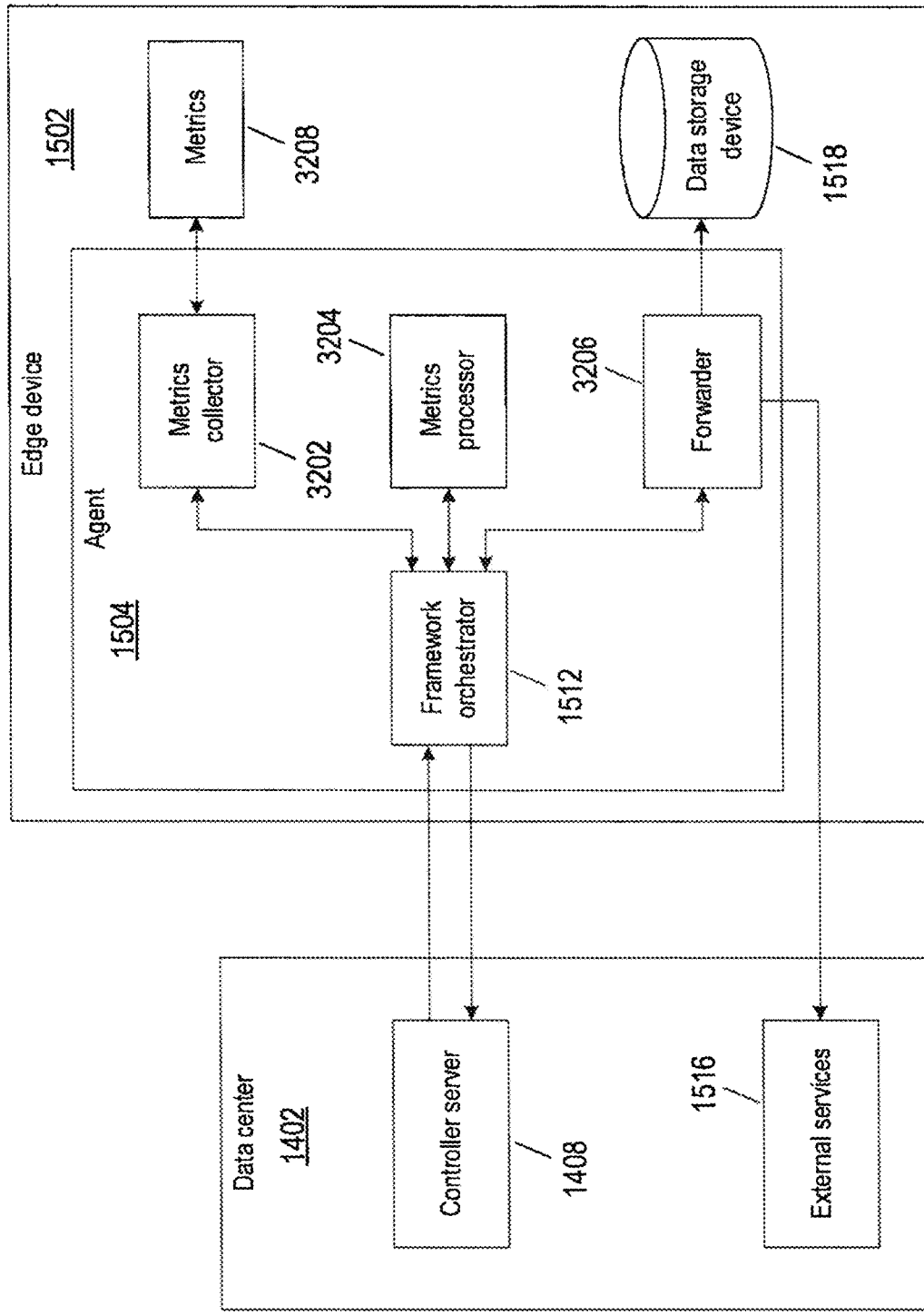
FIG. 32 shows an example implementation of an agent comprising a metrics collector, a metrics processor, and a forwarder.

FIG. 32 shows an example implementation of the agent 1504 comprising a metrics collector 3202, a metrics processor 3204, and a forwarder 3206. The metrics collector 3202 collects metrics 3208 from metric sources of the edge device 1502 in the runtime interval. The metrics 3208 includes CPU usage, memory usage, data storage, and response time of the edge device 1502. The metrics 3208 may also include network usage, network throughput, packet received, packets transmitted, and packet drops. The framework orchestrator 1512 directs the metrics collector 3202 to send the collected metrics to the metrics processor 3204, which converts the metrics into relevant metric information, which comprises aggregated metrics and relevant log messages associated with anomalies detected in the metrics 3208 by the metrics processor 3204. The framework orchestrator 1512 retrieves the relevant metric information from the metric processor 3204 and sends the relevant metric information to the forwarder 3206, which sends the relevant metric information to the external services 1516 of the data center 1402 and may store the relevant metric information in the data storage device 1518.

A metric is a stream of time-dependent metric data that is generated by a metric source, such as an operating system, a resource, a program, or an object, such as VM or a container, running on the edge device 1502. A stream of metric data comprises a sequence of time-ordered metric values that are recorded in spaced points in time called "time stamps." A stream of metric data is simply called a "metric" and is denoted by $$M = (x_i)_{i=1}^Q = (x(t_i))_{i=1}^Q \tag{13}$$

where
- M denotes the metric;
- $x_i = x(t_i)$ is a metric value;
- $t_i$ is a time stamp indicating when the metric value was recorded in a data-storage device;
- subscript i is a time stamp index i=1, . . . , Q; and
- Q in the number of metric values of the M collected in the runtime interval $(t_{p-1}, t_p]$.

Figure 33:
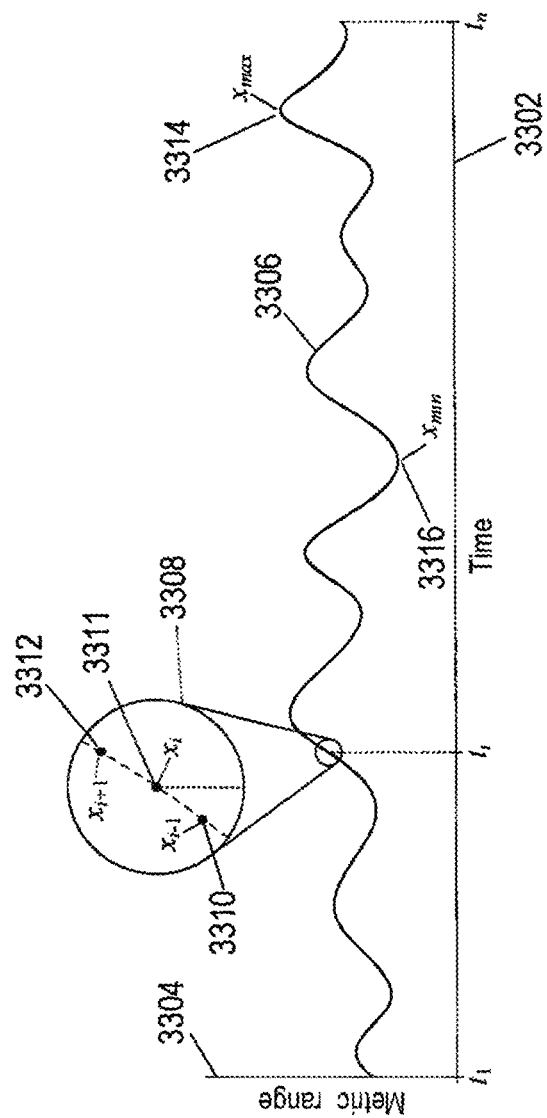
FIG. 33 shows a plot of an example metric.

FIG. 33 shows a plot of an example metric. Horizontal axis 3302 represents the runtime interval $(t_{p-1}, t_p]$. Vertical axis 3304 represents a range of metric values or amplitudes. Curve 3306 represents a metric as time series data. In practice, a metric comprises a sequence of discrete metric values in which each metric value is recorded in a data-storage device. FIG. 33 includes a magnified view 3308 of three consecutive metric values represented by points. Each point represents an amplitude of the metric at a corresponding time stamp. For example, points 3310-3312 represent consecutive metric values (i.e., amplitudes) $x_{i-1}$, $x_i$, and $x_{i+1}$ recorded in a data-storage device at corresponding time stamps $t_{i-1}$, $t_i$, and $t_{i+1}$. The example metric may represent CPU usage of a core in a multicore processor of the edge device 1502 in the runtime interval. The metric may represent the amount of memory used by the edge device 1502 in the runtime interval. The metric may represent the amount of storage used, or available, for the storage device 1516 of the edge device 1502 in the runtime interval. The metric may represent network throughput for the net. The metric may represent network traffic for edge device in the runtime interval. The metric may also represent object performance, such as CPU contention, response time to requests, latency, electric power usage, and wait time for response to a user request at the edge device 1502.

Let $\Omega = (M_1, \ldots, M_\theta, \ldots, M_\Theta)$ represent a set of metrics generated at the edge device 1502 and collected by the metrics collector 3202 in the runtime interval $(t_{p-1}, t_p]$, where subscript $\theta$ is a metric index used to identify the metrics, and $\Theta$ is the number of metrics collected by the metric collector 3202. For example, metric $M_1$ may represent CPU usage by the edge device 1502. $M_2$ may represent memory usage by the edge device 1502, and $M_3$ may represent amount of data storage in use at the edge device 1502. The metrics collector 3202 forwards the metrics $\Omega$ to the metrics processor 3204. The duration of the runtime interval is determined by the controller server 1408 and may be set to an hour, twelve hours, twenty-four hours, a fixed number of days, such three days, four days, or seven days, a month, or a number of months.

The metrics processor 3204 computes an aggregated metric for each metric in set of metrics $\Omega$ over the runtime interval $(t_{p-1}, t_p]$. An aggregated metric contains summary information of the metric over the runtime interval $(t_{p-1}, \ldots, t_p]$. For example, the aggregated metric of a metric $M_\theta$ includes the maximum metric value, $x_{\theta,max}$, and the minimum metric value, $x_{\theta,min}$, over the runtime interval $(t_{p-1}, t_p]$. FIG. 33 shows examples of maximum and minimum metric values 3314 and 3316, respectively, for the example metric. The aggregated metric for a metric $M_\theta$ contains a sum of the metric values over the runtime interval:

$$x_{\theta,sum} = \sum_{i=1}^{Q_\theta} x_{\theta,i} \tag{14}$$

where $Q_\theta$ is the number of metric values of the metric $M_\theta$ in the time interval $[t_1, t_n]$. The aggregated metric contains an average of the metric values over the runtime interval:

$$\mu_\theta = \frac{1}{Q_\theta} \sum_{i=1}^{Q_\theta} x_{\theta,i} \tag{15}$$

The aggregated metric contains a standard deviation of the metric over the runtime interval $$\sigma_\theta = \sqrt{\frac{\sum_{i=1}^{Q_\theta}(x_{\theta,i} - \mu_\theta)^2}{Q_\theta}} \tag{16}$$

The aggregated metric of the metric $M_a$ generated by the metrics processor 3204 is denoted by $$s_\theta(t_1,t_n) = (t_1,t_n,Q_\theta,x_{\theta,min},x_{\theta,max},x_{\theta,sum},\mu_\theta,\sigma_\theta) \tag{17}$$

where $\theta = 1, 2, \ldots, \Theta$.

The collection of aggregated metrics $\{s_1(t_1, t_n), \ldots, s_\theta(t_1, t_n), \ldots, s_\Theta(t_1, t_n)\}$ computed over the runtime interval is relevant metric information. The framework orchestrator 1512 retrieves the relevant metric information from the metric processor 3204 and sends the relevant metric information to the forwarder 3208. The forward 3208 sends the relevant metric information to the external services 1516 of the data center 1402 and may store the relevant metric information in the data storage device 1518. The agent 1504 deletes the metrics collected by the metrics collector 3202 in the runtime interval to save on data storage at the edge device 1502.

As the metric values of the different metrics are collected by the metrics collector 3202 in the runtime interval and sent to the metrics processor 3204, the metrics processor 3204 compares the metric values to corresponding abnormal thresholds to detect threshold violations. The abnormal thresholds may be constant or dynamic thresholds. The abnormal thresholds may have been sent from the controller server 1408 to the framework orchestrator 1512, which forwards the abnormal thresholds to the metric processor 3204. A threshold violation or combination of threshold violations by different metrics over the runtime interval may be an indication of a performance problem at the edge device 1502.

Figure 34A:
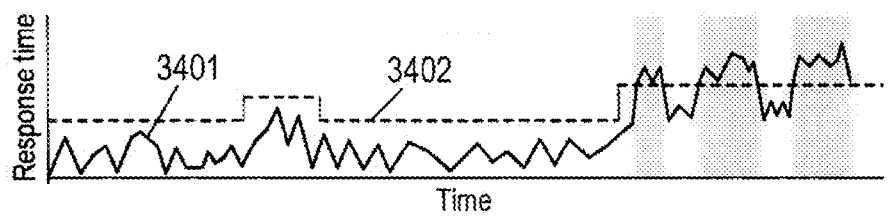
FIGS. 34A-34F show plots of example metrics and associated abnormal thresholds.
Figure 34B:
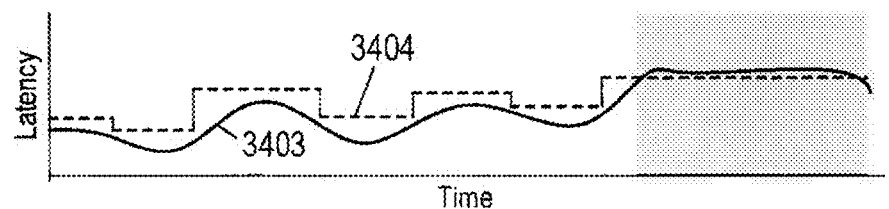
Figure 34C:
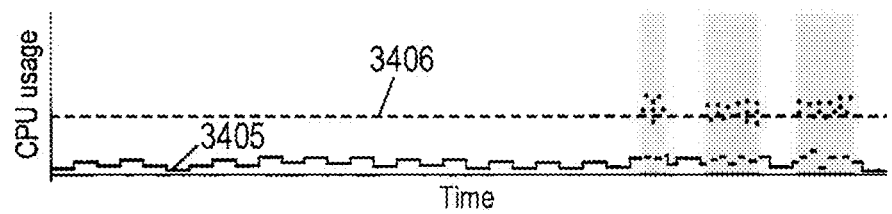
Figure 34D:
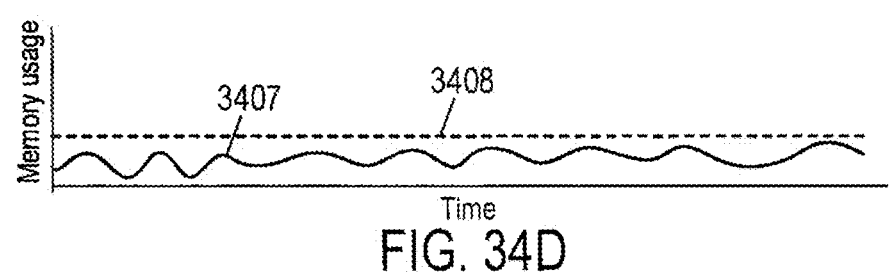
Figure 34E:
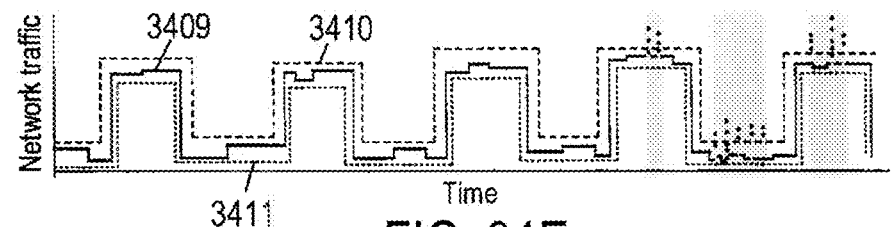
Figure 34F:
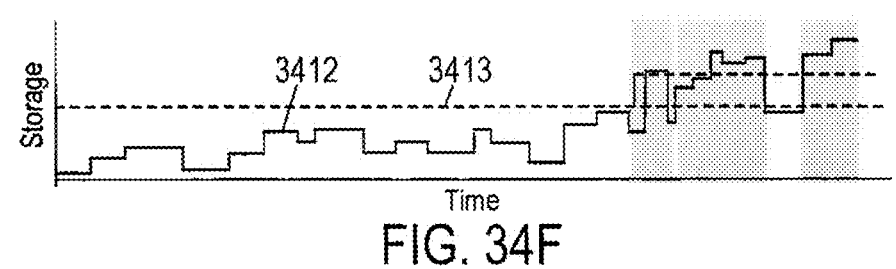

FIGS. 34A-34F show plots of example metrics and associated abnormal thresholds. In FIG. 34A, curve 3401 represents response time of program executing on the edge device 1502 and dashed curve 3402 represents a response time dynamic threshold. In FIG. 34B, curve 3403 represents latency of the program executing on the edge device 1502 and dashed curve 3404 represents a latency dynamic abnormal threshold. In FIG. 34C, curve 3405 represents CPU usage at the edge device 1502 and dashed curve 3406 represents a constant abnormal threshold. In FIG. 34D, curve 3407 represents memory usage at the edge device 1502 and dashed curve 3408 represents a constant abnormal threshold. In FIG. 34E, periodic curve 3409 represents network traffic, upper dashed curve 3410 represents an upper dynamic abnormal threshold, and lower dotted curve 3411 represents a lower dynamic abnormal threshold. In FIG. 34F, curve 3412 represents data storage of the edge device 1502 and dashed line 3413 represents a constant abnormal threshold. Shaded regions in FIGS. 34A-34C and 34E-34F identify time intervals where the example metrics violate corresponding abnormal thresholds for a period of time, which are indicators of abnormal behaviors the translate into performance problems at the edge device. In this example, the abnormal behaviors exhibited in FIGS. 34A-34C and 34E-34F may be related, or correlated, because the abnormalities occur in overlapping time intervals. By contrast, the memory usage metric in FIG. 34D does not exhibit any abnormal behavior and does not appear to be correlated with the behavior represented in the other metrics.

In one implementation, when a metric violates a corresponding abnormal threshold for a period of time denoted by T, the log messages generated by event sources of edge device 1502 collected by the log message collector 1602. The period of time T is used to distinguish between short insignificant burst of threshold violations from sustained threshold violations that are an indication of a performance problem at the edge device 1502. Each metric $M_\theta$ may have a different associated period of time, where $T_\theta$ is an unacceptable period of time for a threshold violation associate with the metric $M_\theta$. When the following condition is satisfied $$x_\theta(t_i) > Th_\theta \qquad (18)$$

for $t_i$ in the time interval $[t_c, t_c+T_\theta]$, where $x_\theta(t_i) \in M_\theta$, $Th_\theta$ is an abnormal threshold for the metric $M_\theta$, $t_c$ denotes an initial threshold violation, and $[t_c, t_c+T_\theta] \subset (t_{p-1}, t_p]$. The time interval $[t_c, t_c+T_\theta]$ is a threshold violation time interval. Log messages of the edge device 1502 with time stamps in a time interval that extends backward in time from $t_c+T_\theta$ to a later time $t_c+T_\theta-T_d$, where $T_d > T_\theta$, are retrieved from a log file of the edge device 1502. The metrics processor 3204 may aggregate metric values over the abnormal threshold time interval $[t_c, t_c+T_\theta]$ as described above to obtain an aggregated metric:

$$s_\theta(t_c, t_c+T_\theta) = (t_c, t_c+T_\theta, Q_\theta, x_{\theta,min}, x_{\theta,max}, x_{\theta,sum}, \mu_\theta, \sigma_\theta)$$

The metrics processor 3204 forms relevant metric information composed of the aggregated metric $s_\theta(t_c, t_c+T_\theta)$ and the log messages with time stamps in the backward extended time interval $[t_c, t_c+T_\theta-T_d]$. The framework orchestrator 1512 retrieves the relevant metric information from the metrics processor 3204 and sends the relevant metric information to the forwarder 3206, which in turn sends the relevant metric information to the external services 1516 of the data center 1402.

Figure 35:
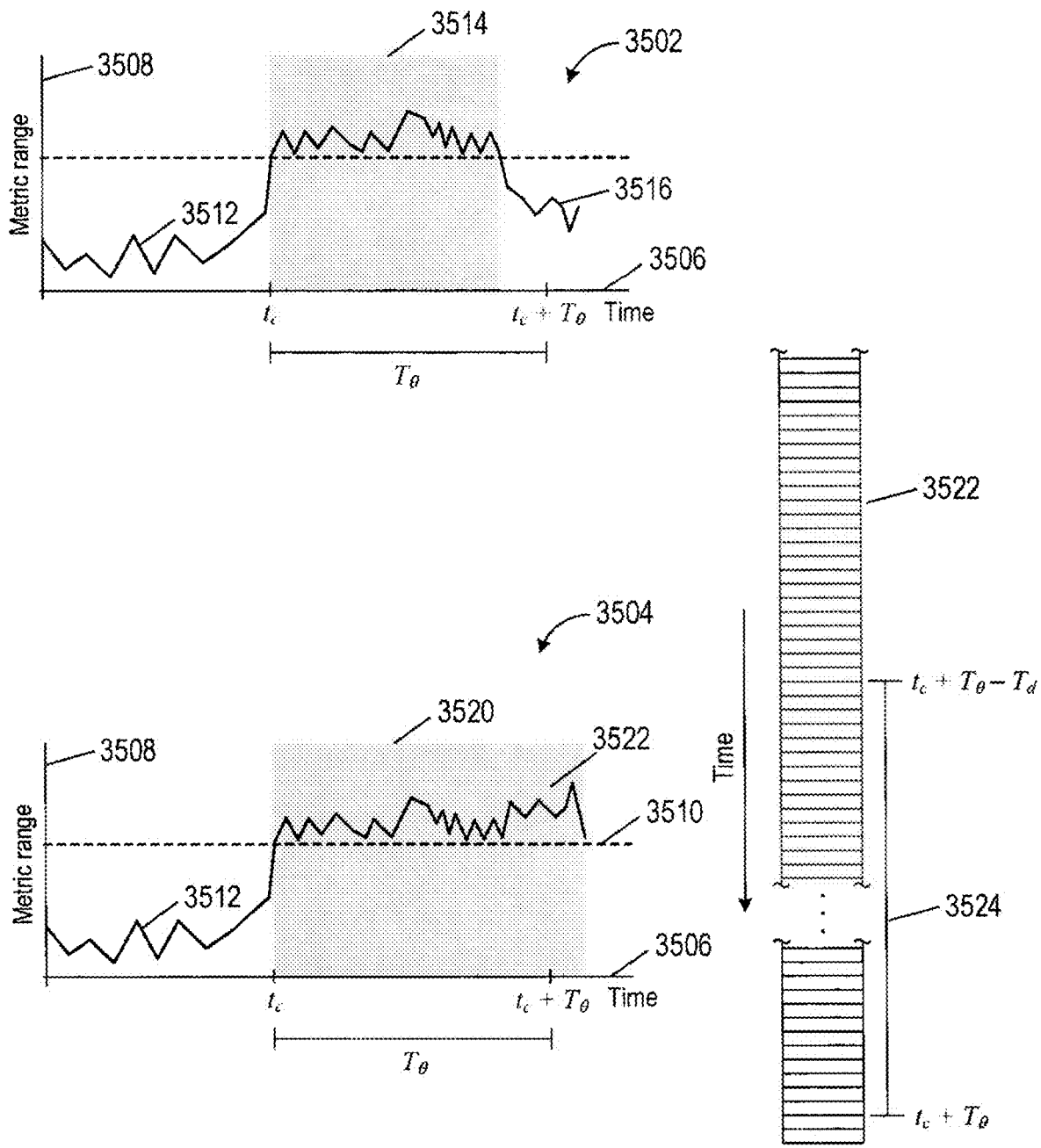
FIG. 35 shows example plots of a metric around a time of a threshold violation.

FIG. 35 shows example plots 3502 and 3504 of a metric $M_\theta$ around a time $t_c$ of a threshold violation. Horizontal axis 3506 represents time. Vertical axis 3508 represents a range of metric values for the metric. Dashed line 3510 represents an abnormal threshold. The abnormal threshold 3510 can be a constant threshold or a dynamic threshold. In the example plot 3502, curve 3512 represents metric values of the metric $M_\theta$. Shade region 3514 represents a time interval in which metric values violate the abnormal threshold 3510 after the time $t_c$ but the duration of the threshold violation ends before the time $t_c+T_\theta$ as indicated metric values 3516 that are less than the abnormal threshold 3510. In the example plot 3504, curve 3518 represents metric values of the metric $M_\theta$. In this example, shaded region 3520 represents a time interval in which metric values violate the abnormal threshold 3510 after the time $t_c+T_\theta$ as indicated metric values 3520 that are greater than the abnormal threshold 3510. As a result, the metrics processor 3204 retrieves log messages with time stamps from a log file 3522 for the edge device 1502. Log messages with time stamps in the backward extended time interval $[t_c, t_c+T_\theta-T_d]$ 3524 are retrieved from the log file 3522.

Threshold violations in the abnormal threshold time interval $[t_c, t_c+T_\theta]$ do not have to be consecutive to be an indication of abnormal behavior at the edge device 1502. In another implementation, the metrics processor 3204 computes a rate of threshold violations over the abnormal threshold time interval $[t_c, t_c+T_\theta]$. For example, each metric value $x_\theta(t_i)$ of the metric $M_\theta$ in the abnormal threshold time interval $[t_c, t_c+T_\theta]$ is compared to the corresponding threshold $Th_\theta$. When the condition $x_\theta(t_i) > Th_\theta$ is satisfied in abnormal threshold time interval $[t_c, t_c+T_\theta]$, a counter $N_\theta$ is incremented, where $N_\theta$ is the number of threshold violations for the metric in the abnormal threshold time interval $[t_c, t_c+T_\theta]$. When the time interval ends at time $t_c+T_\theta$, a rate of threshold violations is computed as ViolationRate=$N_\theta/T_\theta$. If ViolationRate>$Th_{vio-rate}$, where $Th_{vio-rate}$ is a fixed threshold violation rate, then log messages with time stamps in the backward extended time interval $[t_c, t_c+T_\theta-T_d]$ are retrieved from the log file of the edge device 1502, as described above, and are sent to the external servers 1514.

In another implementation, the metrics processor 3204 forms super metrics from the set of metrics $\Omega$. However, the metrics collected by the metrics collector 3202 are typically not synchronized to the same time stamps. For example, metric values of a CPU metric may be generated at periodic intervals, but the metric values of another metric, such as network throughput metric, may be generated at different time stamps. In certain cases, the metrics collector 3202 may request metric data from metric sources at regular intervals while in other cases, the metric sources may actively send metric data to the metrics collector 3202 whenever metric data becomes available. The metric processor 3204 synchronizes the metrics $\Omega$ to a general set of uniformly spaced time stamps. Metric values may be synchronized in time by computing a runtime average of metric values in a sliding time window centered at each time stamp of the general set of uniformly spaced time stamps. In an alternative implementation, the metric values with time stamps in the sliding time window may be smoothed by computing a runtime median of metric values in the sliding time window centered at each time stamp of the general set of uniformly spaced time stamps. Processes and systems may also synchronize in time the metrics by deleting time stamps of missing metric values and/or interpolating missing metric data at time stamps of the general set of uniformly spaced time stamps using a running average, linear interpolation, quadratic interpolation, or spline interpolation.

A super metric formed over the runtime interval $(t_{p-1}, t_p]$ $$M^{sup} = (X_i)_{i=1}^Q = (X(t_i))_{i=1}^Q \qquad (19)$$

where $M^{sup}$ denotes the super metric;

$t_i$ is a time stamp of a generalized set of uniformly spaced time stamps; and $X_i = X(t_i)$ is a super metric value at the time stamp $t_i$.

The super metric values are given by $$X_i = \sum_{\theta \in \Gamma} x_{\theta,i} \qquad (20)$$

where $\Gamma$ is a predetermined subset of the set of metrics $\Omega$. The subset of metrics used to form a super metric is set by instructions sent from the controller server 1408 to the framework orchestrator 1512. For example, the set of metrics $\Gamma$ may be composed of the CPU metric $M_1$, the memory usage metric $M_2$, and the amount of data storage metric $M_3$ described above. The metrics processor 3204 computes an aggregated super metric for the super metric $M^{sup}$ as described above with reference to Equations (14)-(16):

$$S_\Gamma(t_1,t_n) = (t_1, t_n, Q, X_{min}, X_{max}, X_{sum}, \mu_{sup}, \sigma_{sup}) \qquad (21)$$

where $X_{max}$ is the maximum super metric value and $X_{min}$ is the minimum super metric value over the runtime interval $(t_{p-1}, t_p]$. The sum of the super metric values $X_{sum}$, the average of the super metric values $\mu_{sup}$, and the standard deviation of the super metric values $\sigma_{sup}$ are computed as described above with reference to Equations (14)-(16). The one or more aggregated super metrics computed over the runtime interval is the relevant metric information. The framework orchestrator 1512 retrieves the relevant metric information from the metrics processor 3204 and sends the relevant metric information to the forwarder 3208. The forward 3208 sends the relevant metric information to the external services 1516 of the data center 1402 and may store the relevant metric information in the data storage device 1518. The agent 1504 deletes the metrics collected by the metrics collector 3202 in the runtime interval to save on data storage at the edge device 1502.

The metrics processor 3204 compares super metric values to a corresponding abnormal threshold in the same manner the metrics processor 3204 compares the metric values of the different metrics to corresponding abnormal thresholds as described above with reference to FIG. 35 and Equation (18). For example, when the following condition is satisfied $$X(t_i) > Th_{sup} \qquad (22)$$

for $t_i$ in the time interval $[t_c, t_c+T_{sup}]$, where $T_{sup}$ is an abnormal threshold for the super metric. $X(t_i) \in M^{sup}$, and $[t_c, t_c+T_\theta] \subset (t_{p-1}, t_p]$. The time interval $[t_c, t_c+T_{sup}]$ is a threshold violation time interval. Log messages of the edge device 1502 with time stamps in a time interval that extends backward in time from $t_c+T_{sup}$ to a later time $t_c+T_{sup}-T_d$, where $T_d > T_{sup}$, are retrieved from a log file of the edge device 1502. The metrics processor 3204 aggregates super metric values over the threshold violation time interval $[t_c, t_c+T_{sup}]$ as described above to obtain an aggregated super metric:

$$S_\Gamma(t_c, t_c+T_{sup}) = (t_c, t_c+T_{sup}, Q, X_{min}, X_{max}, X_{sum}, \mu_{sup}, \sigma_{sup})$$

The metrics processor 3204 forms relevant metric information composed of the aggregated super metric $S_\Gamma(t_c, t_c+T_{sup})$ and the log messages with time stamps in the backward extended time interval $[t_c, t_c+T_{sup}-T_d]$. The framework orchestrator 1512 retrieves the relevant metric information from the metrics processor 3204 and sends the relevant metric information to the forwarder 3206, which in turn sends the relevant metric information to the external services 1516 of the data center 1402.

Figure 36:
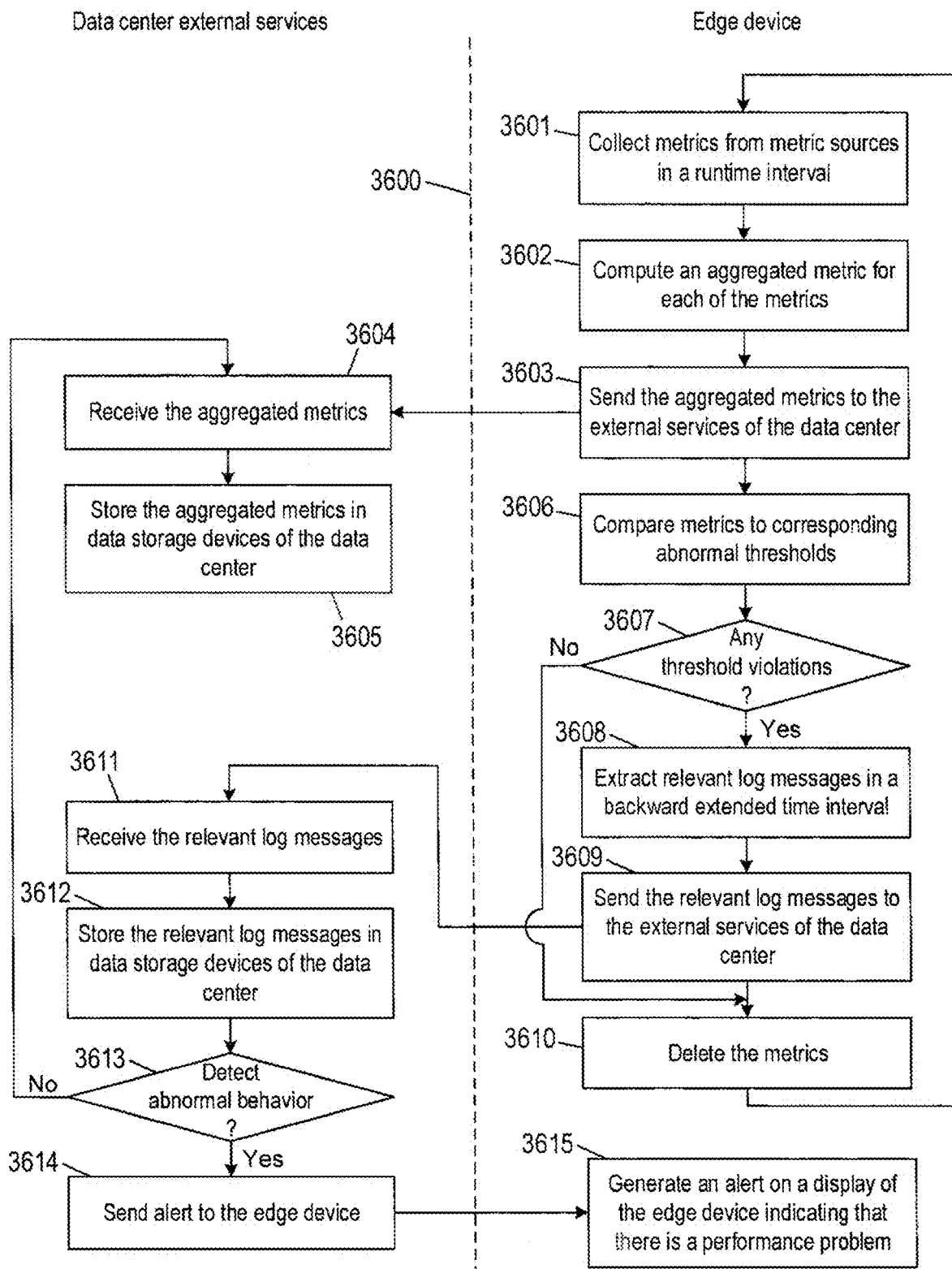
FIG. 36 is a flow diagram of operations performed by an agent at an edge device and operations performed by external services of the data center.

FIG. 36 is a flow diagram of operations performed by the agent 1504 at the edge device 1502 and operations performed by the external services 1514 of the data center 1402. Dot dashed line 3600 separates operations performed by the edge device 1502 from operations performed by the external services 1516 of the data center 1402. In block 3601, metrics are collected in a runtime interval by the metrics collector 3202 of the agent 1504. In block 3602, an aggregated metric is computed for each metric as described above with reference to Equations (14)-(17). In block 3603, the aggregated metrics are sent to the external services 1516 of the data center 1402. In block 3604, the aggregated metrics are received at the data center 1402. In block 3605, the aggregated metrics are stored in a data storage device of the data center 1402. In block 3606, metric values of each metric are compared to corresponding abnormal threshold to detect metric values that violate the corresponding abnormal thresholds as described above with reference to FIG. 35. In decision block 3607, when metric values violate a corresponding abnormal threshold for in abnormal threshold time interval, or a violation rate is greater than a fixed threshold violation rate, control flows to block 3608. Otherwise, control flows to block 3610 and the metric are deleted. In block 3608, relevant log messages with time stamps in a backward extended time interval are extracted from a log file as described above with reference to FIG. 35. In block 3609, the relevant log messages are sent to the external services 1516 of the data center 1402. In block 3611, the relevant log messages are received at the data center 1402. In block 3612, the relevant log messages are stored at the data center 1402. In decision block 3613, when the external services determines the aggregated data and relevant log messages indicate abnormal behavior at the edge device 1502, control flows to block 3614. In block 3614, the external services 1516 sends an alert to the edge device 1502. In block 3615, the alert is displayed on a display at the edge device. The alert indicates a performance problem has occurred at the edge device 1502.

Figure 37:
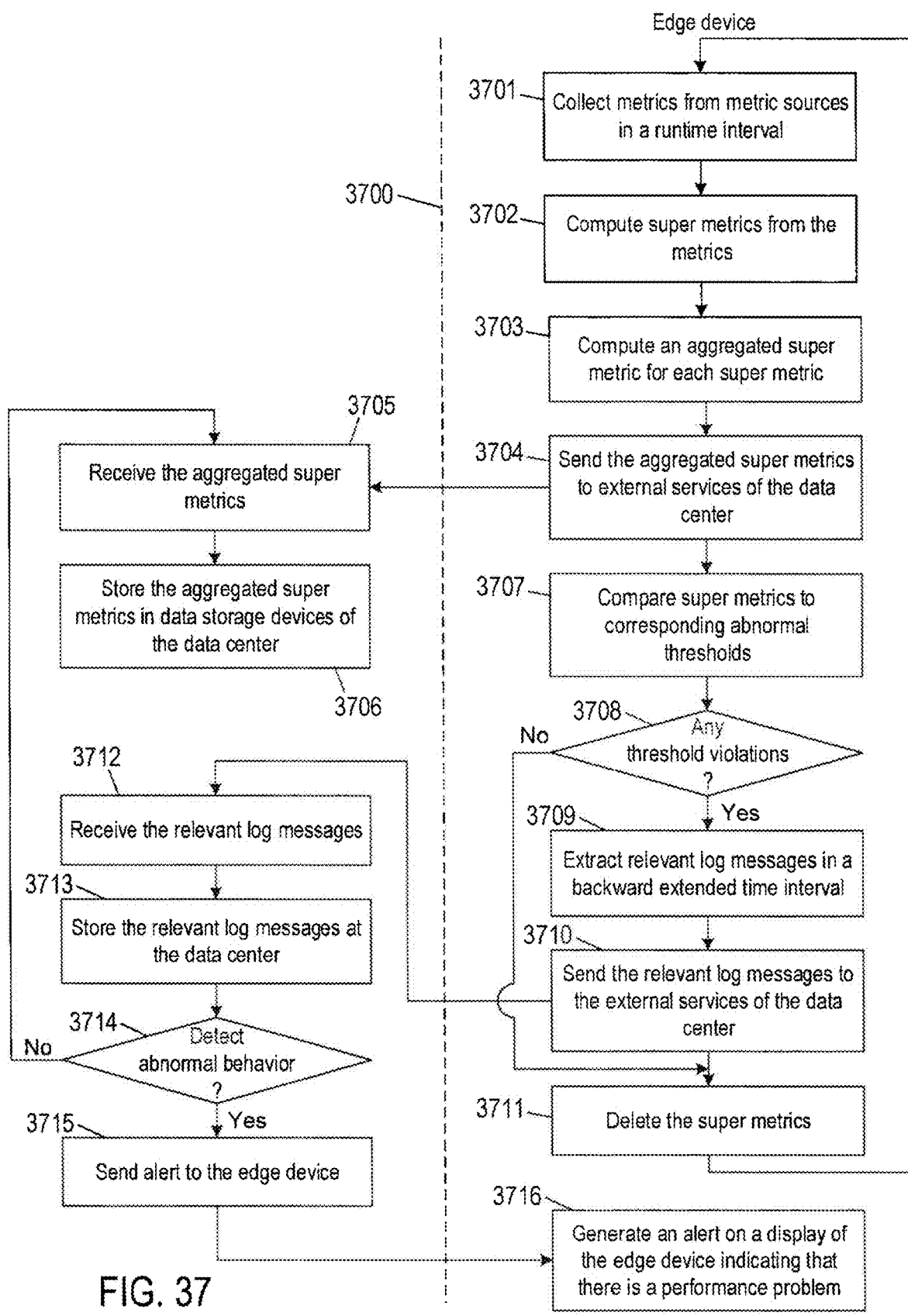
FIG. 37 is a flow diagram of operations performed by an agent at an edge device and operations performed by external services of the data center.

FIG. 37 is a flow diagram of operations performed by the agent 1504 at the edge device 1502 and operations performed by the external services 1514 of the data center 1402. In block 3701, metrics are collected in a runtime interval by the metrics collector 3202 of the agent 1504. In block 3702, one or more super metrics are formed from the metrics as described above with reference to Equation (19). In block 3703, an aggregated super metric is computed for each super metric as described above with reference to Equations (14)-(17). In block 3704, the aggregated super metrics are sent to the external services 1516 of the data center 1402. In block 3705, the aggregated super metrics are received at the data center 1402. In block 3706, the aggregated super metrics are stored in a data storage device of the data center 1402. In block 3707, super metric values of each super metric are compared to corresponding abnormal threshold to detect super metric values that violate the corresponding abnormal thresholds as described above with reference to FIG. 35. In decision block 3708, when super metric values violate a corresponding abnormal threshold for in abnormal threshold time interval, or a violation rate is greater than a fixed threshold violation rate, control flows to block 3708. Otherwise, control flows to block 3710 and the metric are deleted. In block 3709, relevant log messages with time stamps in a backward extended time interval are extracted from a log file as described above with reference to FIG. 35. In block 3710, the relevant log messages are sent to the external services 1516 of the data center 1402. In block 3712, the relevant log messages are received at the data center 1402. In block 3713, the relevant log messages are stored at the data center 1402. In decision block 3714, when the external services determines the aggregated data and relevant log messages indicate abnormal behavior at the edge device 1502, control flows to block 3715. In block 3715, the external services 1516 sends an alert to the edge device 1502. In block 3716, the alert is displayed on a display at the edge device. The alert indicates a performance problem has occurred at the edge device 1502.

It is appreciated that the previous description of the disclosed embodiments is provided to enable any person skilled in the art to make or use the present disclosure. Various modifications to these embodiments will be apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A computer implemented agent executed in an edge device of a distributed computing system, the agent comprising:
   a framework orchestrator that receives commands from a controller server of a data center over the internet;
   a collector that collects event information from event sources of the edge device in a runtime interval in accordance with instructions sent from the framework orchestrator;
   a processor that receives the event information from the collector and reduces the event information to relevant event information in accordance with instructions received from the framework orchestrator, the relevant event information containing less information than the event information; and
   a forwarder that receives the relevant event information from the processor and forwards the relevant event information over the internet to external services of the data center;
   wherein the processor reduces the event information to relevant event information by performing the operations comprising:
   normalizing log messages received from log message sources of the edge device by extracting parametric tokens from the log messages that describe events recorded in the log messages using corresponding regular expressions or Grok expressions for the log messages;
   computing a feature vector for each of the events of the log messages;
   identifying clusters of semantically similar events based on the feature vectors of the events, each cluster containing semantically similar events that correspond to an event type;
   constructing a similarity graph for events of each cluster;
   computing a text rank for each event of the clusters based on the similarity graph; and
   determining one or more representative log messages for each cluster of events based on the text rank of the corresponding event, wherein the relevant event information comprises the representative log messages.

2. The agent of claim 1 wherein the collector collects log messages from log messages sources of the edge device.

3. The agent of claim 1 wherein the processor reduces the event information to relevant event information by performing the operations comprising:
   normalizing log messages received from log message sources of the edge device by extracting parametric tokens from the log messages that describe events recorded in the log messages using corresponding regular expressions or Grok expressions for the log messages:
   computing a feature vector for each of the events of the log messages:
   identifying clusters of semantically similar events based on the feature vectors of the events, each cluster containing semantically similar events that correspond to an event type;
   determining one or more representative log messages for each cluster of events;
   constructing a probability distribution based on numbers of events in each of the clusters;
   computing a log summary divergence between the probability distribution and a baseline probability distribution for the edge device; and
   in response to determining the log message summary is greater than an abnormal threshold, forming the relevant event information from the representative log messages, the probability distribution, and the log summary divergence.

4. The agent of claim 1 wherein the collector collects metrics from metric sources of the edge device.

5. The agent of claim 1 wherein the processor reduces the event information to relevant event information by performing the operations comprising:
   computing an aggregated metric for each metric collected in the runtime interval;
   forming the relevant event information from the aggregated metrics; and
   deleting metrics in the runtime interval from storage at the edge device.

6. The agent of claim 1 wherein the processor reduces the event information to relevant event information by performing the operations comprising:
   synchronizing in a time a subset of the metrics collected in the runtime interval;
   computing a super metric from the synchronized metrics;
   computing an aggregated super metric from the super metric;
   forming the relevant event information from the aggregated super metric; and
   deleting metrics in the runtime interval from storage at the edge device.

7. The agent of claim 1 wherein the processor reduces the event information to relevant event information by performing the operations comprising:
   for each of metrics generated by metric sources of the edge device over the runtime interval, comparing each metric value of the metric to an abnormal threshold associated with the metric; and
   in response to determining the metric violates the abnormal threshold over an unacceptable time interval,
   retrieving log messages of the edge device with time stamps in a backward extended time interval from a log file,
   computing an aggregated metric from metrics in a threshold violation time interval, and
   forming the relevant event information from the log messages and the aggregated metrics.

8. The agent of claim 1 wherein the processor reduces the event information to relevant event information by performing the operations comprising:
   computing a super metric from metrics generated by metric sources of the edge device over the runtime interval;

comparing each super metric value of the super metric to an abnormal threshold associated with the super metric; and in response to determining the super metric violates the abnormal threshold over an unacceptable time interval,
retrieving log messages of the edge device with time stamps in a backward extended time interval from a log file,
computing an aggregated metric from metrics in a threshold violation time interval, and
forming the relevant event information from the log messages and the aggregated metric.

9. A process for reducing event information that is generated by an edge device of distributed computing system and is sent to and stored in a data center, the process comprising:

collecting event information generated by event sources of the edge device in a runtime interval;
reducing the event information to relevant event information at the edge device in accordance with instructions received from a controller server of the data center, the relevant event information containing less information than the event information;
forwarding the relevant event information over the internet to external services executed at the data center; and
storing the relevant event information in a data storage device of the data center;
wherein reducing the event information to the relevant event information at the edge device comprises:
normalizing log messages received from log message sources of the edge device by extracting parametric tokens from the log messages that describe events recorded in the log messages using corresponding regular expressions or Grok expressions for the log messages;
computing a feature vector for each of the events of the log messages;
identifying clusters of semantically similar events based on the feature vectors of the events, each cluster containing semantically similar events that correspond to an event type;
constructing a similarity graph for events of each cluster;
computing a text rank for each event of the clusters based on the similarity graph; and
determining one or more representative log messages for each cluster of events based on the text rank of the corresponding event, wherein the relevant event information comprises the representative log messages.

10. The process of claim 9 wherein collecting the event information generated by the event sources of the edge device in the runtime interval comprises collecting log messages from log message sources of the edge device.

11. The process of claim 9 wherein reducing the event information to relevant event information at the edge device further comprises:
determining one or more representative log messages for each cluster of events;
constructing a probability distribution based on numbers of events in each of the clusters;
computing a log summary divergence between the probability distribution and a baseline probability distribution for the edge device; and
in response to determining the log message summary is greater than an abnormal threshold, forming the relevant event information from the representative log messages, the probability distribution, and the log summary divergence.

12. The process of claim 9 wherein collecting the event information generated by the event sources of the edge device in the runtime interval comprises collecting metrics from metric sources of the edge device.

13. The process of claim 9 wherein reducing the event information to relevant event information at the edge device comprises:
computing an aggregated metric for each metric collected in the runtime interval;
forming the relevant event information from the aggregated metrics; and
deleting metrics in the runtime interval from storage at the edge device.

14. The process of claim 9 reducing the event information to relevant event information at the edge device comprises:
synchronizing in a time a subset of the metrics collected in the runtime interval;
computing a super metric from the synchronized metrics;
computing an aggregated super metric from the super metric;
forming the relevant event information from the aggregated super metric; and
deleting metrics in the runtime interval from storage at the edge device.

15. The process of claim 9 reducing the event information to relevant event information at the edge device comprises:
for each of metrics generated by metric sources of the edge device over the runtime interval, comparing each metric value of the metric to an abnormal threshold associated with the metric; and
in response to determining the metric violates the abnormal threshold over an unacceptable time interval,
retrieving log messages of the edge device with time stamps in a backward extended time interval from a log file,
computing an aggregated metric from metrics in a threshold violation time interval, and
forming the relevant event information from the log messages and the aggregated metrics.

16. The process of claim 9 reducing the event information to relevant event information at the edge device comprises:
computing a super metric from metrics generated by metric sources of the edge device over the runtime interval;
comparing each super metric value of the super metric to an abnormal threshold associated with the super metric; and
in response to determining the super metric violates the abnormal threshold over an unacceptable time interval,
retrieving log messages of the edge device with time stamps in a backward extended time interval from a log file,
computing an aggregated metric from metrics in a threshold violation time interval, and
forming the relevant event information from the log messages and the aggregated metric.

17. An edge device of a distributed computing system, the edge device comprising:
one or more processors;
one or more data-storage devices;
a display; and
machine-readable instructions stored in the one or more data-storage devices that when executed using the one or more processors controls the system to perform operations comprising:
collecting event information generated by event sources of the edge device in a runtime interval;
reducing the event information to relevant event information at the edge device in accordance with instructions received from a controller server of the data center, the relevant event information containing less information than the event information;
forwarding the relevant event information over the internet to external services executed at a data center; and
displaying an alert that identifies a performance problem at the edge device on the display in response to receiving the alert from the external services;
wherein reducing the event information to relevant event information at the edge device comprises:
synchronizing in a time a subset of the metrics collected in the runtime interval;
computing a super metric from the synchronized metrics;
computing an aggregated super metric from the super metric;
forming the relevant event information from the aggregated super metric; and
deleting metrics in the runtime interval from storage at the edge device.

18. The process of claim 17 wherein collecting the event information generated by the event sources of the edge device in the runtime interval comprises collecting log messages from log message sources of the edge device.

19. The process of claim 17 wherein reducing the event information to the relevant event information at the edge device comprises:
normalizing log messages received from log message sources of the edge device by extracting parametric tokens from the log messages that describe events recorded in the log messages using corresponding regular expressions or Grok expressions for the log messages;
computing a feature vector for each of the events of the log messages;
identifying clusters of semantically similar events based on the feature vectors of the events, each cluster containing semantically similar events that correspond to an event type;
constructing a similarity graph for events of each cluster;
computing a text rank for each event of the clusters based on the similarity graph; and
determining one or more representative log messages for each cluster of events based on the text rank of the corresponding event, wherein the relevant event information comprises the representative log messages.

20. The process of claim 17 wherein reducing the event information to relevant event information at the edge device comprises:
normalizing log messages received from log message sources of the edge device by extracting parametric tokens from the log messages that describe events recorded in the log messages using corresponding regular expressions or Grok expressions for the log messages;
computing a feature vector for each of the events of the log messages;
identifying clusters of semantically similar events based on the feature vectors of the events, each cluster containing semantically similar events that correspond to an event type;
determining one or more representative log messages for each cluster of events;
constructing a probability distribution based on numbers of events in each of the clusters;
computing a log summary divergence between the probability distribution and a baseline probability distribution for the edge device; and
in response to determining the log message summary is greater than an abnormal threshold, forming the relevant event information from the representative log messages, the probability distribution, and the log summary divergence.

21. The process of claim 17 wherein collecting the event information generated by the event sources of the edge device in the runtime interval comprises collecting metrics from metric sources of the edge device.

22. The process of claim 17 wherein reducing the event information to relevant event information at the edge device comprises:
computing an aggregated metric for each metric collected in the runtime interval;
forming the relevant event information from the aggregated metrics; and
deleting metrics in the runtime interval from storage at the edge device.

23. The process of claim 17 reducing the event information to relevant event information at the edge device comprises:
for each of metrics generated by metric sources of the edge device over the runtime interval, comparing each metric value of the metric to an abnormal threshold associated with the metric; and
in response to determining the metric violates the abnormal threshold over an unacceptable time interval,
retrieving log messages of the edge device with time stamps in a backward extended time interval from a log file,
computing an aggregated metric from metrics in a threshold violation time interval, and
forming the relevant event information from the log messages and the aggregated metrics.

24. The process of claim 17 reducing the event information to relevant event information at the edge device comprises:
computing a super metric from metrics generated by metric sources of the edge device over the runtime interval;
comparing each super metric value of the super metric to an abnormal threshold associated with the super metric; and
in response to determining the super metric violates the abnormal threshold over an unacceptable time interval,
retrieving log messages of the edge device with time stamps in a backward extended time interval from a log file, computing an aggregated metric from metrics in a threshold violation time interval, and forming the relevant event information from the log messages and the aggregated metric.

\* \* \* \* \*